(12) United States Patent
Olsen

(10) Patent No.: US 10,387,122 B1
(45) Date of Patent: Aug. 20, 2019

(54) RESIDUE NUMBER MATRIX MULTIPLIER

(71) Applicant: Eric B. Olsen, Las Vegas, NV (US)

(72) Inventor: Eric B. Olsen, Las Vegas, NV (US)

(73) Assignee: Olsen IP Reserve, LLC, Henderson, NV (US)

( * ) Notice: Subject to any disclaimer, the term of this patent is extended or adjusted under 35 U.S.C. 154(b) by 0 days.

(21) Appl. No.: 15/972,021

(22) Filed: May 4, 2018

(51) Int. Cl.
G06F 7/72 (2006.01)
G06F 17/16 (2006.01)

(52) U.S. Cl.
CPC ............ G06F 7/729 (2013.01); G06F 17/16 (2013.01)

(58) Field of Classification Search
CPC .................. G06F 7/729; G06F 17/16
See application file for complete search history.

(56) References Cited

U.S. PATENT DOCUMENTS

| 4,281,391 | A | 7/1981 | Huang |
| 4,588,980 | A | 5/1986 | Bernardson |
| 4,910,699 | A | 3/1990 | Capps |
| 4,963,869 | A | 10/1990 | Falk |
| 4,996,527 | A | 2/1991 | Houk |
| 5,050,120 | A | 9/1991 | Houk |
| 5,107,451 | A | 4/1992 | Houk |
| 5,117,383 | A | 5/1992 | Fujita |
| 7,269,261 | B1 * | 9/2007 | Jennings ............... H04L 9/0894 380/286 |
| 7,523,151 | B1 | 4/2009 | Mellott |
| 9,081,608 | B2 | 7/2015 | Olsen |
| 9,311,050 | B2 | 4/2016 | Olsen |
| 9,395,952 | B2 | 7/2016 | Olsen |
| 9,712,185 | B2 | 7/2017 | Olsen |
| 2006/0010190 | A1 | 1/2006 | Shimbo |
| 2006/0184600 | A1 | 8/2006 | Maruo |
| 2009/0202067 | A1 | 8/2009 | Michaels |
| 2011/0231465 | A1 | 9/2011 | Phatak |
| 2016/0342891 | A1 | 11/2016 | Ross |
| 2018/0218275 | A1 * | 8/2018 | Arrigoni ............... G06F 17/16 |

FOREIGN PATENT DOCUMENTS

| CA | 2868833 | 11/2013 |
| EP | 2761432 | 8/2014 |
| RU | 2318238 | 2/2008 |
| WO | WO2013176852 | 11/2013 |

OTHER PUBLICATIONS

Thu Van Vu, Efficient Implementations of the Chinese Remainder Theorem for Sign Detection and Residue Decoding, IEEE Transactions on Computers, vol. C-34, No. 7, Jul. 1985, pp. 646-651, XP011291045, IEEE Service Center, Los Alamitos, CA, ISSN: 0018-9340, section III.

(Continued)

Primary Examiner — Chuong D Ngo
(74) Attorney, Agent, or Firm — Lightbulb IP, LLC

(57) ABSTRACT

Arithmetic circuits and methods that perform efficient matrix multiplication for hardware acceleration of neural networks, machine learning, web search and other applications are disclosed herein. Various arrays of multiplier-accumulators may be coupled to form a matrix multiplier which processes data using high precision, fixed point residue number arithmetic.

6 Claims, 58 Drawing Sheets

(56) References Cited

OTHER PUBLICATIONS

Cardarilli G C et al, RNS Realization of Fast Fixed-Point Multipliers with Large Wordlengths, ISCAS 1989, vol. 1 of 3, May 1989, pp. 212-215, XP000131600, IEEE, New York, NY, p. 212, right col. para. 1, section 3.
Arnold M G, The Residue Logarithmic Number System: Theory and Implementation, IEEE Symposium on Computer Arithmetic, ARITH-17, Jun. 2005, pp. 196-205, XP010817723, IEEE, Piscataway, NJ, DOI: 10.1109/ARITH.2005.44, ISBN: 978-0-7695-2366-8, p. 198, left col. last para., right col. para. 3.
Taylor F J, The Application of RNS Arithmetic to Data Processing, Electronic Engineering, vol. 61, No. 750, Jun. 1989, pp. 101, 103, 104, XP000033123, Morgan-Grampian Ltd., London, GB, ISSN: 0013-4902, figs.

* cited by examiner

Example RNS Fixed Point Number System:
p = 8, f = 2, w = 2, e = 4, Q = 18
$M_j$ = {78125, 131072, 262109, 262111, 262121, 262127, 262133, 262139}
$R_F$ = 78125*131072 = 10240000000
Ex: 3216908773/$R_F$ = 3.141592653+

| | $M_1$ | $M_2$ | $M_3$ | $M_4$ | $M_5$ | $M_6$ | $M_7$ | $M_8$ | Machine Word | Decimal Equiv. |
|---|---|---|---|---|---|---|---|---|---|---|
| Modulus: | 78125 | 131072 | 262109 | 262111 | 262121 | 262127 | 262133 | 262139 | Y | |
| | Fractional Digits | | Integer Digits | | | Extended Digits | | | | |
| | $D_1$ | $D_2$ | $D_3$ | $D_4$ | $D_5$ | $D_6$ | $D_7$ | $D_8$ | | |
| | 65023 | 121381 | 13573 | 239410 | 60564 | 110571 | 160614 | 210693 | 3216908773 | 3.14159265+ |
| | 49673 | 100643 | 97813 | 66167 | 52691 | 201920 | 89052 | 238347 | 27835205923 | 2.71828182+ |
| | 43729 | 106511 | 76231 | 101074 | 116670 | 91222 | 235049 | 76241 | 8954560352205792624/9 | N/A |
| | 3440 | 96488 | 33360 | 96065 | 167388 | 605 | 96039 | 191569 | 8744687844/0 | 8.53973422+ |
| | 74685 | 34584 | 143787 | 166046 | 271015 | 261522 | 166094 | 70570 | 22448427036650874987413/528951434487321560 | -8.53973422+ |
| | 0 | 0 | 187697 | 109563 | 243135 | 8745 | 36488 | 64243 | 1024000000 | 1.0 |
| | 78124 | 131071 | 187696 | 109562 | 243134 | 8744 | 36487 | 64242 | 10239999999 | 0.99999999+ |

Figure 3b

Common Fixed Point Number System parameters:
$p = 8, f = 2, w = 2, e = 4, Q = 18$ — 390

| Modulus Set | | | | | | | | Equiv Binary bits $n_e(f)/n_e(w)$ | Overall Efficiency E | Format efficiency |
|---|---|---|---|---|---|---|---|---|---|---|
| $M_1$ | $M_2$ | $M_3$ | $M_4$ | $M_5$ | $M_6$ | $M_7$ | $M_8$ | | | |
| 78125 | 131072 | 262109 | 262111 | 262121 | 262127 | 262133 | 262139 | 33.25/35.99 | 98.09% | 96.18% |
| 262079 | 262103 | 262109 | 262111 | 262121 | 262127 | 262133 | 262139 | 35.99/35.99 | 99.9991% | 99.9987% |
| 13^4 | 2^16 | 5^7 | 17^4 | 7^6 | 19^4 | 11^5 | 3^11 | 30.79/32.60 | 91.64% | 88.06% |

391 — Modulus Set
392 — Equiv Binary bits
393 — Overall Efficiency
394 — Format efficiency 395
396
397
398

$Y_{3,2} = \{0,0,4,0.2,5,1,14\} = 1344$
$Y_{0.25} = \{1,0,0,0.6,1,3,10\} = 105$
$Y_{IP} = Y_{3,2} * Y_{0.25} = \{0,0,0,0.1,5,3,7\} = 141120$
$M_{IP} = MRC(Y_{IP}) = 2460000_{MR} = 141120$
$Y_R = MR2R(\lfloor M_{IP} \rfloor_F) = MR2R(\lfloor 2460000 \rfloor_F)$
$= MR2R(246)$
$= MR2R((2*11*13)+(4*11)+6) = 336$
$= \{0,0,1,0.6,11,13,13\} = 0.8$
$= 336/420 = 0.8$

Figure 3e

|   | Reset (1560) | Trunc-Ena (1561) | MODULUS (177147) 2B3FB (1562) | | Product (1563) | Modular Product (1564) | Modular Sum (1565) | Accumulator Acc: (1566) |
|---|---|---|---|---|---|---|---|---|
|   |   |   | Digit A | Digit B |   |   |   |   |
| Row 1567 | 0 | 0 | 0 | 0 | 0 | 0 | 0 | 0 |
| Row 1568 | 0 | 1 | 2B3CC | 2B013 | 743679824 | B798 | B798 | 61F8E |
| Row 1569 | 0 | 1 | 23ECB | 1A28B | 3ABBF8E39 | 18486 | 23C1E | 6580F |
| Row 1570 | 0 | 1 | 2B397 | 2B3F1 | 74D4BA627 | 3E8 | 24006 | 90FF2 |
| Row 1571 | 0 | 1 | 2B3FA | 2B3F5 | 74E620C42 | 6 | 2400C | 25BFD |
| Row 1572 | 0 | 0 | 1F0AB | 217BB | 40F6029E9 | 2882 | 2688E | A847F |
| Row 1573 | 0 | 0 | 2B3FB | 1F0AB | 53E8488A9 | 0 | 2688E | FEC75 |
| Row 1574 | 1 | 0 | 0 | 0 | 0 | 0 | 0 | 0 |

Figure 15b

Intermediate product: $8954560352205792624479_{10}$

| Stage | $R_1$ $a_1$ | $R_2$ $a_2$ | $R_3$ $a_3$ | $R_4$ $a_4$ | $R_5$ $a_5$ | $R_6$ $a_6$ | $R_7$ $a_7$ | $R_8$ $a_8$ | S | C | $R_1$ | $R_2$ | $R_3$ | $R_4$ | $R_5$ | $R_6$ | $R_7$ | $R_8$ |
|---|---|---|---|---|---|---|---|---|---|---|---|---|---|---|---|---|---|---|
| Start | AAD1 | 1A00F | 129C7 | 18AD2 | 1C7BE | 16456 | 39629 | 129D1 | = | 0 | 1 | 1 | 1 | 1 | 1 | 1 | 1 | 1 |
| STAGE 1 | * | 104F6 | 25F08 | 1355C | 64F9 | 11904 | 1145D | 53C8 | > | 10000 | 8250 | 8250 | 8250 | 8250 | 8250 | 8250 | 8250 | 8250 |
| STAGE 2 | * | * | 824F | 17740 | 28DDB | 25C | 17726 | 2EC50 | > | 159FD | 3537 | AC43 | 8250 | 17741 | 19648 | 342B7 | EF5E | 29C24 |
| STAGE 3 | * | * | * | 38869 | 3885F | 38859 | 38853 | 3884D | > | 1FFEF | D70 | 178E8 | 8250 | 17741 | 28DDC | 25D | 17727 | 2EC51 |
| STAGE 4 | * | * | * | * | 1 | 1 | 1 | 1 | < | 1FFF4 | D70 | 178E8 | 8250 | 17741 | 28DDC | 25D | 17727 | 2EC51 |
| STAGE 5 | * | * | * | * | * | 0 | 0 | 0 | < | 1FFF7 | D70 | 178E8 | 8250 | 17741 | 28DDC | 25D | 17727 | 2EC51 |
| STAGE 6 | * | * | * | * | * | * | 0 | 0 | < | 1FFFA | D70 | 178E8 | 8250 | 17741 | 28DDC | 25D | 17727 | 2EC51 |
| STAGE 7 | * | * | * | * | * | * | * | 0 | < | 1FFFD | D70 | 178E8 | 8250 | 17741 | 28DDC | 25D | 17727 | 2EC51 |
| STAGE 8 | | | | | | | | | (+) | -- | -- | -- | -- | -- | -- | -- | -- | -- |
| STAGE 9 | | | | | | | | | | | D70 | 178E8 | 8250 | 17741 | 28DDC | 25D | 17727 | 2EC51 |

Figure 18f

| Stage | $R_1$ $a_1$ | $R_2$ $a_2$ | $R_3$ $a_3$ | $R_4$ $a_4$ | $R_5$ $a_5$ | $R_6$ $a_6$ | $R_7$ $a_7$ | $R_8$ $a_8$ | S | comp | $R_1$ | $R_2$ |
|---|---|---|---|---|---|---|---|---|---|---|---|---|
| Start | AAD1 | 1A00F | 129C7 | 18AD2 | 1C7BE | 16456 | 39629 | 129D1 | = | 0 | | |
| STAGE 1 | * | 104F6 | 25F08 | 1355C | 64F9 | 11904 | 1145D | 53C8 | > | 10000 | | |
| STAGE 2 | * | * | 824F | 17740 | 28DDB | 25C | 17726 | 2EC50 | > | 1FFEF | 1 | 1 |
| STAGE 3 | * | * | * | 38869 | 38885F | 38859 | 38853 | 3884D | < | 1FFEF | 8250 | 8250 |
| STAGE 4 | * | * | * | * | 1 | 1 | 1 | 1 | > | 1FFF4 | 3537 | AC43 |
| STAGE 5 | * | * | * | * | * | 0 | 0 | 0 | < | 1FFF7 | D70 | 178E8 |
| STAGE 6 | * | * | * | * | * | * | 0 | 0 | < | 1FFFA | D70 | 178E8 |
| STAGE 7 | * | * | * | * | * | * | * | 0 | < | 1FFFD | D70 | 178E8 |
| STAGE 8 | * | * | 8250 | 17741 | 28DDC | 25D | 17727 | 2EC51 | < | | D70 | 178E8 |
| STAGE 9 | * | * | 8250 | 17741 | 28DDC | 25D | 17727 | 2EC51 | (+) | | D70 | 178E8 |

Intermediate product: $8954560352205792624 79_{10}$

Figure 22b

| Stage | $R_1$ | $R_2$ | $R_3$ | $R_4$ | $R_5$ | $R_6$ | $R_7$ | $R_8$ | S | comp | $R_1$ | $R_2$ |
|---|---|---|---|---|---|---|---|---|---|---|---|---|
| | $a_1$ | $a_2$ | $a_3$ | $a_4$ | $a_5$ | $a_6$ | $a_7$ | $a_8$ | | | | |
| Start | 865C | 5FF1 | 18A34 | 2750D | 2382B | 29B99 | 69CC | 2D62A | = | 0 | | |
| STAGE 1 | * | FB09 | 54F2 | 2CA82 | 39AEF | 2E6EA | 2EB97 | 3AC32 | > | 10000 | 0 | 0 |
| STAGE 2 | * | * | 231AB | 2889E | 1720D | 3FD92 | 288CE | 113AA | < | 159FD | 1007E | 31AB |
| STAGE 3 | * | * | * | 7775 | 7789 | 7795 | 77A1 | 77AD | > | 1FFEF | D42F | 2062 |
| STAGE 4 | * | * | * | * | 3FFE7 | 3FFED | 3FFF3 | 3FFF9 | < | 1FFF4 | 912F | 2445 |
| STAGE 5 | * | * | * | * | * | 3FFEE | 3FFF4 | 3FFFA | > | 1FFF7 | B7B0 | 1171B |
| STAGE 6 | * | * | * | * | * | * | 3FFF4 | 3FFFA | > | 1FFFA | 11DBB | 56F7 |
| STAGE 7 | * | * | * | * | * | * | * | 3FFFA | > | 1FFFD | 74CF | 177BD |
| STAGE 8 | * | * | 231AB | 2889E | 1720D | 3FD92 | 288CE | 113AA | ≥ (-) | | | |
| STAGE 9 | * | * | 231AB | 2889E | 1720D | 3FD92 | 288CE | 113AA | | | 123BD | 8718 |

Intermediate product: $-8954560352205792624791_{10}$

Figure 22c

| Stage | $M_1$ $R_1$ | $M_2$ $R_2$ | $M_3$ $R_3$ | $M_4$ $R_4$ | S | C | $M_5$ $R_5$ | $M_6$ $R_6$ | $M_7$ $R_7$ | $M_8$ $R_8$ |
|---|---|---|---|---|---|---|---|---|---|---|
| Stage 1 | D70 | 178E8 | 8250 | 17741 | = | 0 | -- | -- | -- | -- |
| Stage 2 | * | 11458 | DC76 | 114DC | < | 10000 | D70 | D70 | D70 | D70 |
| Stage 3 | * | * | 8 | 8 | > | 159FD | DF43 | 2F104 | 102DC | 314AF |
| Stage 4 | * | * | * | 0 | < | 1FFEF | 28DDC | 25D | 17727 | 2EC51 |
| Stage 5 | * | * | * | * | < | | 28DDC | 25D | 17727 | 2EC51 |
| Stage 6 | * | * | * | * | | | 28DDC | 25D | 17727 | 2EC51 |

Figure 23b

| Stage | $M_1$ $R_1$ | $M_2$ $R_2$ | $M_3$ $R_3$ | $M_4$ $R_4$ | S | C | $M_5$ $R_5$ | $M_6$ $R_6$ | $M_7$ $R_7$ | $M_8$ $R_8$ | Note |
|---|---|---|---|---|---|---|---|---|---|---|---|
| Stage 1 | 123BD | 8718 | 231AB | 2889E | = | 0 | -- | -- | -- | -- | |
| Stage 2 | * | EBA7 | 1D784 | 2EB02 | > | 10000 | 123BD | 123BD | 123BD | 123BD | |
| Stage 3 | * | * | 2B3F2 | 3FFD6 | < | 159FD | 2D67C | 13114 | 38BA1 | 1E63F | |
| Stage 4 | * | * | * | 3FFDE | > | 1FFEF | DC16 | 3AF3B | 383AC | 58D9 | |
| Stage 5 | * | * | * | * | > | | 34DCA | E324 | F983 | 1829F | |
| Stage 6 | * | * | * | * | | | 2242C | 31A6E | 18F4B | 39106 | $=(R_T-R_S)$ |
|         |   |   |   |   |   |   | 1720D | 3FD92 | 288CE | 113AA | |

Figure 23c

RESIDUE NUMBER MATRIX MULTIPLIER

BACKGROUND OF THE INVENTION

1. Field of the Invention

The invention relates to matrix multipliers and in particular to a residue number matrix multiplier and methods therefor.

2. Related Art

The use of Convolutional Neural Networks (CNN's) has exploded due to emerging technologies such as autonomous vehicles and cloud-based AI. Unfortunately, the intense numerical processing demands of CNN's place heavy workload on servers using general purpose CPU and GPU technology; this translates to high power consumption and cost. Factors such as the slowing of Moore's law, the need to save power, and the ever-increasing demand for compute capability create opportunities for hardware accelerators that are streamlined to solve specific problems.

One type of circuit for AI acceleration is a so-called hardware matrix multiplier, i.e., a systolic array of multiplier-accumulators coupled to perform matrix multiplication. The advantage of the matrix multiplier is derived from the massive parallelism afforded by a two-dimensional array of processing elements and is also due to the streamlined flow of matrix data to the many processing elements.

The mapping of neural network algorithms to systolic array architectures was proposed and analyzed by S. Y. Kung and others in the early 1990's. S. Y. Kung re-formulates the retrieving phase of neural networks by mapping it to consecutive matrix multiplication interleaved with a non-linear activation function. In another adaptation, 2D-convolution used in AI pattern recognition is mapped to matrix multiplication by re-ordering input data flow.

Recently, a systolic architecture for processing CNN's called the Tensor Processing Unit (TPU) was developed by Google Inc. The TPU uses a 256×256 element matrix multiplier coupled to circuits enabling data pooling, normalization, and application of a non-linear activation function. The TPU significantly accelerates the inference phase of CNN's by supporting a minimal operand precision, but it does not support the precision required for training phases. The problem is exasperated when developing neural network weights during training phases of the CNN's, since the same TPU hardware cannot be used to train the network.

Moreover, convolution algorithms have been found to be sensitive to limited numerical precision.

From the discussion that follows, it will become apparent that the present invention addresses the deficiencies associated with the prior art while providing numerous additional advantages and benefits not contemplated or possible with prior art constructions

SUMMARY OF THE INVENTION

Arithmetic circuits and methods that perform efficient matrix multiplication for hardware acceleration of neural networks, machine learning, web search and other applications are disclosed herein. A two-dimensional systolic array of multiplier-accumulators may be coupled to form a matrix multiplier which processes data using high precision, fixed point residue number arithmetic.

Nicknamed RNS TPU, the matrix multiplier takes advantage of carry-free RNS arithmetic for processing of dot products. As a result, the circuit is partitioned so each RNS digit is processed using a dedicated matrix multiplier unit. By operating a sufficient number of digit matrix multipliers in parallel, a suitable RNS word size is realized. After dot product summation is complete, the RNS TPU transfers each summation to a word normalization pipeline unit, wherein all digits of the RNS word are processed together. The systolic architecture favors a small RNS digit bit-width, so each digit matrix multiplier is realized in minimal IC area, using fast adders and multipliers. These features and others result in greater speed and efficiency especially as arithmetic precision is increased.

Using an FPGA based implementation and analysis, the RNS TPU performs matrix multiplication of 32.32 fixed point arithmetic 7 to 9 times more efficiently than a binary matrix multiplier provided the dimension of the matrices multiplied are sufficiently large. This FPGA based implementation uses 18-bit wide RNS digits and is introduced in this specification as a working example. It is anticipated that reduction of the RNS encoding width to 7-bits and adoption of ASIC technology will result in significantly higher efficiency of the order of 25 to 80 times higher than an equivalent high-precision binary format using similar technologies and standard design layout.

To further increase efficiency and precision, a matrix multiplier of the present invention is disclosed which operates using the residue number system (RNS). Traditional motivations to use RNS include exploiting carry-free properties and decreased power consumption. But new motivations have recently emerged, including a "true" fixed point RNS arithmetic that enables efficient processing of fractional product summations, i.e., the most common operation in AI.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views

FIG. 3b illustrates exemplary RNS fixed-point values in decimal notation;

FIG. 3d illustrates exemplary RNS moduli sets;

FIG. 3e illustrates an example of RNS fixed-point multiplication;

FIG. 15b illustrates exemplary modular product summation data;

FIG. 18f illustrates exemplary product normalization data;

FIG. 22b is a block diagram of an exemplary arithmetic positive value product normalization pipeline;

FIG. 22c is a block diagram of an exemplary arithmetic negative value product normalization pipeline;

FIG. 23b is a block diagram of an exemplary arithmetic positive value base extend pipeline;

FIG. 23c is a block diagram of an exemplary arithmetic negative value base extend pipeline;

DETAILED DESCRIPTION OF THE INVENTION

Figure 1:
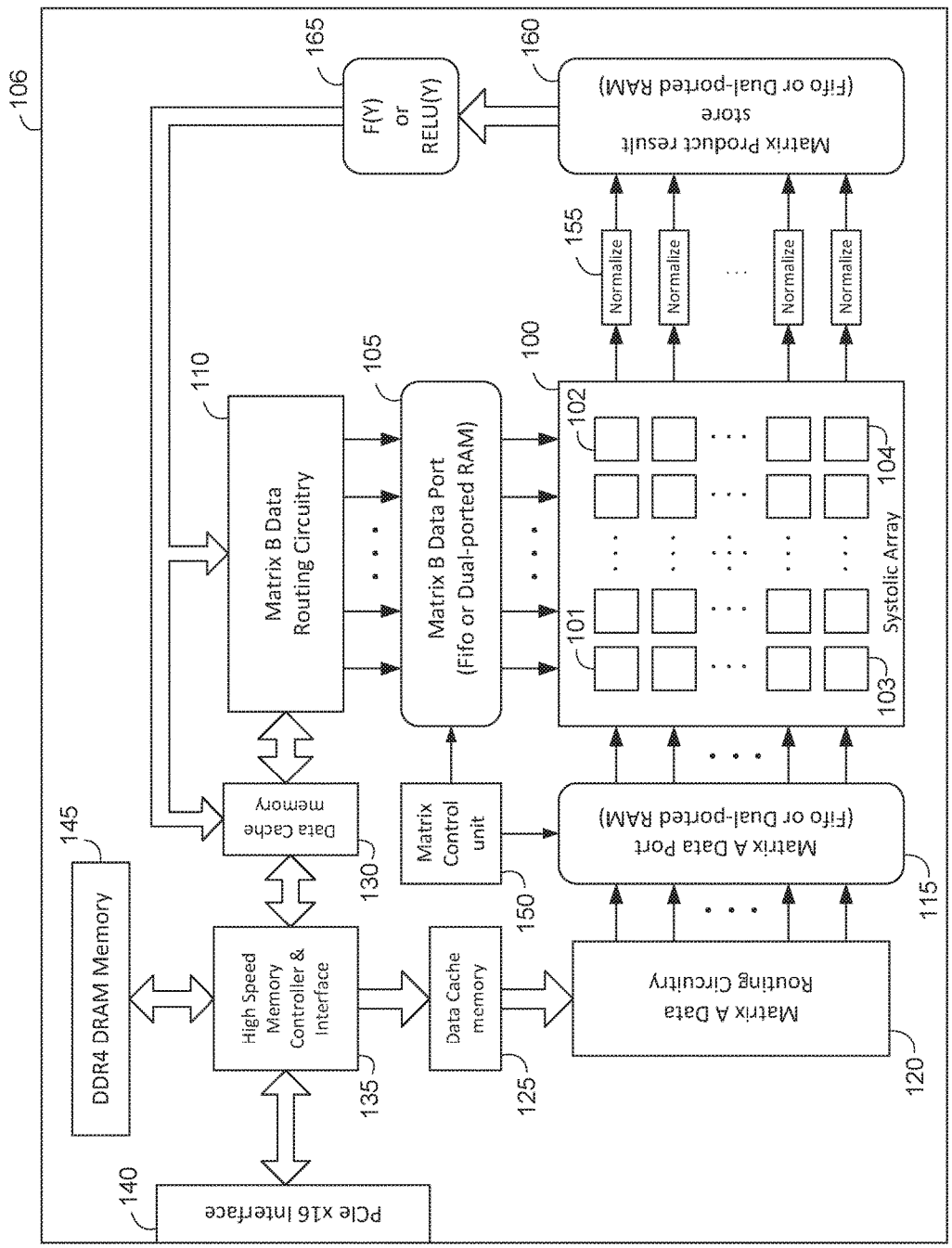
FIG. 1 is a block diagram of an exemplary systolic matrix multiplier implemented using binary arithmetic.

This disclosure introduces a new and novel approach to implementing high precision arithmetic for matrix multiplication which uses residue number arithmetic instead of binary arithmetic. The residue number system (RNS) used is a carry free number system that supports signed fixed point numbers; this new version of RNS was disclosed in U.S. Pat. No. 9,081,608.

A unique property of RNS provides an opportunity to organize the matrix multiplier into separate digit slices. Each digit slice supports its own matrix multiplier unit, called a digit matrix multiplier. A complete RNS word is processed by operating a plurality of digit matrix multipliers in parallel. Because the width of each RNS digit is comparatively small, each digit matrix multiplier is optimized to be fast, efficient and consume less circuit area. By operating a plurality of efficient digit matrix multipliers in parallel, a high precision matrix multiplier is realized. Of important note is that increasing the precision of the matrix multiplier does not slow the circuit, since there is no carry between digits during the product summation operation due to the use of RNS.

Another major advantage of the RNS matrix multiplier is that multiplier resources grow in a linear manner with respect to increasing data precision (in bits). In contrast, binary multiplier resources grow geometrically with respect to increasing bit precision. Therefore, as target precision is increased, there is a point when the RNS matrix multiplier is more efficient than a binary matrix multiplier. Viewed in another way, greater efficiency can be realized by choosing a smaller RNS digit width for most applications. Changing the RNS digit width and number of RNS digits allows the RNS matrix multiplier to be tuned for a particular performance and precision. This means the RNS matrix multiplier can be implemented with less circuitry, operate with less power, and yet operate at much higher speed than a matrix multiplier employing binary arithmetic of the same approximate data precision. In existing tests, the RNS TPU is shown to be as much as 10 to 25 times more efficient than binary arithmetic at high precision.

Furthermore, this patent disclosure introduces several new advances in RNS circuit design which facilitate high speed general purpose computation in RNS. These advances are reflected in specific apparatus that comprise preferred solutions to the matrix multiplier of the present invention. One such advancement is the use of "congruent modular arithmetic". This advancement makes use of the fact that residue digit values are often derived from the output of multipliers having twice the number of bits. In the prior art, it is often deemed necessary to decompose or reduce the multiplier output to a residue digit value of "legal range" by taking a complete MOD function of the multiplier output. In one preferred embodiment of the present invention, the output of a binary multiplier is not decomposed entirely but is only reduced to a value congruent to the correct modular result. The full modular result is thus delayed as long as practical. This technique has a dramatic effect on the speed and efficiency of RNS circuits, especially for high performance multiply-accumulate processing. In several preferred embodiments, the width of the congruent digit result will only be a few bits wider than the fully reduced residue digit. Therefore, there is enough reduction to maintain the efficiency of small RNS digit precision while at the same time eliminates a final MOD operation which saves circuitry and several pipeline stages.

Moreover, the present invention discloses new techniques and associated circuitry providing for high speed modular accumulation. In this novel approach, modular accumulation is sped up by accumulating a value congruent to the modular summation. This is particularly important if the width of the residue digit is relatively large, which allows supporting much higher precision using less number of RNS digits. This novel and unique invention allows a single residue digit accumulator to be pipelined like a standard binary accumulator, resulting in very high-speed operation. This is not possible or at least very difficult with prior art modular accumulators since the full MOD function inhibits or restricts pipelining of the accumulator loop.

Another new advancement disclosed herein is the design of fully pipelined normalization and conversion circuits. The new pipelined normalization units use less than 30% of the resource of the prior normalization designs. Moreover, the use of advanced normalization pipelines reduces or eliminates any need to support sign bits, i.e., sign magnitude notation in RNS.

Another advancement disclosed is the method of truncating RNS data for storage of results, and base extending stored RNS data to a fully extended state prior to processing to reduce memory access and storage costs.

Another advantage of the RNS matrix multiplier is in the application of Web Search. In some search algorithms, a rating to the importance of a web site is used to list search results. To find this rating, a transition probability matrix is built from the hyper-link structure of the web and is used to rank web sites using the relationship of the probability of surfing from any given web node to any other web node. One such popular search algorithm is called "Page Rank". Page Rank applies the power method, which requires vector multiplication of each row of a probability matrix to the page rank vector.

Because page rank iterations can be processed similar to matrix multiplication, a specially modified RNS matrix multiplier (systolic architecture with stationary product summation) is devised to converge the page rank vector using RNS calculations. In this special modification, the RNS matrix multiplier product normalization pipelines are modified to integrate the page rank recursive formula, thereby efficiently updating the page rank vector without a full multiply for each element. The multiply of the constant 0.85 is replaced with a suitable quick divide (by modulus factor) and then quick multiply of constant factor implementing the desired ratio of "0.85". The systolic architecture also addresses the issue of huge data sets by managing final summation of partial product summations in hardware. There are many advantages of this arrangement including speed, efficiency, and high accuracy. In addition, because RNS data can be separated into digits, and each digit can be operated on independently during the process of product summation, this allows the storage of the page rank vector to be efficiently partitioned into multiple memories. This provides a means to store a larger page rank vector into multiple memory banks, each memory bank directly connected to a product summation apparatus.

Another advantage of the RNS matrix multiplier of the present invention is its very high numerical accuracy for matrix multiplication. During processing of RNS product summations of fixed-point data, the entire word size of the RNS value is used since there is no penalty of carry and since overflow would result otherwise. Moreover, there is incentive to accumulate the full word size of non-normalized products because the cost of normalizing each product in RNS is high, therefore, product normalization is delayed until after product summation is complete according to equation (16). As a result, there is no loss of accuracy until the final step of normalization, which is applied only once after all product summation is complete (dot products are processed).

A floating-point unit cannot emulate the precision of the RNS matrix multiplier because it cannot operate without loss of precision since the floating-point unit does not store or operate on non-normalized values; instead, the floating point unit normalizes on each product multiply thereby resulting loss of precision.

A matrix multiplier implemented using fixed-point or floating-point binary arithmetic may be forced to normalize or round up for each product or for each summation, or both, since the cost of carry delays, partial product summation and high resource requirements of accumulating double-width binary products is high. In the case of binary arithmetic, there is significant loss of information due to truncation and rounding error since truncation results in every multiply or summation operation. In contrast, RNS matrix multiplication performs zero truncation during product summation, and is fast, efficient, and highly accurate.

Another significant advantage of the RNS TPU of the present invention is the high-speed operation resulting from the reduced digit encoding width of RNS, and lack of carry from digit-to-digit in RNS arithmetic. Because RNS digit encoding width is very small, say of the order of 7 to 8 bits in some cases, it follows that RNS operand buses, multipliers, reduction units and modular accumulators also shrink, and this affects the internal operation of the matrix multiplier array 400 of FIG. 4 since signal paths within the array are much shorter as well. The methods and inventions disclosed herein provide further means to enhance RNS speed by pipelined modular accumulation using advanced techniques disclosed herein. Therefore, digit encoding width is not only small in RNS, but may be further reduced by partitioning the digit accumulator into a plurality of smaller accumulation stages cascaded in time for highest speed possible.

Another significant advantage of the RNS TPU of the present invention is the low-power operation resulting from the high-efficiency of RNS arithmetic. One reason this is justified is that RNS matrix multiplication requires a linear increase in unit resources as arithmetic precision is increased; on the other hand, a conventional matrix multiplier comprising binary arithmetic, such as floating-point arithmetic, will require a square increase in multiplier resources as the arithmetic precision is increased. This precision tradeoff can be controlled in RNS by selecting a suitable modulus set for a given application and ensuring the ratio of RNS multiplier resources to equivalent binary multiplier resources is minimized, all else being equal. Low multiplier resource efficiency coupled with slow speed and low precision places the matrix multiplier based on binary arithmetic at a significant disadvantage to the performance, precision and efficiency of a matrix multiplier based on RNS fixed-point arithmetic.

The subject of the present invention is a hardware-based matrix multiplier which uses residue number arithmetic for its processing. Such hardware matrix multipliers are known in the prior art as highly pipelined systolic architectures since many hardware processing elements are tightly interconnected enabling efficient flow of data and highly parallel processing. In the prior art, binary fixed point or floating-point arithmetic units are commonly used to implement a matrix multiplier since binary arithmetic is a standard, nearly universal solution for machine computation.

However, a new alternative to binary arithmetic has recently emerged which is based on an improved version of the residue number system (RNS). The new arithmetic allows continuous processing of fractional data values in RNS format while preserving the carry free properties of integer RNS arithmetic. The new RNS arithmetic was first introduced in U.S. Pat. No. 9,081,608 and is referred to as "modular computation in RNS" in the present disclosure. The present invention discloses a unique approach to matrix multiplier design by using modular computation in RNS to implement matrix multiplication. The primary computation required is fractional product summation to process each matrix dot product; therefore, modular computation in RNS appears ideally suited for this task.

In one high performance design, a square matrix of multiplier-accumulators is interconnected to process matrix multiplication so that each multiply-accumulate element solves the dot product corresponding to its position. When using binary arithmetic circuits, each multiplier-accumulator must be completely located within the matrix position so that carry is easily accommodated during accumulation. However, with RNS arithmetic, each RNS digit is processed using a high speed modular accumulator which "accumulates" without generating carry to another RNS digit. Therefore, RNS digits may be separated and their corresponding circuits may be isolated from each other. This means each RNS digit sub-system is relatively small, and more efficient than a larger binary circuit which cannot be so organized.

One novel and unique circuit element disclosed in the present invention speeds up modular accumulation by operating on values which are congruent to a "fully" reduced RNS digit result. By so doing, a running MOD function is implemented which is fast, and allows the modular accumulator to be pipelined in the same manner as binary accumulators. This novel circuit has implications, as it changes the nature of both RNS multiplier and RNS accumulator arithmetic, and furthermore reduces hardware requirements and provides for faster operation than prior art RNS methods.

The matrix multiplier of the present invention may exist in many different forms and be integrated into various processing systems. For example, the matrix multiplier of the present invention can be implemented as an arithmetic sub-system in custom and semi-custom ICs; in this case, the matrix multiplier provides on-chip acceleration of matrix multiplication for CPU's and GPU's. Alternatively, the matrix multiplier of the present invention can be implemented as an "accelerator card" typically housed within a rack mount chassis and suitably connected to other servers and computers which utilize the accelerator card's functions. The matrix multiplier may be implemented as a hard resource within IC's or may also be implemented within one or more FPGA's as a soft configurable system. It should be clear to those skilled in the art of computer design that the invention of the present disclosure can be implemented in different ways, with different technologies, and may be applied to a wide range of applications and problems.

The disclosure will also briefly discuss the problems and issues of implementing a hardware matrix multiplier using binary arithmetic to illustrate and contrast the operation of the RNS matrix multiplier against known prior art.

To be concise, the present invention is disclosed using illustrations of only one preferred embodiment, which includes the matrix multiplier as a component within an accelerator card application as shown in the block diagram of FIG. 1. For example, the accelerator card of FIG. 1 can be used to accelerate the inference phase of convolutional neural networks (CNN). In this embodiment, a hardware matrix multiplier 100 of the present invention is shown as a principal component of a neural network accelerator card 106. The accelerator card supports typical interfaces such as a PCIe bus interface 140, and typical DRAM memory interface 135 and DDR4 memory bank(s) 145.

Detailed description of the many operations present and required on an accelerator card 106 of FIG. 1 is not necessary, as these details are well known to those skilled in the art of computer design. However, a basic overview of the general operations of each component is provided for clarity.

One general aim of the circuitry of accelerator card 106 of FIG. 1 is to maintain a constant, high rate of matrix data flow to the hardware matrix multiplier 100. A host computer, not shown in FIG. 1, is responsible for issuing commands to the accelerator card via PCIe bus interface 140. For example, accelerator card commands may instruct the hardware matrix multiplier 100 to multiply two matrices in memory. In one embodiment, accelerator card commands and instructions are stored in DDR4 memory system 145 and directly transferred and executed in the matrix control unit 150.

Central to the accelerator card is the hardware matrix multiplier 100 which in one embodiment consists of a two-dimensional array of multiplier-accumulator elements or processors, such as multiplier-accumulator element 101, 102, 103 and 104. In one embodiment, matrix data is fed into the hardware matrix multiplier 100 along two axis, each axis fed by an array of high speed FIFO or dual port memory 105, 115. As shown in FIG. 1, a matrix A data source 115 is fed to the rows of the matrix multiplier 100 while a matrix B data source 105 is fed to the columns of the matrix multiplier 100. To maintain high speed operation, matrix data is typically accessed from DDR4 memory 145 via high-speed memory controller interface 135. Matrix data is transferred from the DDR4 memory to its respective matrix port in one embodiment via data cache 125, 130 which is in turn coupled to its respective matrix data routing circuitry 110, 120. The data cache memory allows frequently used matrix data to be queued and stored without the need to re-access through DDR4, which can be slower than accessing cache memory.

The circuitry for the accelerator card 106 of FIG. 1 will typically include matrix routing circuitry 110, 120 to re-organize stored data delivered by each respective data cache 130, 125 to each respective matrix data port 105, 115. For instance, matrix B data routing circuit 110 will re-organize matrix data by columns and will deliver matrix data to the column-oriented matrix B data port 105. Likewise, the matrix A data routing circuits 120 will re-organize matrix data by rows and will deliver matrix data to the row-oriented matrix A data port 115. Matrix data ports 105, 115 may be comprised of suitable high-speed memory circuits, such as FIFO registers, or dual-ported RAM. Matrix control unit 150 coordinates the delivery of matrix data from matrix A data port 115 and matrix B data port 105 to the row inputs and column inputs of matrix multiplier 100 respectively.

The output of the matrix multiplier 100 is a product matrix, which in FIG. 1 is shown exiting from the right of each row of the systolic array 100 by means of illustration. The data rate of matrix products exiting the systolic array 100 may be equal to the data flow of matrix operand input, and therefore a matrix product result store 160 is needed to temporarily store output matrix data before it is transferred back to memory or back to the matrix multiplier data input. The output of the hardware matrix multiplier 100 may not be fully normalized, and therefore a global normalize pipeline circuit 155 may be present to normalize each dot product which exits a row of matrix multiplier 100. Additional normalization pipelines may be present for each additional row of the multiplier-accumulator array 100 as shown in FIG. 1. Normalized dot product values are received via pipelined normalization units, such as normalize unit 155, by the matrix product result port 160. The matrix product result store 160 will consist of suitable high-speed memory, such as high-speed FIFO register or dual-ported RAM memory. The matrix product port 160 may also include routing circuitry and other support circuitry to assist in transmission of matrix product results back into data cache memory 130 or fed back directly into matrix data routing circuitry 110 for re-processing.

A post function unit 165 may exist in the processing pipeline of the matrix multiplier to facilitate other required functions, such as matrix addition and scalar or vector matrix multiplication. The post function is typically a pipelined circuit, and more than one pipeline may be present. The post function 165 can be applied to the normalized matrix product result received from the matrix product store 160 as shown in FIG. 1. Alternatively, other special functions can be applied elsewhere using circuits and data paths not shown in FIG. 1. For neural network applications, the post function 165 incorporates a non-linear function, such as a ReLU or Sigmoid function, to facilitate the inference phase of convolutional neural network processing as suggested by Kung.

Figure 2A:
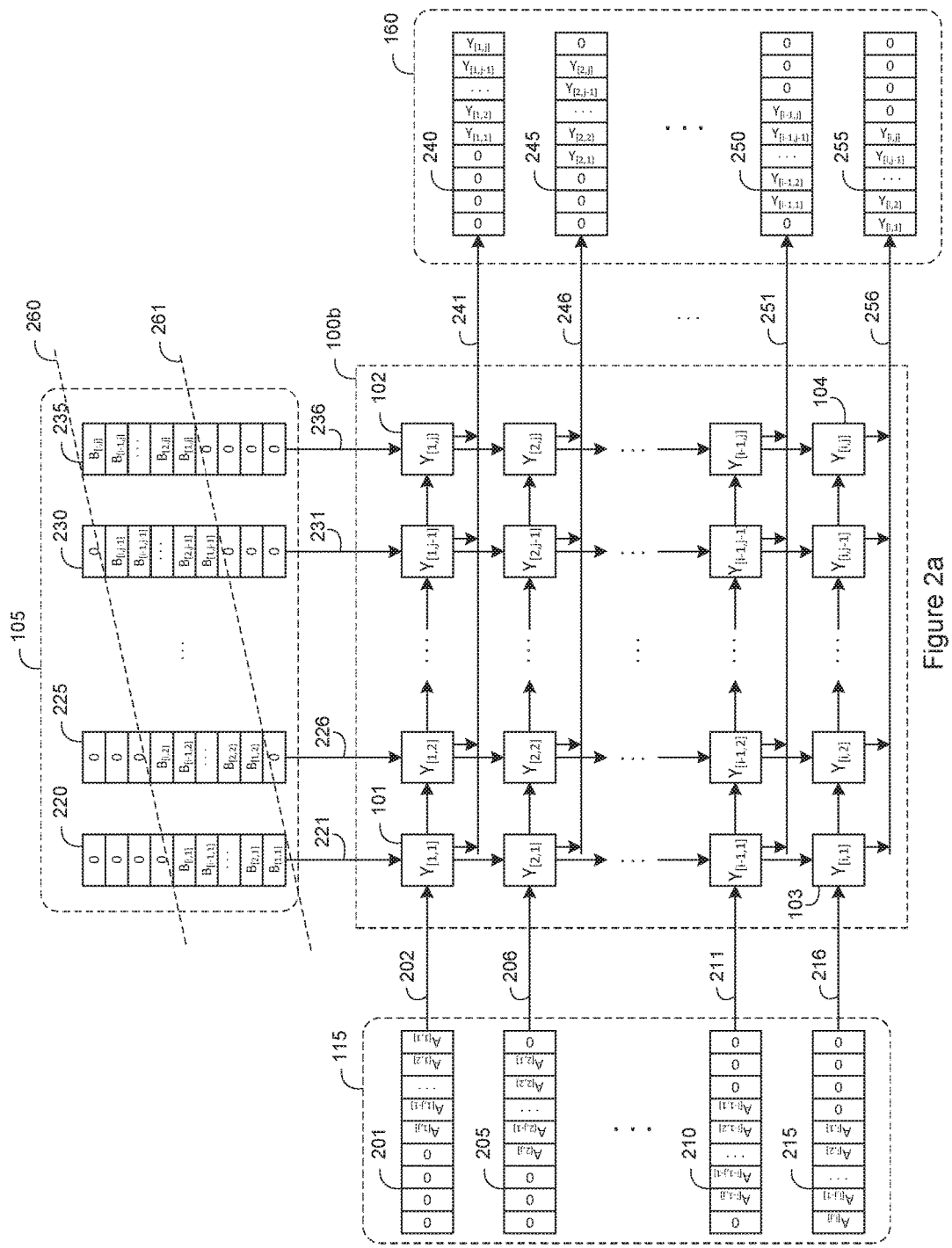
FIG. 2a is a block and flow diagram of an exemplary systolic matrix multiplier logic element.
Figure 2B:
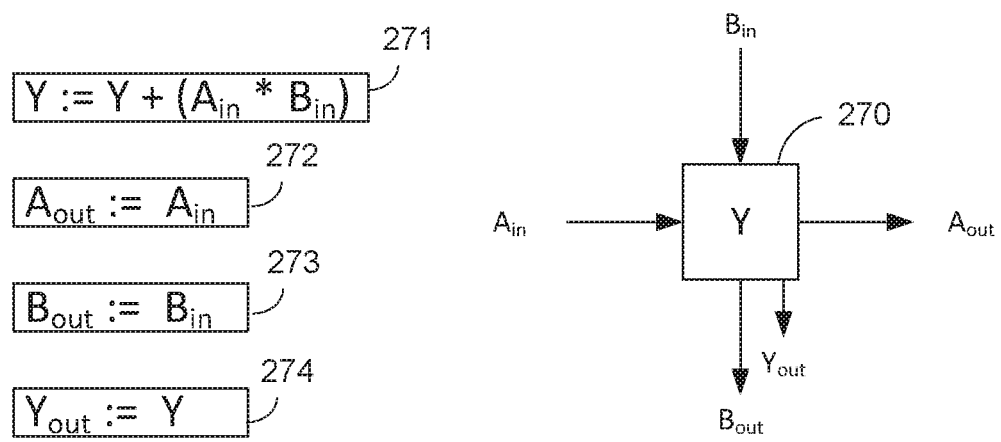
FIG. 2b is a block diagram of an exemplary multiplier-accumulator element for a systolic matrix multiplier.

FIG. 2a illustrates a diagram describing a typical two-dimensional systolic architecture suitable for matrix multiplication, i.e., a two-dimensional array 100b of multiplier-accumulator elements, such as element 101, which in a preferred embodiment of the present invention comprises the matrix multiplier 100 of FIG. 1. It is well known that other systolic architectures exist for processing of matrix multiplication. FIG. 2b shows a typical block representation of a single multiplier-accumulator element 270. The multiplier-accumulator 270 has two inputs, $A_{in}$ and $B_{in}$, which illustrate row data and column data input from a prior element, and two outputs $A_{out}$ and $B_{out}$, which illustrate data flowing out to the next row and column elements in the array respectively. FIG. 2b also shows a third output, $Y_{out}$, which is the current summation of the products of $A_{in}$ and $B_{in}$ in the prior clock cycle.

In FIG. 2b, a typical multiplier-accumulator element 270 may be defined with a series of recurrence equations 271, 272, 273, 274 describing data movement between the input ports and output ports for each transition of the clock, and equation 271 relating internal state variables to their next transition state by means of an arithmetic expression. Equation 271 illustrates that element 270 stores a summation Y, and that the summation Y is updated on each clock cycle by adding the product of the inputs $A_{in}$ and $B_{in}$ to the current summation value Y. Thus, it can be easily deduced that the element 270 is indeed a multiplier-accumulator arithmetic circuit.

Some details are missing in FIG. 2b for a practical design. One such omission are the control signals needed to coordinate each element 270, i.e., such as an accumulator load function, or an accumulator clear function. Later sections of this disclosure will describe control circuits in more detail where pertinent to the subject invention, but otherwise control circuits are deemed well understood in the prior art. FIG. 2b is included to provide completeness, however, significant detail is missing, such as notation indicating pipeline delay which changes the time subscript between the input and output variables of equation 271. For example, omitted detail may include time state subscripts to indicate the number of clocks delay between summation output Y and its corresponding last data summed $A_{in}$ and $B_{in}$.

In one embodiment of the present invention illustrated by FIG. 2a, all elements comprising matrix multiplier 100b are the same multiplier-accumulator element 270 of FIG. 2b. For example, element 101 of FIG. 2a is identical to the element 270 of FIG. 2b. FIG. 2a also shows the matrix data A port 115 and the matrix B data port 105 in more detail; the matrix data ports are shown as FIFO data structures by means of example which are directly coupled to the matrix multiplier 100b. In one embodiment, as shown in FIG. 2a, the matrix data A port 115 is comprised of a series of FIFO registers 201, 205 210, 215, where each FIFO register is connected to a matrix input row by data bus 202, 206, 211, 216. Likewise, matrix data B port 105 is comprised of a series of FIFO registers 220, 225, 230, 235, where each FIFO register is connected to a matrix input column by data bus 221, 226, 231, 236.

FIG. 2a also shows more detail for the matrix product result store 160. The product result store 160 is comprised of a series of FIFO registers 240, 245, 250, 255 which each receive dot product data from a row of the matrix multiplier 100b transferred over output readout bus 241, 246, 251, 256. The output readout bus 241 is diagrammatic since there are a number of methods to implement data transfer of dot products from each multiplier-accumulator element of a matrix row. For example, semi-systolic methods exist which allow the readout bus 241 to be driven by each element output Y using tri-state logic implementations. Alternatively, systolic shift register based readout circuitry can be implemented which typically requires summations for each element Y be buffered, and then transferred to the shift register readout circuit when ready. In this case, the single line bus 241 of FIG. 2a represents a chain of parallel load shift registers.

FIG. 2a also illustrates the classic diagonal wave-front of column matrix data by dotted lines 260, 261. In fact, all matrix data is staggered in this way to facilitate the proper timing of matrix multiplication within the matrix multiplier array 100b. Matrix control unit 150 of FIG. 1 provides the control information to synchronize each successive row and column data port FIFOs 115, 105 to ensure the proper matrix data staggering for each matrix operation. Not shown in FIG. 2a are normalize pipeline units 155 of FIG. 1 for means of clarity.

Representation of Fixed-Point RNS Values

This section re-introduces the new fixed point RNS arithmetic as first disclosed in U.S. Pat. No. 9,081,608. The fixed-point RNS format is important to the underlying operation of the RNS based matrix multiplier and is therefore briefly reviewed and referred to for completeness.

A real value x is represented in RNS using the following digit nomenclature, $$x \cong Y_x = \{d_1, d_2, \ldots, d_f. d_{f+1}, d_{f+2}, \ldots, d_{f+g}\} \quad (1)$$

In this digit nomenclature, we define the modulus associated to each digit using the same subscript in (1) as, $$\{m_1, m_2, \ldots, m_f. m_{f+1}, m_{f+2}, \ldots, m_{f+g}\} \quad (2)$$

The new nomenclature includes a period which defines two groups of moduli, one group defining a fractional range $R_F$, the other a whole number range $R_W$. The period has no other significance, and may treated as a comma; therefore, the value in (1) is treated as a single residue value. Both digits and modulus are positive integers; see prior art for information regarding standard integer RNS operations and definitions.

The total range $R_T$ for a fixed-point residue number system is the product of all modulus, $$R_T = m_1 * m_2 * \ldots * m_f * m_{f+1} * \ldots * m_{f+g} \quad (3)$$

The fractional range $R_F$ is defined as the product of the first F number of modulus, $$R_F = m_1 * m_2 * \ldots * m_f \quad (4)$$

The whole number range $R_W$ is the product of the last N number of modulus, $$R_W = m_{F+1} * m_{F+2} * \ldots * m_{F+N} \quad (5a)$$

Some operations in RNS require an extended machine word Y; thus, the digits associated to the whole number range $R_W$ of equation (5a) may be partitioned into a group of digits representing an integer number range, $R_I$, and the remaining digits into an extended range, $R_E$, so that, $$R_W = R_I * R_E \quad (5b)$$

The integer number range, $R_I$, provides a means to define the range $R_S$ of the short RNS format word as, $$R_S = R_F * R_I \quad (5c)$$

Returning to equations (1), (2), (3), the total range of the RNS word Y is therefore, $$R_T = R_F * R_W \quad (6)$$

The real value x of (1) may be defined as a sum of its whole part and its fractional part, $$x = w + \frac{n}{R_F} \quad (7)$$

where w is the whole portion, and $n/R_F$ is the fractional portion of x, so that, $$\frac{n}{R_F} = x - w, \ 0 \le n < R_F \quad (8)$$

A positive real x is encoded by multiplying with the fractional range $R_F$, and truncating and rounding to the closest integer. Therefore, encoding the value x produces a machine integer Y, $$Y = \lceil x * R_F \rceil = \left\lceil \left(w + \frac{n}{R_F}\right) * R_F \right\rceil = \lceil w * R_F + n \rceil \quad (9)$$

The quantity $w*R_F$ is an integer since w and $R_F$ are integers, so that (9) reduces to, $$Y = w*R_F + \lceil n \rceil \quad (10)$$

For fixed-point representations, using equations (8), (9) and (10), the value x is encoded to a machine number $Y_x$ using, $$Y_x = w*R_F + \lceil (x-w)*R_F \rceil, 0 \le Y_x < R_T \quad (11)$$

The astute reader will notice the mathematics for encoding fixed-point RNS is like fixed-radix number systems.

Multiplication of Fixed-Point Residue Numbers

Multiplication of fixed-point RNS fractions is briefly introduced by examining the case for positive fractions. Using results of the previous section, the product of two real numbers x and y is represented in machine number notation and computed by, $$x*y \cong \frac{Y_x}{R_F} * \frac{Y_y}{R_F} = \frac{(Y_x * Y_y)/R_F}{R_F} \quad (12)$$

The numerator of the last term of equation (12) represents a normalized product result mathematically but is a rational value. The value $R_F$ in the denominators is implied by the fraction point position. Extending the machine number notation using equation (12), we define an intermediate product $Y_{IP}$ of two fixed-point RNS formats:

$$Y_{IP} = Y_x * Y_y \quad (13)$$

The intermediate product $Y_{IP}$ is obtained by performing an integer RNS multiplication, with each machine number Y treated as an integer. From equation (12), substituting $Y_{IP}$ and truncating the rational numerator to the closest integer, we have:

$$x*y \cong \frac{\lceil Y_{IP}/R_F \rceil}{R_F}, Y_x * Y_y < R_T \quad (14)$$

The ceiling bracket operator denotes the INT function with round up. Equation (15) formalizes our final fixed-point product result in terms of machine number representation $Y_R$, $$Y_R = \lceil Y_{IP}/R_F \rceil \quad (15)$$

Division by $R_F$ and the INT operation of equation (15) is the mathematics of normalization of the intermediate product $Y_{IP}$.

Summation of fixed point products of the form of equation (14) may be performed separate from normalization, and normalization may be delayed as a final operation since, $$\sum (x*y) \cong \sum \left(\frac{\lceil Y_{IP}/R_F \rceil}{R_F}\right) \cong \frac{\lceil (\sum Y_{IP})/R_F \rceil}{R_F} \quad (16)$$

Equation (16) forms the basis for why it is possible to separate matrix multiplier digits into their own digit matrix multiplier. Because integer multiplication and addition in RNS is carry free, the summation of $Y_{IP}$ may be computed without carry, with the final process of normalization, i.e., division by $R_F$ and rounding, performed in a final step as suggested by the last term of equation (16). Moreover, product summation in the last quantity of equation (16) is more accurate. The second quantity of equation (16) applies a normalization on every multiplication, but the third quantity applies a normalization only after summation, thus minimizing error due to truncation; therefore, product summation in RNS is fast and accurate.

RNS Fixed Point Multiply Procedure

A basic procedure for fixed point fractional multiply of two positive fixed-point RNS fractions is described. The first step is to multiply the fixed-point values as if they are integers according to equation (13). The next steps involve performing a division by the fractional range $R_F$ according to equation (15). One way to perform this division is to convert the intermediate product $Y_{IP}$ to a mixed-radix number $M_{IP}$, $$M_{IP} = MRC_{F,W}(Y_{IP}) \quad (17)$$

where $MRC_{F,W}( )$ denotes mixed-radix conversion, with fractional digits converted before whole digits. The last step produces a normalized RNS result $Y_R$ by first truncating fractionally associated digits of $M_{IP}$, and converting the remaining mixed-radix digits back to RNS, denoted as, $$Y_R = MR2R(\lfloor M_{IP} \rfloor^F) \quad (18)$$

The expression in the parenthesis of equation (18) denotes the value of $M_{IP}$ after truncation of fractionally associated digits (and their radices), and the function MR2R denotes conversion from mixed-radix back to residue format. Several operations are performed by equation (18), including division by $R_F$, and base extension of the result during re-conversion to RNS. Rounding of the result is performed in RNS by adding one (unit) if the truncated mixed-radix digits are equal or exceed half the fractional range $R_F$.

Fixed Point Multiply Example

An example of RNS fixed point multiplication is provided in FIG. 3e. In this example, our new fractional representation will assume the modulus:

$$m_1=4, m_2=3, m_3=5, m_4=7, m_5=11, m_6=13, m_7=17, m_8=19$$

Our fractional representation will encode the fractional portion using the first four digits, therefore, according to (4), $$R_F = 4*3*5*7 = 420 \quad (19)$$

Using (11) and our example modulus, we encode decimal values 3.2 and 0.25 and compute the product which is 0.8 as shown in the example calculation bounded by box 399 of FIG. 3e.

A generalized formulation for fixed point normalization is given by, $$Y_R = \begin{cases} MR2R(\lfloor M_{IP} \rfloor_W), & \text{if } Y_x < R_T/2 \\ \overline{MR2R(\lfloor \overline{M_{IP}} \rfloor_W)}, & \text{if } Y_x > R_T/2 \end{cases} \quad (20)$$

Figure 3A:
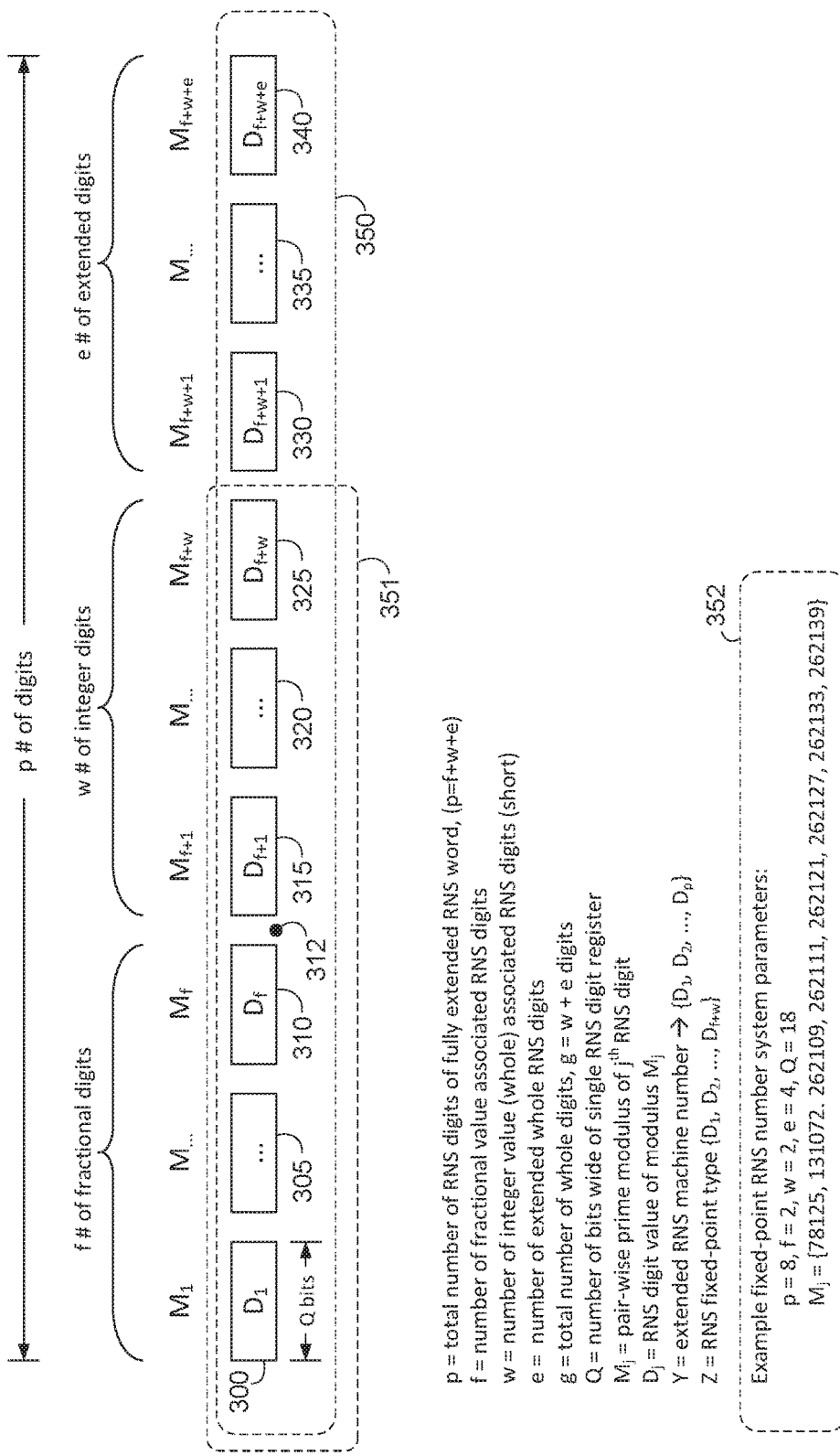
FIG. 3a illustrates a generalized RNS fixed-point number format and digit range definitions.

FIG. 3a is included to provide an overview of the new fixed-point residue format, including an example fixed-point residue machine register formats which uses 18-bit residue digits. In FIG. 3a, an RNS machine word 350 consists of a plurality of residue digits, where in one preferred embodiment each digit is stored in a digit register, such as digit register 300. For fixed-point operation of the present invention, a plurality of RNS digits 300, 305, 310 is grouped into the fractional digit group, where digit register 305 with "continuation dots" represents any number of digits, and 'f' represents the number of digits in the fractional range $R_F$ as described by equation (4). Likewise, a total of 'w' digits 315, 320, 325 is grouped into the integer number range $R_I$, and a total of 'e' digits 330, 335, 340 is grouped into an extended digits range $R_E$, wherein the product of both ranges constitutes the whole range $R_W$ as described by equations (5a) and (5b).

In one preferred embodiment, each RNS digit is encoded in a binary word of Q bits wide as illustrated by digit register $D_1$ 300 of FIG. 3a. Nomenclature typically uses $D_j$ (or $R_j$ to denote residue digit) to denote the $j^{th}$ digit value, and $M_j$ to denote the modulus of the $j^{th}$ digit. The nomenclature also uses the letter 'p' to denote the total number of digits in the machine word 350, and the variable Y represents the entire machine word 350, typically interpreted as an unsigned integer.

The RNS fixed-point type 351, denoted as Z, is defined as a subset of the overall RNS machine word 350, Y, and consists of 'w' number of digits comprising the whole number range, and 'f' number of digits comprising the fractional number range. The fixed-point type 351 represents the RNS digits which store the entire value of a single data operand. The RNS digits of the fixed-point type 351 define the fractional precision and define the overall fixed-point value range. It is acceptable terminology to describe digits assigned to the fractional digit group as "fractionally associated digits", or that such digits belong to the "fractional range". The same terminology may apply to the digits of the whole number range, as well as digits of the extended digit range as shown in FIG. 3a. The reader should note that different RNS range assignments can be defined, and different equations asserted, but these differences do not influence the underlying principles when the fractional range is comprised of a product of some number of RNS moduli as in equation (4), and that the range definitions provided in equations (3) through (6) and FIG. 3a are defined.

FIG. 3b is provided to illustrate some typical fixed-point RNS values using a sample RNS number system as defined by the parameters within dotted lines 380. In this example, p=8 and Q=18, so there are eight, eighteen-bit RNS digits total. Also, f=2 indicates there are two digits defined for the fractional range $R_F$, w=2 indicates there are 2 digits for the integer number range $R_I$, and e=4 indicates the remaining digits are assigned to the extended number range $R_E$. The modulus for the sample are listed in row 381 of the modulus column 360 of FIG. 3b. The RNS fixed-point digits for several decimal values of column 364 are indicated on the table of FIG. 3b, with the machine word Y column 362 listing the equivalent integer value of the fixed-point RNS values in Row 382 through Row 386. Using equation (11), the fixed-point decimal value "3.14159265" is encoded in table Row 382, the decimal value of "2.71828182" is encoded in the table Row 383a, and the product of these fixed-point RNS values is shown in the table Row 384a as the RNS value for the equivalent decimal value "8.53973422" in FIG. 3b.

Figure 3C:
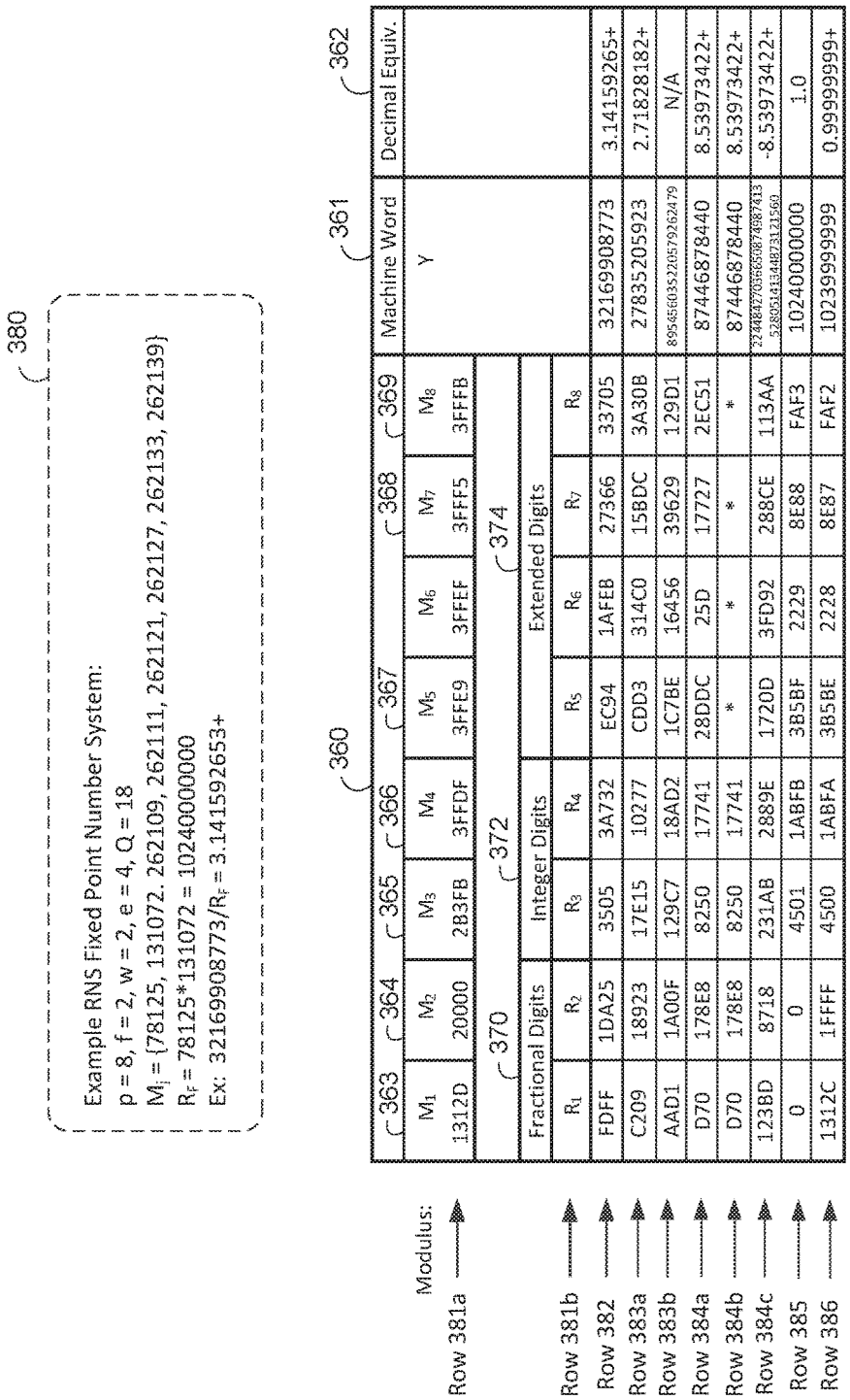
FIG. 3c illustrates exemplary RNS fixed-point values in hexa-decimal notation.

Many operations involving debugging and data dumps of complex computer systems use hexadecimal instead of decimal for the listing and printing of residue digits. Therefore, FIG. 3c is provided which lists the hexadecimal equivalents for the decimal residue digit values 370, 372, 374 in FIG. 3b. In the many data listing of example apparatus to follow, the data values listed in the table of FIG. 3c is used.

In the prior art, designers of RNS circuits often take advantage of the properties of specific moduli. In some cases, the choice of modulus is so specific that the circuit and the modulus properties exploited do not work for different sets of moduli. This strategy is faulty in the sense it will likely discourage the use of RNS for general purpose computation. However, the use of specific moduli does have advantages, and should not be completely ignored in the present invention. But it is the goal of the present invention that general moduli sets be supported in most cases. This is particularly important if modular computation by RNS is to support variable word size designs, or very large word size requirements found in applications such as cryptography. By general purpose moduli sets, this disclosure is generally referring to a significant sub-set of legal moduli combinations of a given range. In other words, the design cannot guarantee that every moduli set be supported, but that a wide selection of moduli sets is supported.

FIG. 3d provides a table showing three sample moduli sets under consideration which have common properties encompassed by dotted line 390 by means of example. The common fixed-point residue number system parameters 390 are a good match for FPGA's which support embedded 18×18 bit "hard" multiplier resources. The common fixed-point RNS number system parameters 390 of FIG. 3d include eight total RNS digits, with two digits being assigned to the fractional range, two digits assigned to the whole range, and the last four digits assigned to the extended range as shown in FIG. 3a. The digit encoding width for all digits is eighteen bits by means of example. This encoding width was chosen to make efficient use of FPGA 18×18 bit multipliers for example. The example parameters 390 will be used in the continuing design example throughout the disclosure, however, it should be clear that many other RNS number system variations are possible, and that designs based on alternative moduli sets may use other resources, such as 9×9 bit embedded multiplier resources.

As stated earlier, choice of specific modulus can have an impact on the RNS system. For example, the first moduli set row 396 of FIG. 3d has specific properties since one fractional digit is a power of two, while the other fractional RNS digit is a power of five. Therefore, the RNS fractional range ($R_F$) contains powers of ten so that fractions supported by these moduli are very decimal-like. The modulus set 396 also allows easy conversion to decimal notation because of this fact. Column 392 entitled "Equiv Binary Bits" lists the effective precision of the moduli set in terms of binary bits. For example, the moduli set of row 396 supports 33.25 bits for the fractional precision, and about 35.99 bits of precision for the whole precision. The closer a given modulus is to the maximum binary value of $2^Q$, the more efficient the modulus. For example, the moduli set of Row 397 is very efficient in terms of precision (in bits), since it supports nearly the full binary fixed-point precision of 36.36 bits (denoted "35.99/35.99" in FIG. 3d).

The last moduli set of Row 398 is a pure power based RNS fixed-point number system. The advantage of the moduli set of Row 398 is its ease of divisibility using RNS integer techniques. The disadvantage is its lack of encoding efficiency as shown in Column 393 entitled "Overall Efficiency" and column 394 entitled "Format efficiency". Overall efficiency 393 provides a measure of encoding efficiency for the entire extended RNS word, whereas the format efficiency 394 provides a measure of encoding efficiency for the actual fixed-point RNS format, which is a measure using the short format range $R_f$, or the first four moduli ($M_1$ thru $M_4$) in the example configuration 390. For any given set of 'p' number of moduli $M_1$, the encoding efficiency, E, is given by:

$$E = \frac{\log_2(\prod^P M_i)}{p * Q} \tag{21}$$

In the example designs and example moduli sets disclosed herein, the moduli are listed in order of ascending value, left to right. In terms of hardware design, one advantage of this arrangement is it allows simpler implementation of mixed radix conversion, since a smaller range digit is always converted before larger RNS digit ranges, which simplifies subtractor circuitry as shown later. However, this is only a design simplification, so it is apparent other non-ordered moduli sets can be supported by the present invention. (The order of RNS digits is not particularly important, but the order of mixed-radix conversion is important.)

In summary of the overview and background, the matrix multiplier block diagram of FIG. 1 is a baseline design intended to provide context for the invention at hand. Moreover, the block diagram of FIG. 1 represents basic functions of a matrix multiplier but does not show details of the underlying arithmetic. The systolic array of FIG. 2a is known in the prior art and is included to highlight the systolic architecture in the context of a high-speed matrix multiplier of the present invention. Equations (1) through (19) are relatively new disclosures from U.S. Pat. No. 9,081,608, they illustrate basic mathematics for positive fixed-point RNS. Negative number encoding will be discussed later when pertinent to the invention details. FIGS. 3a, 3b, and 3c provide sample fixed-point RNS register formats, sample RNS value encodings and example RNS number system moduli sets. Next, the disclosure will disclose the present invention, and highlight key differences of the present invention versus the known prior art.

Description of Typical Apparatus of Invention

Figure 4:
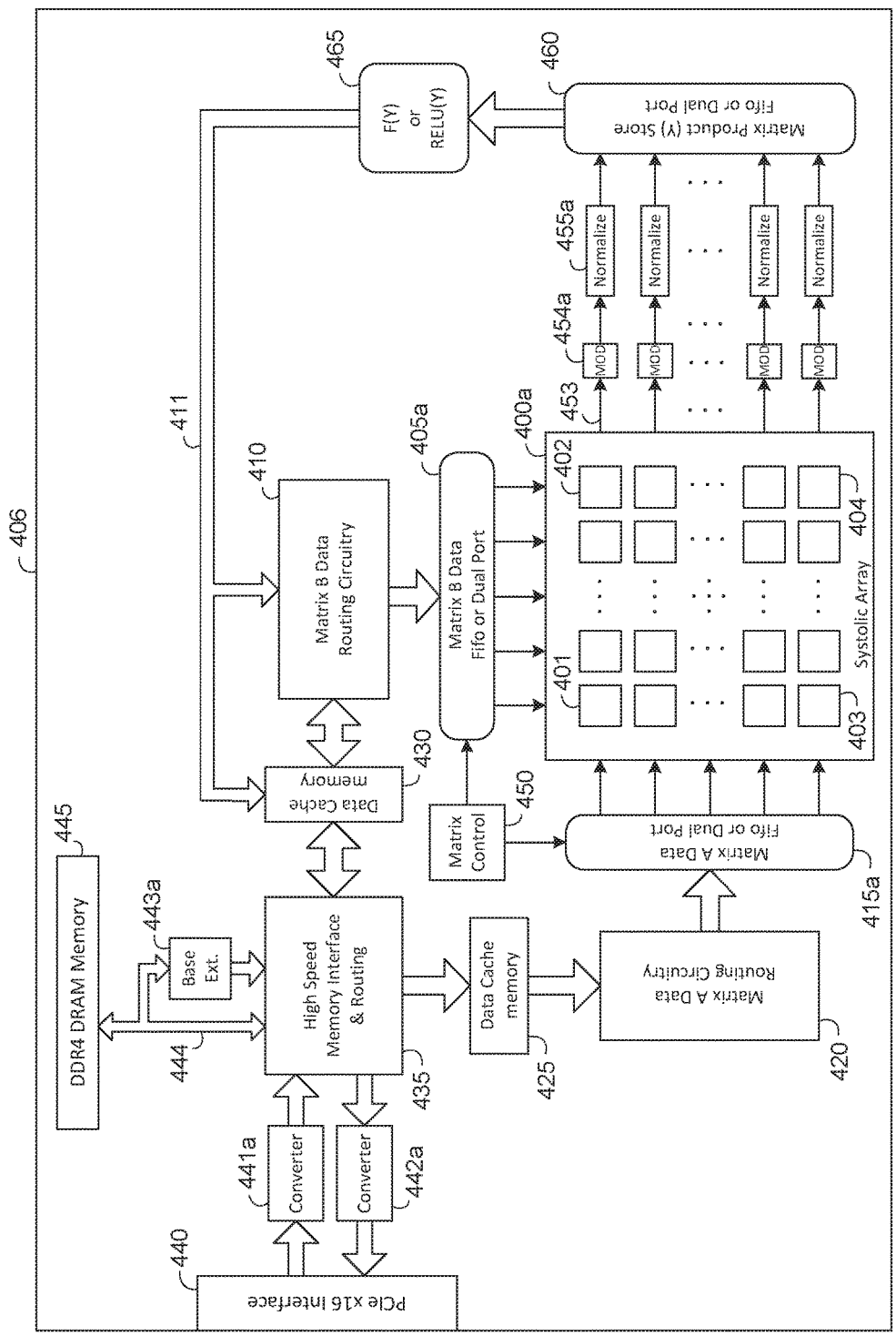
FIG. 4 is a block diagram of an exemplary RNS matrix multiplier in a TPU accelerator card application.

FIG. 4 shows a block diagram for a matrix multiplier which is similar in application to the matrix multiplier of FIG. 1, i.e., a matrix multiplier as part of a neural-network PCIe card accelerator. However, in FIG. 4, some details specific to the present invention are disclosed. It should be noted that many common functional details of FIG. 4 are for example only, as FIG. 4 is provided to clearly describe pertinent aspects of the invention at hand. For example, another embodiment will include a high-speed fiber network connection, such as 10-Gigabit Ethernet, implemented independently or in conjunction with a high speed PCIe interface 440 for transferring information into and out of the accelerator card 406. Variations of the block diagram of FIG. 4 are well known to those skilled in the art of accelerator card design and are not discussed in detail so as to focus on the inventions pertinent of this disclosure.

In FIG. 4, a systolic array of multiplier-accumulators 400a performs high-speed matrix multiplication of fixed-point RNS values received from matrix A data port 415a and matrix B data port 405a. In one systolic embodiment, the product of two matrices is computed with their row and column data staggered in a diagonal wave front pattern as illustrated in FIG. 2a by dotted lines 260, 261. Product matrices exit the systolic array 400a from each row path, such as the first matrix-row path 453, as non-normalized dot products. In one embodiment, the non-normalized dot-products are passed through a pipelined MOD function 454a, which is required to reduce the congruent value of RNS digits to a fully modular value before being passed to a word normalization pipeline 455a.

It should be noted the MOD function 455a is not required if the output of the multiplier-accumulators of the systolic array 400a produce RNS digits in legal range, i.e., a "fully" reduced modular value less than the modulus. However, one problem with modular computation in RNS is that "ideal" modular multipliers and accumulators seldom exist in practice, so that prior art modular circuits are typically comprised of binary arithmetic, comparator and other logic circuits. A problem results since modular circuits comprised of binary arithmetic and logic circuits tend to operate more slowly than binary arithmetic circuits alone, and of the same precision (bit width). In contrast, methods disclosed herein for implementing high-speed modular arithmetic rely on novel techniques which do not, by design, fully reduce RNS digits until absolutely required. These novel techniques result in faster operation and require less circuitry than circuits producing fully modular results. More about these novel techniques are introduced later.

For high speed designs, every row output of the systolic array 400a will support a separate MOD function and normalize pipeline in hardware. However, it is possible that less number, or more number, of MOD and normalize pipeline units be implemented depending on the needs of the application. Also, different systolic architectures can be supported by the present invention, however, the present invention primarily focuses on those systolic architectures which provide for a stationary accumulation result Y 271 of FIG. 2b.

In FIG. 4, a fully normalized matrix product is transmitted from the normalization pipelines, such as normalize pipeline 455a, to the matrix product store 460. In one embodiment for neural network acceleration, the matrix product store 460 includes data routing circuitry to stage and route matrix product data to a non-linear RELU function pipeline unit 465 before the result matrix is passed back to the matrix data routing circuitry 410 for re-processing. For web search applications, such as a hardware accelerator card for accelerating the Page-rank algorithm, the matrix product store 460 routes the product result matrix to a vector accumulator unit 465 to update the next page rank vector for the next iteration of the page rank formula. In this application, a fully or partially accumulated page rank vector is accumulated by vector accumulator 465 and can be transmitted back to memory 445 for storage until needed.

Another novel and unique feature of the RNS matrix multiplier of the present invention is the forward converter pipeline unit 441a and reverse converter pipeline unit 442a. FIG. 4 shows the conversion pipelines 441a, 442a exist in the path between the PCIe bus interface 440 and the high-speed memory interface 435 by means of example. In this example design, binary formatted data, such as double precision floating-point values, are transmitted from the PCIe interface 440 to the pipelined binary to RNS converter 441a. The binary to RNS "forward" converter 441a translates the value of a floating-point number into an RNS value comprising four digits if using the example RNS encoding of FIG. 3b. The high-speed memory interface 435 and other control circuits not shown transfer converted RNS values from forward converter 441a to DDR memory 445 using data path 444 as shown in FIG. 4.

In general, binary values are converted to their minimum size RNS digit format in one preferred embodiment of the present invention. This is preferred since a high efficiency design demands that storage requirements of RNS values be minimized, i.e., so they closely approximate the storage costs of the binary source format, which is double floating-point in one example. In other words, it is an objective of the current invention to store RNS matrix data in its "non-extended" short format to save storage and power whenever possible and feasible.

In the design of FIG. 4, non-extended RNS data is stored in DDR4 memory 445, while fully extended data is stored "internally" in data caches 425, 430. When RNS data is accessed from DDR4 memory 445, it is passed through base extension unit 443a before being routed to data cache memory 430. Assuming the RNS fixed-point encoding of FIG. 3b, the RNS data accessed from DDR4 memory 445 is four digits wide; after the RNS value exits the base extension pipeline 443a it will be eight digits wide. The extended digits are known to be "redundant", and do not affect the value of the fixed-point operand. When data is read from DDR memory 445 for matrix multiplication, the extended digits of FIG. 3b are added by the base extension unit 443a when the basic data type format 351 is accessed from DDR4 memory 445, resulting is a fully extended RNS word format Y 350. If fixed point RNS data types 351 of FIG. 3a are read from DDR memory 445 for transferring data to a host system, the fixed-point RNS data type may be transferred directly using data path 444 without being processed by base extension unit 443a. In this case, the short fixed-point RNS data type 351 of FIG. 3a is passed through reverse converter 442a to convert the RNS value to a corresponding binary or floating-point format before being transmitted to the host system via the PCIe bus interface 440.

In the block diagram of FIG. 4, forward and reverse converter pipelines 441a, 442a are simply shown as a block symbol. However, various forward and reverse converter apparatus may be present in a typical design. For example, forward conversion pipeline 441a and reverse conversion pipeline 442a may accommodate more than one type of binary format, such as binary fixed-point format, or floating-point format. Floating point formats may include options for single precision or double precision conversion, for example. Forward converter 441a and reverse converter 442a may support more than one type of RNS fixed point RNS format as well. For example, more than one RNS fixed-point configuration may be supported, so that more than one selection of precision, or more than one choice of overall range is supported. More details as to preferred implementations of these important pipelines is provided later.

There are several advantages of the converter and base extension arrangement of FIG. 4. One advantage is it reduces memory storage and memory access power by reducing the size of the stored RNS number format. Another advantage is the reduction in the size of the conversion pipelines 441a, 442a and base extension pipeline(s) 443a, since no pipeline handles more than four digits of mixed-radix conversion in our example RNS encoding of FIG. 3b. The tradeoff incurred is that internal memory caches 425, 430 and data routing circuits 435, 410, 420 supports fully extended RNS values, i.e., an eight-digit wide RNS format 350 in the example encoding of FIG. 3b. The extended RNS word format 350 is generally required during multiplication, since the range of the non-normalized product may exceed the range of the RNS fixed-point type format 351 of FIG. 3a.

In some embodiments not shown, complex number formats are supported by pairing two RNS fixed-point types 351, i.e., a real part and a complex part. This variation affects conversion pipelines, normalization pipelines, and multiplier-accumulators among other functions and apparatus. The present disclosure focuses on signed fixed-point arithmetic to demonstrate unique and novel inventions herein; it is obvious to those skilled in the art of modular circuit design that a matrix multiplier operating on complex RNS fixed-point formats is a direct extension of the techniques and methods taught herein. It is understood that an RNS matrix multiplier of the present invention may be extended to support complex RNS fixed-point values as opposed to scalar fixed-point numbers.

Figure 5:
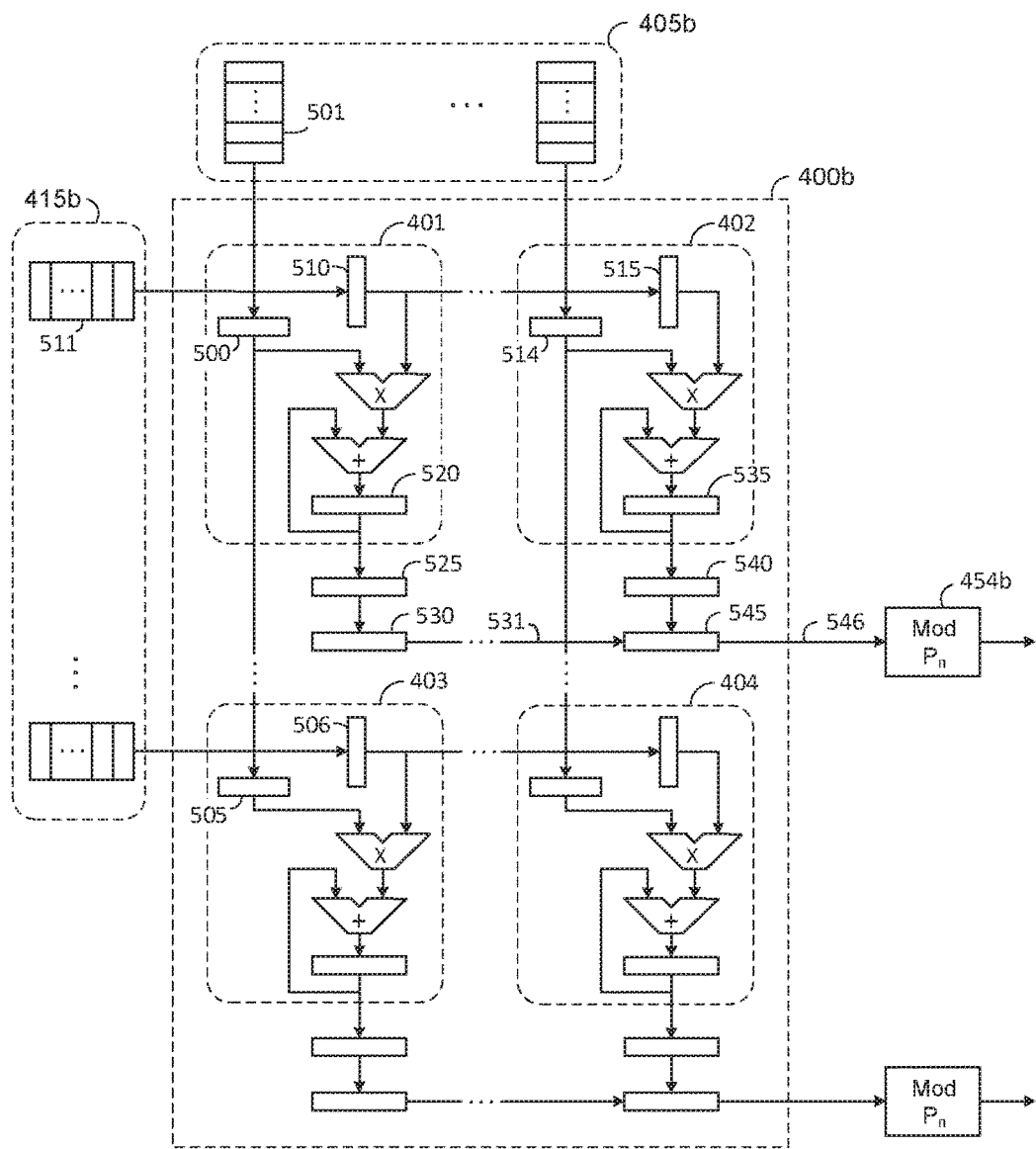
FIG. 5 is a block diagram of an exemplary 2×2 array of multiplier-accumulator elements.

FIG. 5 provides more detail to the arithmetic circuitry of the systolic matrix multiplier 400a of FIG. 4. For means of clarity, FIG. 5 illustrates a 2×2 matrix multiplier, with "continuation dots" describing any number of additional arithmetic elements, such as arithmetic element 401. FIG. 5 is provided to illustrate a basic data flow within the matrix multiplier 400a, and to suggest basic register-transfer level (RTL) design. However, it is noted that many other design techniques and technologies can be used to implement the systolic multiplier-accumulator array 400a not discussed herein. For example, semi-systolic architecture technology can replace RTL technology in the diagram of FIG. 5.

In FIG. 5, matrix data A port 415b and matrix data B port 405b is re-drawn from FIG. 4 and now details a plurality of symbols indicating register FIFOs, such as register FIFO 501. The register FIFO's of the matrix A data port 415b deliver an RNS value to the row ports 510, 506 of a plurality of processing elements 401, 403. The register FIFO's of the matrix B data port 405b deliver an RNS value to the column ports 500, 514 of a plurality of processing elements 401, 402. The output of row port register 510 of processing element 401 drives the row input 515 of the next processing element 402 of the row, assuming a 2×2 element matrix of FIG. 5. The output of column port register 500 of processing element 401 drives the input port 505 of the next column processing element 403 in succession. Therefore, matrix A and matrix B input data is transferred through the systolic array 400a, from processing element to processing element in both the row and column directions simultaneously.

In FIG. 5, control signals (not shown) control the clearing and loading of each accumulator of each processing element at the proper time, such as accumulator register 520 of processing element 401. In many designs, these control signals are implemented as systolic structures to simplify the routing of control signals to all processing elements. The output of processing elements 401, 402, 403, 404, is a product summation of some number of RNS operands delivered to their respective input ports after a clear or load operation, such as input ports 500, 510 of processing element 401. The product summation represents a non-normalized product summation in one preferred embodiment of the present invention. The non-normalized product summation contained in accumulator register 520 is transferred to a holding register 525 before being transferred to read-out register 530 in one embodiment. Therefore, a non-normalized matrix is output from some number of rows of the systolic array 400a, such as illustrated by row path 546. The row data exiting the row read-out register 545 of the matrix multiplier 400a enters a pipelined MOD function 454a in one or more embodiments, so that RNS digits are fully reduced to modular format before being transferred to a product normalization pipeline 455a of FIG. 4.

It should be clear that each row of the matrix multiplier 400a operates in a similar manner to that described above. It should be clear that the matrix multiplier 400a can be designed to provide a column result, or both a column and row result. Moreover, many timing details are not disclosed which result in special features being supported by the matrix multiplier 400a. For example, the matrix multiplier 400a of FIG. 5 can support multiplication of matrices of different sizes, or matrices with dimensions that are smaller than the dimensions of the hardware matrix 400a, or matrices with dimensions larger than the dimensions of the hardware matrix 400a. More about these variations are described later, but it is known to those skilled in the art of systolic architecture design that many variations exist in terms of supporting arithmetic and matrix operations.

Important to the invention at hand is the interpretation of the flow of RNS data through the matrix multiplier 400a, and through the arithmetic circuits of each processing element 401, 402, 403, 404 of FIG. 5. Equation (16) suggests a choice in the design of the matrix multiplier 400a and the design of the processing elements 401, 402, 403, 404 of FIG. 5. For example, the flow of RNS data from the FIFO 511 to the input row register 510 of processing element 401 may be interpreted as an RNS word, such as RNS word 350 of FIG. 3a, or may be interpreted as an RNS digit, such as RNS digit $D_1$ 300 of FIG. 3a. The interpretation of the data flow as a "word" is normal and intuitive. For example, when using binary arithmetic to implement the matrix multiplier 400a, each input data port 500, 510 is ideally the width of the binary operand, such as 32 bits for single precision floating point values. For RNS arithmetic, a preferred embodiment exists when the data flow into each data port 500, 510 is the width of a single RNS digit, or Q bits. In this preferred embodiment, the matrix multiplier 400a is referred to as a "digit matrix multiplier", and the entire structure 400a is dedicated to modular circuitry which computes "digit results" of the modulus $M_j$ of the $j^{th}$ RNS digit.

Figure 6:
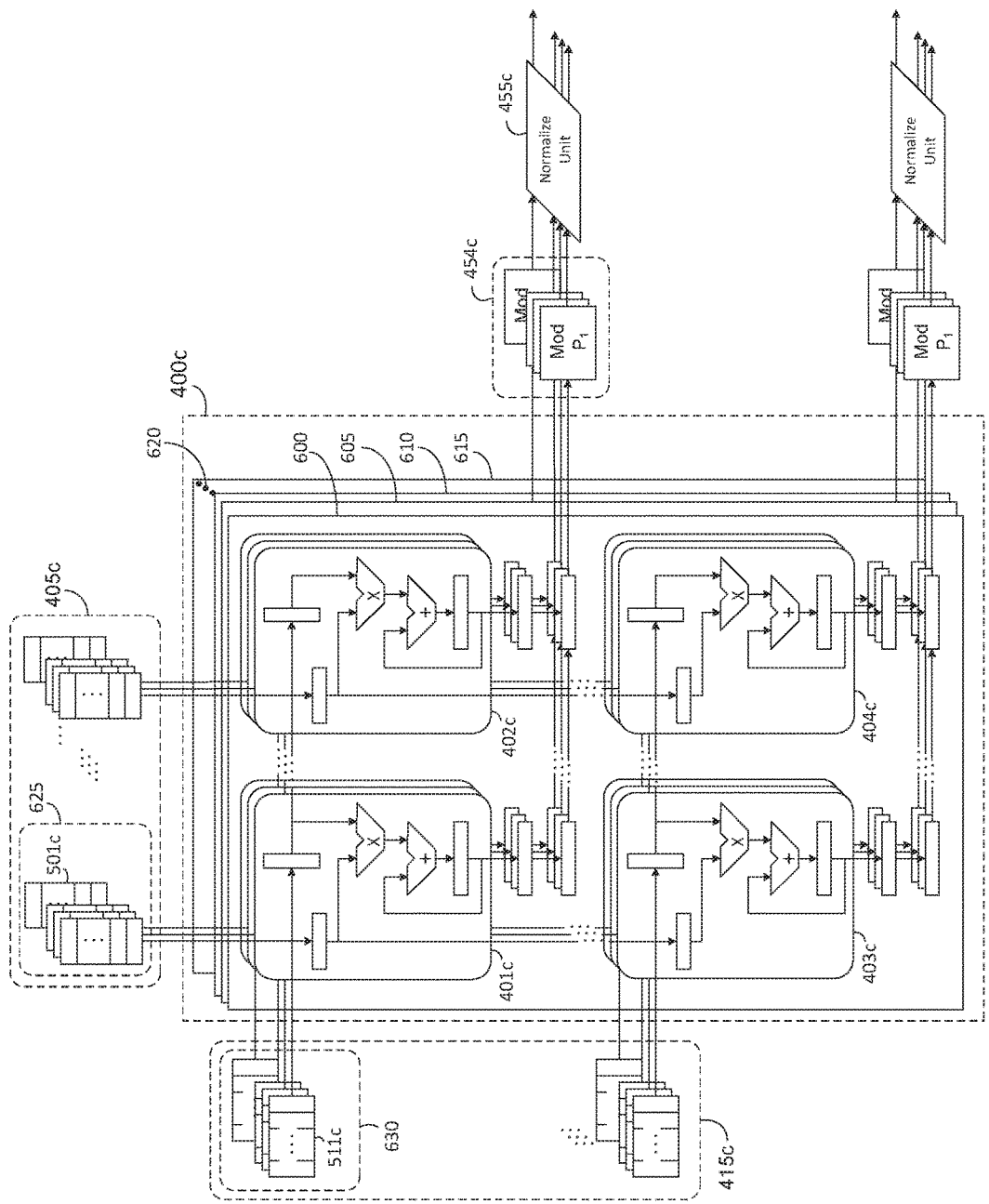
FIG. 6 is a block diagram of an exemplary matrix multiplier with plurality of digit matrix multiplier units.

FIG. 6 is provided to describe details of an RNS matrix multiplier structure wherein arithmetic is partitioned into separate and distinct RNS digit matrix multipliers. In FIG. 6, the matrix multiplier 400a of FIG. 4 is replaced with matrix multiplier 400*c* which is comprised of a plurality of digit matrix multipliers 600, 605, 610, 615, wherein each digit matrix multiplier is dedicated to a distinct modulus $M_j$ of the fixed point RNS format of FIG. 3*a*. The "continuation dots" 620 indicate that any number of digit matrix multipliers, such as digit matrix multiplier 600, are supported other than those depicted in FIG. 6. Moreover, each digit matrix multiplier 600, 605, 610, 615 of FIG. 6 is similar or identical to matrix multiplier 400*b* described in FIG. 5 wherein operand data input ports, such as input ports 500, 510, are Q bits wide, and wherein processing elements, such as processing element 401, support a single RNS digit calculation.

Matrix A data port 415*a* of FIG. 4 is replaced with matrix A data port 415*c* in FIG. 6; likewise, matrix B data port 405*a* of FIG. 4 is replaced with matrix B data port 405*c* in FIG. 6. The matrix data port shows details that are relevant to an RNS implementation. For example, the RNS word FIFO 630 is depicted as a plurality of digit FIFOs, such as digit FIFO 511*c* in FIG. 6. Each digit FIFO is partitioned according to a distinct modulus $M_j$ shown in FIG. 3*a* and is connected to its corresponding digit matrix multiplier by means of matching digit modulus $M_j$, and by its row and column location.

RNS (modular) dot products exit the matrix multiplier 400*c* and enter a plurality of pipelined MOD functions such as pipelined MOD function 454*c* in one embodiment. The MOD function 454*c* depicted in FIG. 6 shows additional detail, since this function is applied on a digit by digit basis and for a specific modulus $M_j$. Thus, the MOD function 454*c* of FIG. 6 is comprised of a plurality of pipelined MOD functions, each associated to a matching digit modulus $M_j$. Dot products exit the MOD function 454*c* and enter a normalize unit pipeline 455*c*. Note the normalize unit pipeline 455*c* is depicted as a single pipeline receiving all RNS digits of a fixed-point RNS word 350 of FIG. 3*a*. The product normalize pipeline 455*c* applies a normalization procedure mathematically like that described in equation (17) and (18). Hardware details which support mathematics of positive and negative fixed-point RNS numbers are important to the present invention and are detailed later.

The next sections disclose variations to the design of the multiplier-accumulator processing elements of the matrix multiplier 400*c*, such as the "digit" multiplier-accumulator processing element 401*c* of FIG. 6.

Matrix Multiplier Detailed Overview

Figure 7:
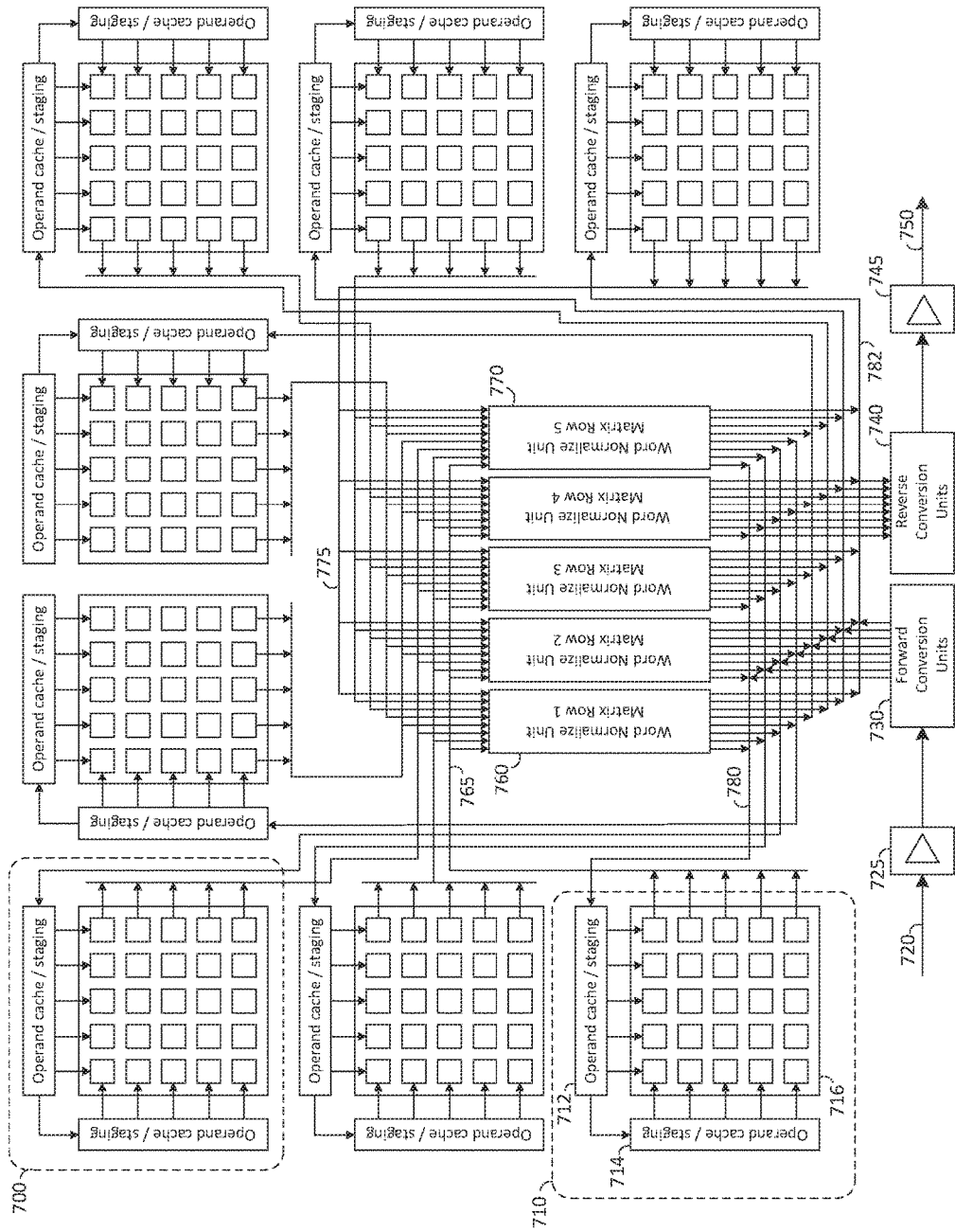
FIG. 7 is a block diagram of an exemplary RNS matrix multiplier and elements thereof.

The RNS matrix multiplier 400*c* of FIG. 6 can be drawn as a flat 2-D schematic as in FIG. 7. The RNS matrix multiplier of FIG. 7 shows essential elements of the matrix multiplier of the present invention, such as eight RNS digit matrix multiplier units, such as RNS digit matrix multiplier 700. FIG. 7 shows a total of eight RNS digit matrix multipliers to support the example RNS moduli set of FIG. 3*c*. For example, digit matrix multiplier 710 is associated to the digit modulus $M_1$ 363 of FIG. 3*c* and each additional digit matrix multiplier in counter-clockwise fashion is associated to a distinct digit modulus Mi, such that all modulus $M_1$ 363 through $M_8$ 369 of FIG. 3*c* is assigned a digit matrix multiplier in FIG. 7. For example, the digit matrix multiplier 700 is assigned the digit modulus $M_3$ by means of example.

The eight RNS digit matrix multipliers of FIG. 7 allow high-precision fixed-point matrix multiplication to be performed without carry from RNS digit to RNS digit; therefore, there is a benefit of partitioning (i.e., isolating) each RNS digit of the machine word into a distinct matrix multiplier 700 as shown in FIG. 7. One benefit is that RNS digit encoding is generally a narrow binary bit-width, which means the matrix multiplier 700 is not burdened by wide-precision binary arithmetic at each MAC element within the matrix multiplier 400. This results in smaller size, greater speed and higher efficiency for a single matrix multiplier.

The architecture of FIG. 7 is quite amazing considering the apparatus supports a matrix multiplication without carry from digit to digit; only after the matrix multiplication is performed in digit isolation does the non-normalized dot-product output from each digit matrix multiplier, such as matrix multiplier output 775, get re-grouped to form an RNS word at the front end of each matrix row product normalizer, such as product normalizer pipeline 760. The RNS word output of the product normalization unit 760 is fully normalized and may re-enter matrix calculation and is therefore de-grouped into eight single digit transmission lanes, such as digit operand bus 780, and routed back to each of the eight isolated digit matrix multipliers, such as digit matrix multiplier 710.

Unlike other RNS computation apparatus of the past, the RNS TPU of the present invention supports iterative, multiplicative calculation. In other words, normalized data exiting the normalization pipeline 760 of FIG. 7 can be de-grouped into separate digit buses 780 and re-routed to the operand cache and staging circuit 712 and 714 of the associated digit matrix multiplier 710. The normalized RNS data 780 looks like any other fixed-point data 712, 714 input to the matrix multiplier array 716 and can therefore be "re-processed" within the context of iterative calculations. For binary arithmetic, the same holds true but is often taken for granted. The RNS arithmetic of the present invention is referred to as a "true arithmetic" in terms of its precision and ability to support multiplicative iteration. Moreover, the RNS TPU of the present invention is highly accurate since it does not truncate each (extended) product before and during summation, and only truncates (normalizes) after product summation is complete.

Also critical to the operation of the RNS TPU of FIG. 7 is the high-speed forward conversion pipeline unit 730 and the high-speed reverse conversion pipeline unit 740. High-speed forward conversion 730 of matrix data is important to maintain matrix data flow to the matrix multiplier since if high-speed data cannot be delivered to the matrix multiplier of FIG. 7, the benefits of speed and efficiency of the RNS TPU technology of the present invention cannot be fully realized. Also, if data results of the matrix multiplier cannot be delivered and converted from RNS to binary format at high-speed by reverse conversion pipeline 740, the benefits of the RNS TPU technology cannot be used in real-time. It is shown in the disclosure that high-speed forward and reverse conversion technology, which are integrated alongside the normalization pipelines of FIG. 7 is crucial to the matrix multiplier of the present invention.

In FIG. 7, high-speed data interfaces and transmission technologies are employed to deliver matrix data 720 to the forward converter(s) 730 generally at the highest rates possible and are illustrated in a general sense by data receiver interface 725. Also, high-speed interfaces and data transmission technologies 745 are employed to transmit matrix product results 750 and other processed data from the matrix multiplier after such data is converted to binary format using high-speed reverse conversion pipeline(s) 740. In FIG. 7, control elements supporting the synchronization of data values is not shown. Such control circuitry is complex but generally understood by experts in the context of advanced processor design. Moreover, the matrix multiplier of FIG. 7 does not show the MOD function units of FIG. 4, such as MOD function 454*a*. For purposes of illustrating the novel methods that follow, the MOD function of FIG. 4 is assumed integrated into the front-end of the word normalization units, such as word normalization unit 760 of FIG. 7.

Figure 8A:
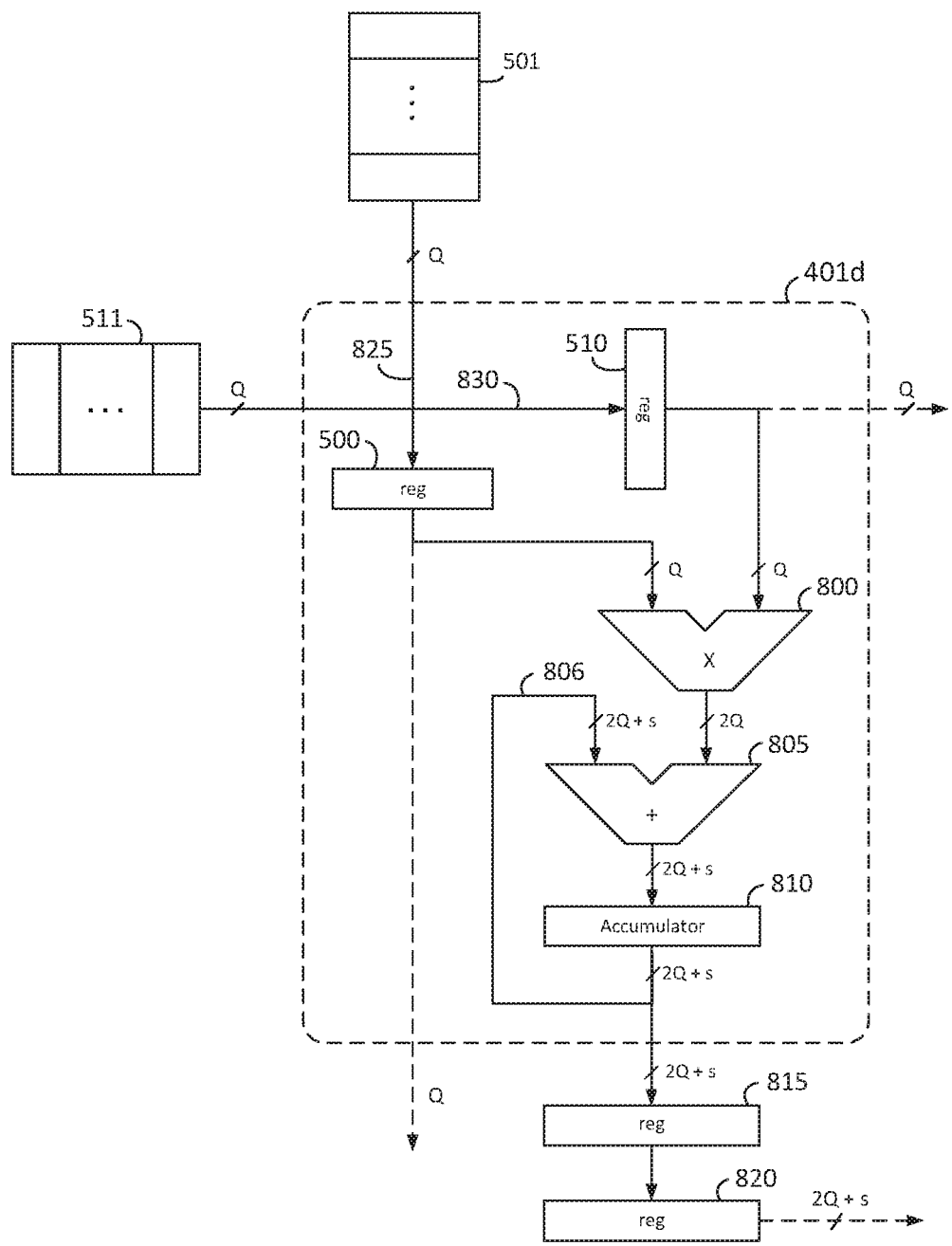
FIG. 8a is a block diagram of an exemplary binary multiplier-accumulator (BMAC)

In FIG. 8a, one embodiment of the present invention is characterized. As depicted in FIG. 8a, multiplier-accumulator element 401d illustrates bus widths of major arithmetic data paths. The input port registers 500, 510 accept an RNS digit encoded into a Q-bit binary word as depicted by the width of data paths 825, 830. A binary multiplier 800 is provided to perform multiplication of the input data stored in registers 500, 510 on each clock cycle during a multiply accumulate operation. The binary multiplier 800 outputs a product result with twice the width of the operands, which is 2*Q as shown. A binary adder 805 is paired with a register 810 to form an accumulator function. The register 810 stores the accumulated result and is often referred to as an "accumulator".

As shown in FIG. 8a, the adder 805 accepts a 2Q bit wide product from multiplier 800 at one input, and an accumulator value of width 2Q+s using feedback data path 806 at the other input. The accumulator 810 is 2Q+s bits wide because during accumulation of "digit" dot products, the product summation may grow quickly and exceed the binary encoding width of 2Q bits. When the product summation is completely processed by multiplier 800, adder 805, and accumulator 810, the product summation is transferred to holding register 815 which therefore must be 2Q+s bits wide; likewise, all digit dot product read-out registers will also be 2Q+s bits wide. The value of s depends on the number of products summed, however, a conservative value is equal to the log (base 2) of the number of product terms summed.

One advantage of digit multiplier-accumulator element 401d is that it can be synthesized using standard binary arithmetic. A common issue confronting modular circuit designers is the lack of so-called "dedicated" modular circuit libraries. Often, modular circuit designers construct modular circuits from binary component libraries because general purpose, customizable modular circuits are not available as component primitives in most ASIC and FPGA component libraries. Therefore, embodiments of the present invention teach advanced techniques for building high-speed modular circuits using standard binary circuits and libraries. However, modular circuits naively constructed from standard binary circuits often lead to difficult problems and are slower in operation than their binary equivalents.

For purposes of comparison and analysis, this disclosure defines an "ideal" modular circuit as a circuit which takes the same or less resources as an equivalent binary circuit with equivalent input width and operates at the same speed or faster than an equivalent width binary circuit. For example, an "ideal" modular accumulator of bit width Q will operate as fast as a Q bit binary accumulator and will require the same or less circuitry to implement. It should not be a surprise that "ideal" modular circuits seldom exist in practice, especially if such ideal circuits support a wide choice of modulus. It is therefore a goal of this disclosure to provide solutions which approximate ideal modular circuitry to the best extent possible so that practical modular computation systems can be constructed using readily available binary component libraries. While this approach is important, the use of modular circuits constructed or synthesized using standard binary circuits and technology is not a limitation of the present invention.

The modular digit accumulator solution of FIG. 8a is novel because it uses a standard binary accumulator circuit and provides for modular digit accumulation by delaying and then applying the MOD function as a final operation, as depicted by the MOD function 454c of FIG. 6. Thus, modular digit accumulation is achieved with a binary accumulator value that grows as products are summed; thus, the MOD function applied after summation must process a "congruent" digit result of 2Q+s bits wide. Such a MOD function will be disclosed later, but its circuitry is relatively large because the input operand width is large; that is, the 2Q+s bit wide RNS digit is reduced to a fully modular digit value of Q bits wide. This is one disadvantage of the solution of FIG. 8a.

Figure 8B:
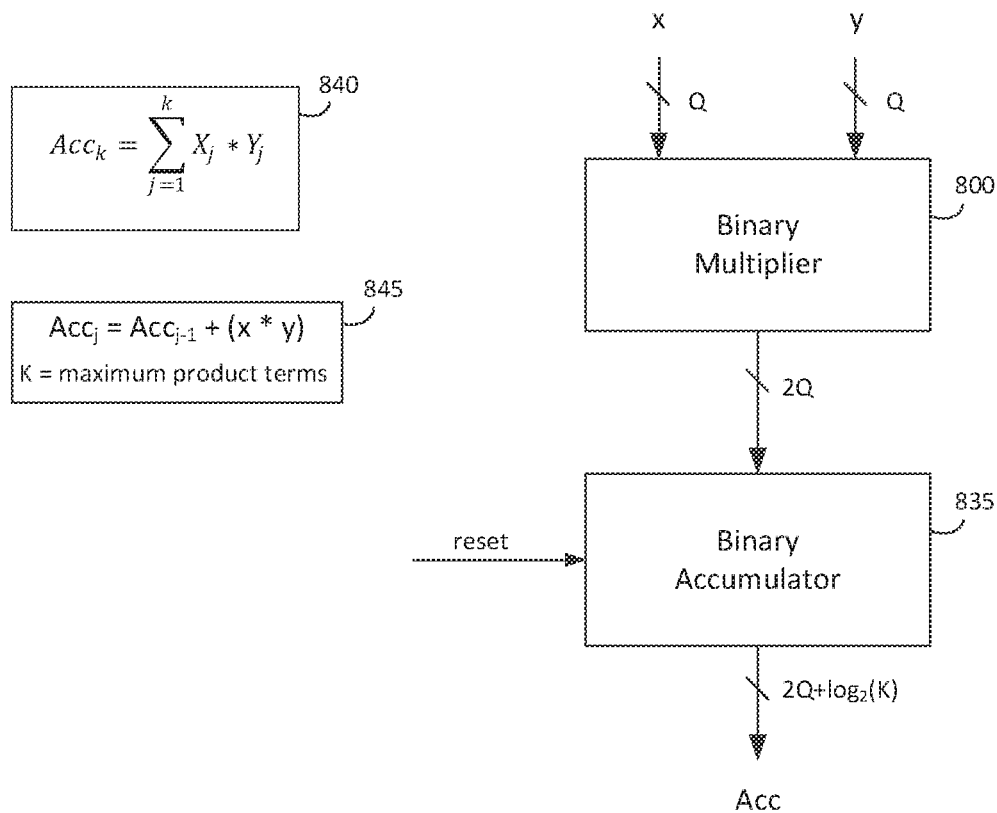
FIG. 8b is a block diagram of an exemplary binary multiplier-accumulator (BMAC) symbol and I/O.

To simplify disclosure and analysis, FIG. 8b shows a block diagram and overall processing relationship for the basic data flow of the multiplier-accumulator function of processing element 401d in FIG. 8a. The block diagram of FIG. 8b shows a binary multiplier 800 which receives two Q bit-wide operands. The output of multiplier 800 is 2Q bits wide and is passed to the binary accumulator function block 835. The binary accumulator block 835 of FIG. 8b consists of the binary adder 805, the accumulator 810 and the feedback path 806 of FIG. 8a. The output of the binary accumulator 835 of FIG. 8b is up to $2Q+\log_2(K)$ bits wide, where K equals the maximum number of products summed.

Another disadvantage of multiplier-accumulator of FIGS. 8a and 8b is the wide bit-width of the final product accumulation. For example, holding register 815 and read-out shift register 820 are 2Q+s bits wide. This more than doubles the number of wires which must exist in each row of the matrix multiplier 400b of FIG. 5. Moreover, while the binary accumulator 835 is fast, since it is ideal, its width is more than twice as wide as an ideal modular accumulator of Q bits wide.

Figure 9A:
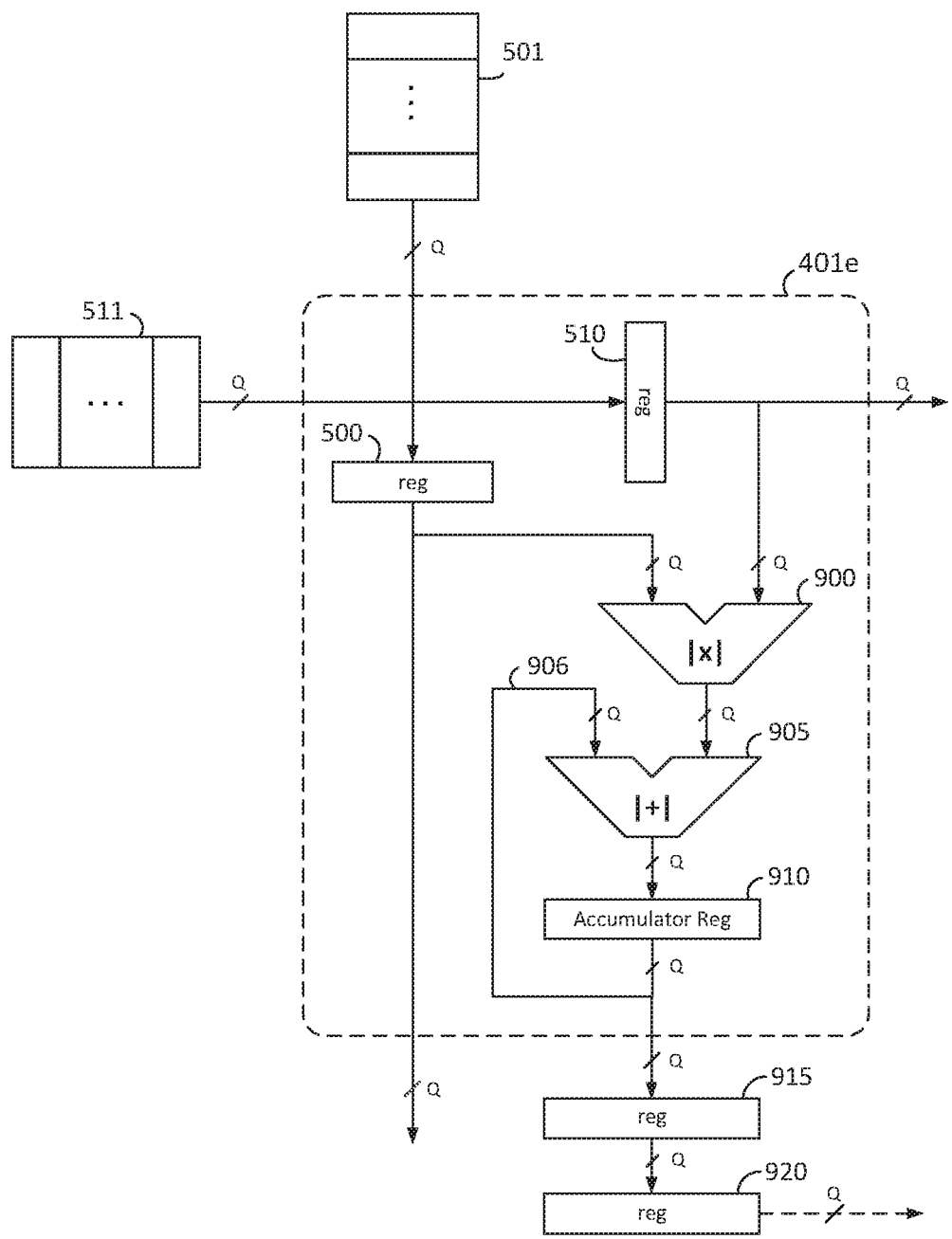
FIG. 9a is a block diagram of an exemplary modular multiplier-accumulator (MMAC)

To minimize the data width of the accumulator 810 of FIG. 8a, the modular accumulator 401e of FIG. 9a is disclosed. In FIG. 9a, a "modular" multiplier 900 multiplies two operands, each Q bits wide. The product result output by modular multiplier 900 is also Q bits wide; this is a "true" modular multiplier, so multiplier 900 is designated with a modular multiply symbol '|x|' denoting multiplication and parallel brackets indicating a MOD function. The modular accumulator of FIG. 9a includes a modular adder 905, designated with a plus sign with parallel brackets '|+|'; the modular adder accepts two operands, each Q bits wide, and produces a fully modular result, of Q bits wide, and such that the output is bounded so $0 \le D_j < M_j$. This is referred to in this disclosure as a "fully reduced" modular result. The fully reduced modular result of adder 905 is summed to the accumulator register 910 of FIG. 9a; the fully modular summation 905 is then stored into the accumulator 910 in each summation cycle, or accumulation cycle, as a fully reduced summation never exceeding Q bits wide.

As discussed previously, "ideal" modular circuits seldom exist in practice. However, for highly pipelined circuits, such as the matrix multiplier of the present invention, it is possible to overcome delays of modular circuits at the expense of increased circuit area, and at the expense of increased pipeline depth. For this reason, a primary objective of the present invention is to reduce the amount of circuitry required and reduce the number of pipeline stages required for modular multiplication and modular accumulation.

Figure 9B:
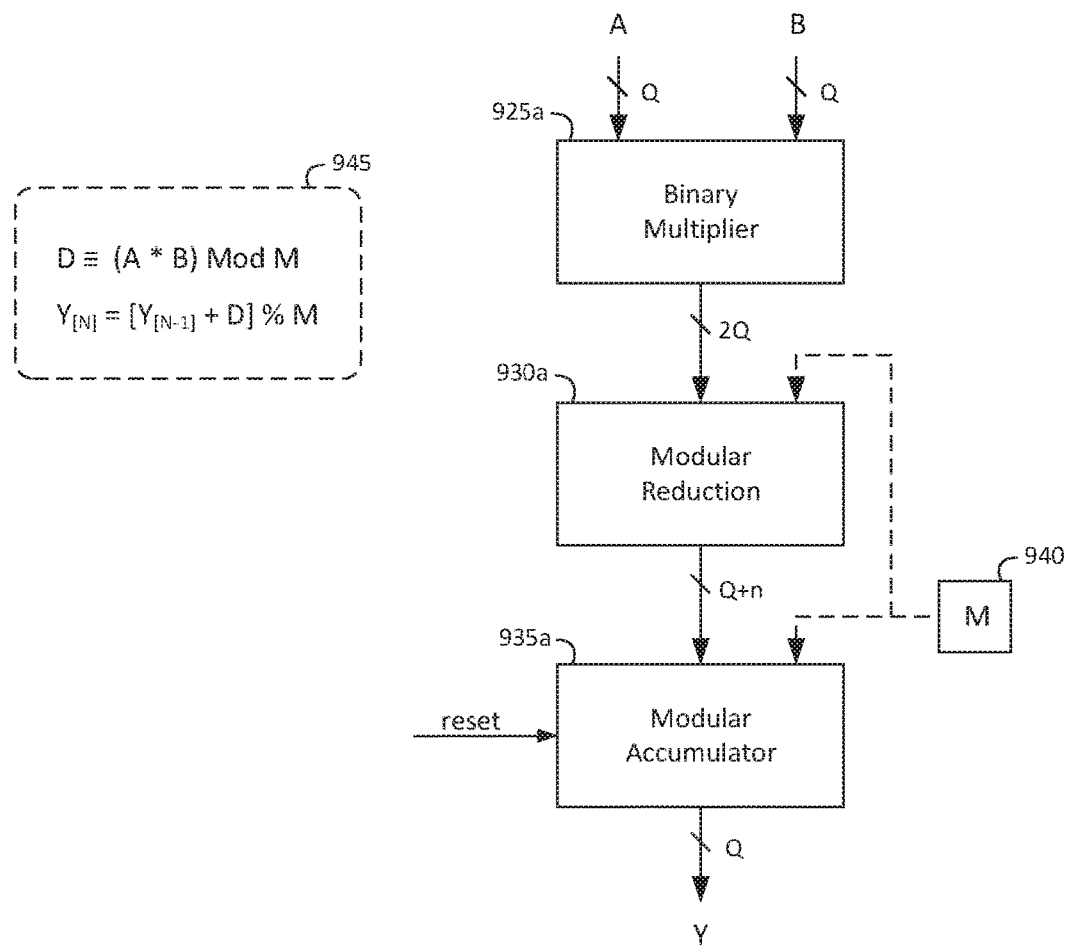
FIG. 9b is a block diagram of an exemplary modular multiplier-accumulator (MMAC) symbol and I/O with binary multiplier resource.

In FIG. 9b, a block diagram for the modular multiplier-accumulator 401e of FIG. 9a is provided. In the block diagram of FIG. 9b, modular circuits are constructed from binary arithmetic, look-up table (LUT) memory and other logical circuits. In FIG. 9b, product summations are computed using a binary multiplier 925a which receives two Q-bit operands as input. The output of the binary multiplier is 2*Q bits wide, so must be reduced by modular reduction circuitry 930a. The modular reduction unit 930a may be specific to a modulus 940, whose value is denoted by the letter M. The function provided by modular reduction 930a is to reduce the congruent input value modulo M. In this case, the modular reduction circuit 930a reduces the 2Q bit-wide operand to a Q+n bit result. As will be shown in one preferred embodiment, modular reduction circuit 930a utilizes "additive reduction", with values for 'n' typically ranging from 1 to $\log_2$ (Q) bits. Therefore, since 'n' is not equal to zero, the modular reduction unit 930a may not reduce the input value to a "fully reduced" modular result, ex., a modular result bounded by Q bits, and further bounded such that digit value D is less than its modulus M ($0 \leq D_j < M_j$). In other words, the output of modular reduction unit 930a is a binary value greater than or equal to Q bits wide and congruent to digit value D modulo M (D≥M), or it is fully modular with respect to the modulus M (D<M). (Assuming efficient modulus M of range $2^{(Q-1)} < M < 2^Q$).

A modular accumulator 935a comprises the last processing block of the modular-accumulator of FIG. 9b. Internal components of the modular accumulator 935a of the prior art comprises binary arithmetic circuits and binary logic circuits, such as binary adders, binary subtractor, LUTs, registers and bus selector as will be discussed later. The output of the modular accumulator 935a is a "fully" reduced modular digit result of Q bits. More specifically, the output of the modular accumulator 935a is a legal RNS digit such that $D_i < M_1$ using nomenclature of FIG. 3a. Therefore, when using the multiplier-accumulator element 401e of FIG. 9a, the output is already fully modular, so there is no need to support MOD function 454a of FIG. 4.

In a novel and unique apparatus of the present invention to be introduced later, a modular accumulator of the form of FIG. 9b is constructed such that output Y of the modular accumulator 935a is not fully reduced, but is congruent to the fully reduced digit value Y modulo m. Therefore, the output Y of the modular accumulator 935a of FIG. 9b is not encoded using Q bits but is encoded as Q+n bits in a similar fashion as the output bit-width of the modular reduction unit 930a.

Figure 10A:
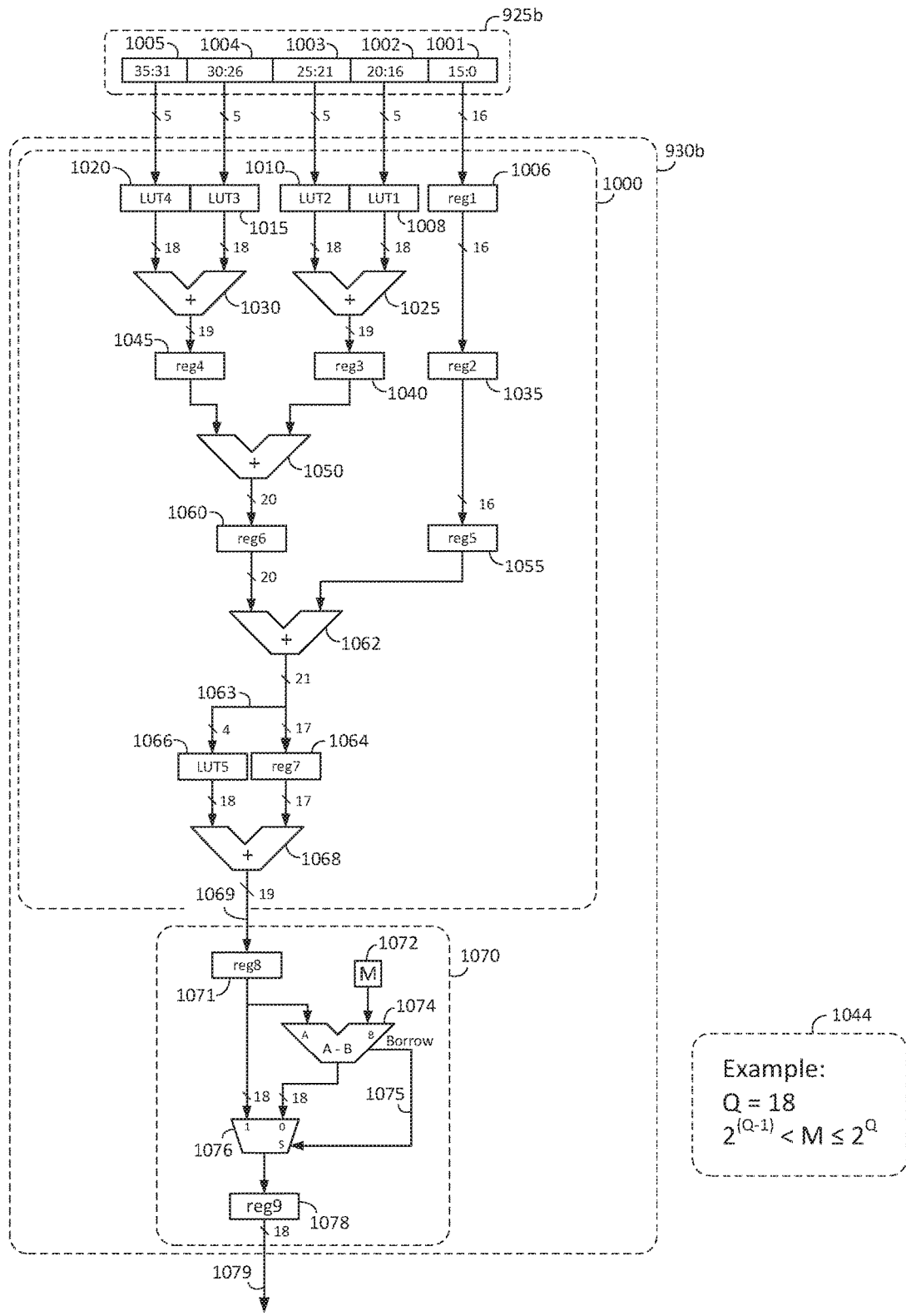
FIG. 10a is a block diagram of an exemplary modular accumulator arithmetic circuit synthesized using binary resources.
Figure 10B:
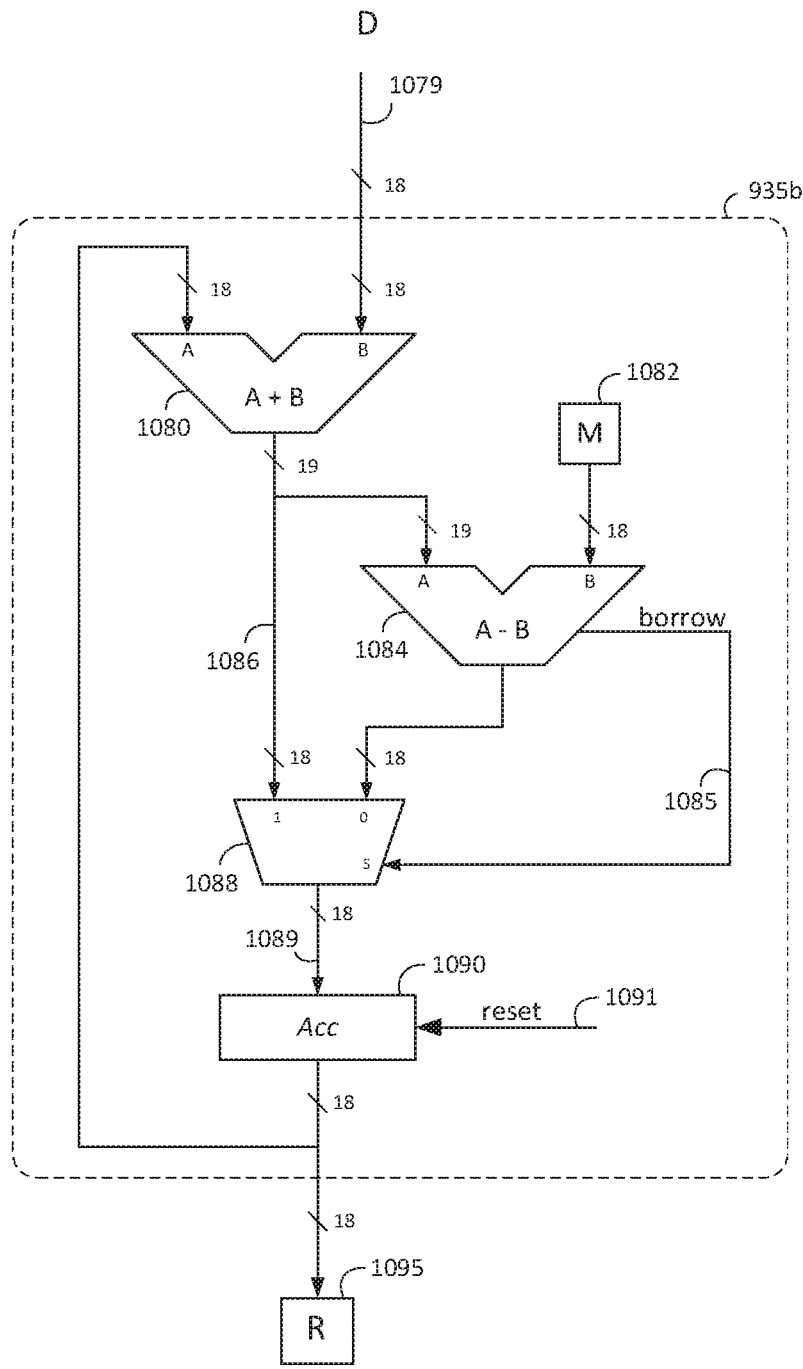
FIG. 10b is a block diagram of an exemplary modular reduction circuit synthesized using binary resources.

FIGS. 10a and 10b illustrate detail of the modular reduction block 930a and modular accumulator 935a of FIG. 9b by means of example. There are many techniques and apparatus for modular reduction in the prior art, however, for a highly pipelined RTL design of the present invention, a significant amount of modular reduction is implemented using binary adders 1025, 1030, 1050, 1065, 1075, and look-up tables LUT1 1008, LUT2 1010, LUT3 1015, LUT4 1020, LUT5 1066, as shown in FIG. 10a in one preferred embodiment. Because the design is highly pipelined, there are registers inserted into the circuit, such as register "reg2" 1035; furthermore, LUT blocks of FIG. 10a, such as LUT4 block 1020, may include a registered output or input and therefore LUTs of FIG. 10a act much like a pipeline register with a LUT function as an output. In the many circuit descriptions which follow, the LUT and register form a common pipeline STAGE to reference operation for disclosure, however, the invention is not limited to such synchronization in practice.

FIG. 10a shows the first stage 930b of a modular reduction circuit 930a of FIG. 9b. The modular reduction stage 930b of FIG. 10a is shown following and connected to the output of an 18×18 bit binary multiplier 925b by means of example. Only the output 925b of the binary multiplier is shown for clarity.

Modular reduction using the circuit 1000 of FIG. 10a is referred to as "additive reduction". This term is somewhat contradictory, but adequately describes a plurality of binary adders used to reduce a 36-bit wide value 925b to a 19-bit wide value 1069 congruent to a value modulo M 1072, and output from the last adder stage 1068. In the example of FIG. 10a, the RNS digit encoding width is Q=18-bits, and a typical digit value D of a modulus value M is bounded such that it occupies no more than the full 18-bits encoding width expressed by the relation 1044. By the word "reduction", it is meant the digit value D (congruent modulo M) encoded in a 36-bit wide input register 925b is converted to a 19-bit wide digit value D 1069 which is congruent modulo M, where D is the same value as a fully reduced input value 925b.

The operation of additive reduction circuit 1000 of FIG. 10a is based on the mathematical relation provided in equation (22), $$|a+b|_m = |(|a|_m + |b|_m)|_m \qquad (22)$$

which states that the MOD of the sum of the quantity 'a' plus the quantity 'b' is equal to the MOD of the sum of the MOD of 'a' and the MOD of 'b', provided all MOD functions are with respect to the same modulus 'm'. More specifically, the method of additive reduction computes the term within the parenthesis on the right side of equation (22). It does not compute the "outermost" final MOD function required to bring the right side equal to the left side of equation (22); this final MOD function cannot be computed using only additive reduction in the general case.

In FIG. 10a, the modular reduction stage 930b is connected to receive the 36-bit product result of binary multiplier 925b of the modular multiplier 930b of FIG. 9b. Since the operands (not shown) of the binary multiplier 925b are in general Q bits wide, the output is as wide as 2*Q bits wide, and in the example configuration of FIG. 10a is therefore 36 bits wide. In the example of FIG. 10a, the upper 20 bits of product register 925b is partitioned into four groups of 5 bits each 1001, 1002, 1003, 1004, 1005. Each 5-bit group represents a portion of the stored product 925b, since each 5-bit group of register 925b represents a weighted truncated binary value. The product stored in input register 925b is reduced using a series of LUT's 1006, 1008, 1010, 1020; each LUT is appropriately programmed to convert the weighted value of a truncated portion of one or more bits of the product register 925b to a Q-bit value modulo M.

For example, LUT1 1008 receives a portion of the product 925a via bit position 16 through 20, denoted as bits "20:16", i.e., a common notation used in hardware languages like Verilog. LUT1 1008 is configured such that data output from LUT1 is an 18-bit value equal to the weighted value of bits "20:16" modulo M. Likewise, the product 925b bits "25:21" are converted to an 18-bit value modulo M using LUT2 1010. The output of LUT1 1008 and LUT2 1010 is summed using binary adder 1025 which produces a 19-bit result sum which is stored in pipeline register reg3 1040. Likewise, the value of bits "30:26" 1004 is converted by LUT3 1015 modulo M, and the value of bits "35:31" is converted by LUT4 1020 modulo M, and both converted values are summed using binary adder 1030 producing a 19-bit sum result stored in pipeline register reg4 1045. The sum of binary adders 1025, 1030 produces a 20-bit result stored in register reg6 1060.

In the example of FIG. 10a, it is not necessary to apply a LUT translation to the value represented by the least significant Q−1 bits, denoted as bits "15:0" 1001 in the example of FIG. 10a. The reason is the value of the least significant Q-1 bits of product 925b is always less than modulus M provided the modulus M is bounded by Inequality Relation 23a, as provided in the example configuration 1044 for optimal moduli, $$2^{(Q-1)} < M \leq 2^Q \tag{23a}$$

The least significant bits "15:0" of product 925b is transferred to pipeline register reg1 1006 to remain synchronized in time with the LUT stages 1008, 1010, 1015, 1020 in one embodiment.

Likewise, the least significant value of the product stored in reg1 1006 is transferred to pipeline register reg2 1035, and then to pipeline register reg5 1055 to stay in synchronization with pipeline registers reg3 1040, reg4 1045 and pipeline register reg7 1064 respectively. Binary adder 1062 sums the result of pipeline register reg6 1060 and reg5 1055 to produce a 21-bit congruent result modulo M. The output of the binary adder 1062 may be as wide as 21 bits, and remains congruent to a fully reduced digit value D modulo M.

In one preferred embodiment of the present invention, the output of binary adder 1068 is used as the final output to modular reduction stage 930b. In this case, the output of modular reduction block 1000 serves to implement reduction block 930a of FIG. 9b, which is labeled as "Q+n" bits wide so that 'n' equals 21-Q=3 bits wide. In this case, the output 1069 of modular reduction unit 1000 is referred to as "partially reduced" with respect to modulus M.

In the embodiment shown in FIG. 10a, the output of binary adder 1069 is further reduced using an additive technique described above followed by a subtractive circuit 1070 to guarantee the digit result 1079 is fully modular with respect to modulus M 1072. The 21-bit output of adder 1062 is partitioned so that its most significant output bits 1063 are converted modulo M using LUT5 1066, which is summed to the least significant seventeen bits of adder 1062 stored in pipeline register reg7 1064 using binary adder 1068. In this embodiment, the goal is to reduce the product result 1000 to the smallest value possible, which in this case is encoded within 19 bits as shown by the output 1069 of adder 1068.

The output of binary adder 1068 cannot be reduced further (modulo M) using only additive reduction alone. The reason is the sum of two values modulo M cannot be guaranteed to be less than the modulus M. For example, the output of adder 1062 is partitioned into two values, each value modulo M, but the sum of these two values, i.e., the output of adder 1068, cannot be guaranteed to be less than M. By using a much larger LUT to replace LUT5 so as to convert nearly all, or significantly all bits of the adder output 1062, it is possible to have the output bound by Q-bits wide or even by the modulus M, but this is very inefficient because the LUT5 input address would be 21-bits wide in this case. In this example, using a LUT with a larger input address 1063 of >(21−(Q−1)=4) bits does not use memory efficiently because it only reduces the output by a single bit for every doubling of the LUT memory, and this still does not guarantee a fully modular result such that D<M unless the LUT input 1063 supports all 21-bits of the adder 1062 output.

In FIG. 10a, to process the congruent result 1069 into a fully modular result 1079, a subtractive reduction circuit 1070 is used. The subtractive reduction circuit 1070 as shown will reduce a value that is less than twice the modulus M to a fully reduce value. In terms of range equation, the acceptable range of input 1069 of value D for the modular reduction circuit 1070 is, $$0 \leq D < (2*M) \tag{23b}$$

FIG. 10a shows a final stage 1070 of modular reduction unit 930a of FIG. 9b for the design example when n=0, i.e., the output of the modular reduction block 930a is Q bits by design. The final stage 1070 is referred to as "subtractive reduction". The technique of subtractive reduction ensures the output of modular reduction unit 930a of FIG. 9b is fully modular, so its output is Q bits wide (and n=0,) and so that its output value, D, is bounded so that D<M. As the name suggests, subtractive reduction uses subtraction to perform modular reduction. In FIG. 10a, subtractive reduction stage 1070 is comprised of a circuit which performs subtractive reduction by implementing the following function, $$D_{out} = \begin{cases} D_{in} & \text{if } (D_{in} < M) \\ (D_{in} - M) & \text{if } (M \leq D_{in} < (2*M)) \end{cases} \tag{24}$$

Function (24) is applied when the value being reduced, $D_{in}$, is bounded by less than two times the modulus M. This is convenient, since the additive reduction circuitry 1000 of FIG. 10a produces a result bounded by less than two times the modulus M.

In FIG. 10a and assuming the example configuration 1044, a congruent digit value D is input into pipeline register reg8 1071 received from the output of binary adder 1068 of FIG. 10a. The entire 19-bit output of reg8 1071 is directed to subtractor unit 1074, and the least significant 18 bits of reg8 1071 is directed to bus selector unit 1078. If the value contained in reg8 1071 is greater than the value of the modulus 1072, denoted as M, the borrow signal 1075 is not asserted so that the output of subtractor 1074 is passed to pipeline register reg9 1078. Otherwise, the value contained in reg8 1071 is not greater than the modulus M 1072 so the borrow signal 1075 is asserted, and therefore the value of pipeline register reg8 1071 is passed directly to reg9 1078 by selector 1076.

There are many variations for the additive modulo reduction circuit 1000 and the subtractive modulo reduction circuit 1070 of FIG. 10a which should be obvious to those skilled in the art of modular digital circuit design. For example, additional pipeline stages may be inserted to improve overall speed of the circuit, such as adding pipeline stages between the subtract unit 1074 and the bus selector unit 1076 of FIG. 10a, or adding pipeline stages to break up adders and subtractors into smaller units with less bit-width. It is well known such optimizations exist, and there are well known tradeoffs, such as increasing pipeline depth. Other variations for modular reduction circuitry will include different numbers and sizes of LUT's, adders, subtractors, and registers and different amounts of pipeline depth.

Referring back to FIG. 9b, the output of modular reduction circuit 930a is connected to the input of modular accumulator 935a. In one embodiment under discussion, the output of modular reduction unit 930a is fully modular, so that its output bus is bounded by Q bits, and further such that its output value D is bounded by its modulus M. (The case when the value n of FIG. 9b is equal to zero, i.e., Q+n=Q). One perceived advantage of using full modular reduction is that modular accumulator 935a can accumulate an input within legal RNS digit range; therefore, if the accumulator is also in legal digit range, then a basic binary adder followed by a subtractive reduction circuit like subtractive reduction circuit 1070 of FIG. 10a can form the basis for the modular accumulator 935a.

In FIG. 10b, an arithmetic schematic of a modular accumulator 935b is shown which is based on a binary adder 1080, and a subtractive reduction circuit comprised of subtractor 1084 and bus selector 1088 which implement the logic of equation (24). The output of the bus selector 1088 is stored into a special register called an "accumulator", designated as register Acc 1090. As in the case of a binary accumulator, the modular accumulator Acc 1090 accumulates the value of each digit D input via bus 1079. After summing the input digit D 1079 to the value of accumulator Acc 1090 using adder 1080, a modular reduction is performed on the resulting sum using subtractor 1084 and selector 1088 in a manner explained in the section describing the subtractive reduction unit 1070 of FIG. 10a. Therefore, the bit-width of an accumulated modular result Acc 1090 does not grow during any number of accumulation cycles, and summation 1090 may be transferred to a digit value output register R 1095 after any number of accumulations in the embodiment of FIG. 10b.

Also shown in FIG. 10b is an accumulator reset signal 1091 which is required to reset the accumulator 1090 before a new sequence of digit values D input 1079 is accumulated. Another option, not shown in FIG. 10b, is a load input signal. The load input signal may be used instead of the reset signal 1091 to load the first digit value D before subsequent digits are summed by the accumulator 1090. One disadvantage of a reset signal 1091 is it adds a "dead" arithmetic cycle into the arithmetic pipeline and data flow. However, the reset signal 1091 is generally a faster circuit than a load circuit, and in many embodiments it is therefore more expedient to waste a summation cycle because it is offset by the increased performance of accumulator circuits using a reset signal 1091. This is particularly true if the number of products summed is large. For the embodiments of the present invention, either the load circuit or reset circuit feature may be used, or neither circuit may be used, or both circuit features may be used together.

Figure 11:
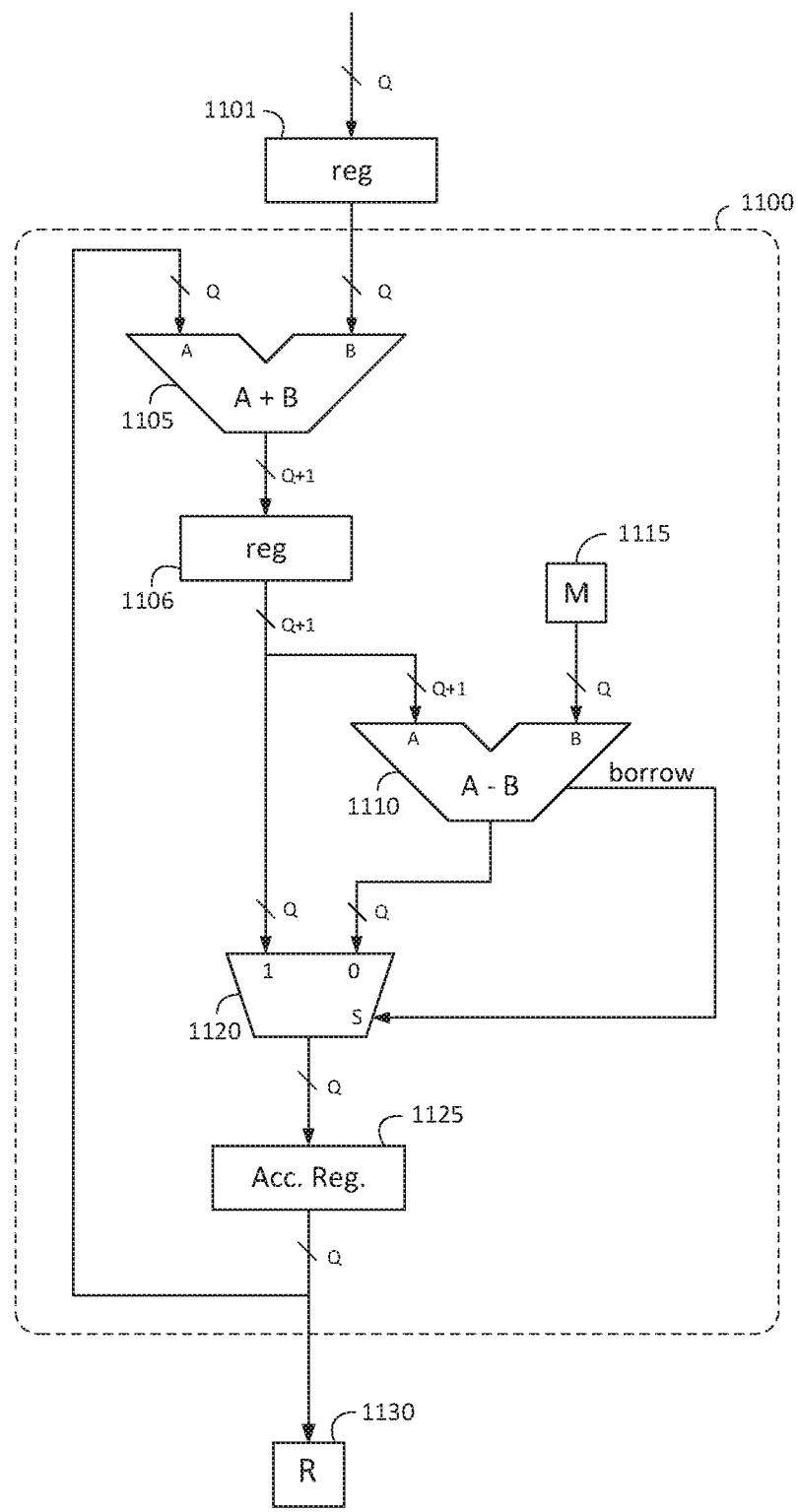
FIG. 11 is a block diagram of an exemplary faulty pipelined modular accumulator circuit design.

There are several disadvantages of the modular accumulator of FIG. 10b. One disadvantage is data flow between the adder 1080 and the accumulator 1090 cannot be easily pipelined. This may seem counter-intuitive since it was discussed earlier how the subtractive reduction circuit 1070 of FIG. 10a can support increased pipelining. The problem for the modular accumulator circuit 935b of FIG. 10b is illustrated by the faulty modular accumulator circuit 1100 in FIG. 11, which illustrates the same modular accumulator circuit 1070 of FIG. 10b but with an extra pipeline register 1106 inserted by means of example. The problem stems from the fact that the accumulator 1125 output must be fed back into adder 1105 for immediate summation with an input from pipeline register 1101. Delaying summation 1105 by one clock cycle before feeding the summation into the accumulator 1125 creates a "racing accumulators" effect, such that two values are accumulated, one value accumulating digit values on an even clock, and another value accumulating digits on an odd clock. This presents problems which get worse when adding more pipeline stages, such as adding a pipeline stage (not shown) between the subtractor 1110 and the bus selector 1120. When adding such pipeline stages the number of racing accumulators increases, significantly complicating the design of a working modular accumulator circuit.

Figure 12:
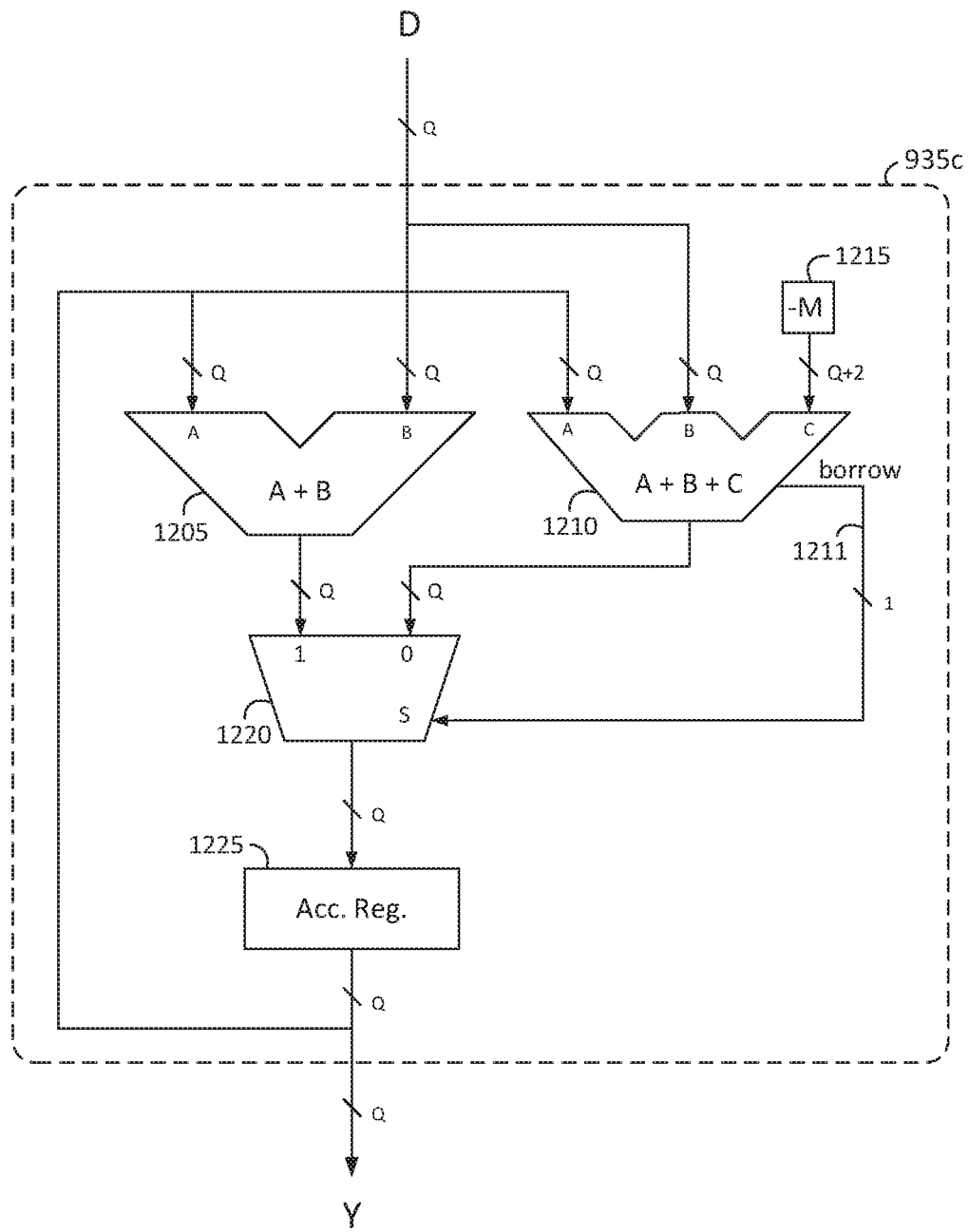
FIG. 12 is a block diagram of an exemplary modular accumulator arithmetic circuit with synthesized parallel adders.

FIG. 12 shows an improved modular accumulator 935c comprised of two adders in parallel instead of two adders in sequence as in FIG. 10c. One adder 1205 supports two inputs, while a second adder 1210 supports three inputs and a wider input port to support the complement of the accumulator modulus M, i.e., −M 1215. In FIG. 12, the modular accumulator 935c takes advantage of two adders that operate in tandem, therefore decreasing delay and increasing speed of operation.

The three-input adder 1210 is required to support summation and subtraction simultaneously. Like the circuit of FIG. 10c, if the borrow signal 1211 is not asserted, then the value output from adder 1210 is passed to the accumulator 1225 by bus selector 1220, otherwise, if the borrow signal is asserted, then the value output from adder 1205 is passed by bus selector 1220 and latched by accumulator 1225.

One advantage of the modular accumulator 935c of FIG. 12 versus the modular accumulator 935b of FIG. 10b is faster operation since arithmetic summation and subtraction circuits of FIG. 12 operate in parallel and represent less overall delay. Another advantage of the circuit of FIG. 12 is the decreased number of logic levels which helps mitigate the problem of not being able to easily insert pipeline registers into the accumulator feedback loop data flow as discussed earlier.

However, the modular accumulator 935c of FIG. 12 also has a major problem since it cannot be easily pipelined. To understand why, it helps to consider the case of a pipelined binary accumulator circuit of FIG. 13 which does not have this problem. For high-speed pipelined accumulators, it is common practice to sub-divide an accumulator into multiple stages, where stages supporting the least significant bits are processed before stages of the next significant bits. For example, an 18-bit binary accumulator 1350 can be broken into three stages, with two least significant stages 1352, 1354 each of 6 bits and a high order stage 1356 of 7 bits width. The processing loop of the accumulator is then expanded to support three accumulation pipeline (clock) stages 1320, 1330, 1340 instead of one. Because binary carry circuits propagate from least significant stage 1320 to the next significant stage 1330 via carry signal 1324, it is possible to implement fast binary accumulator pipelines because the binary counter width of each stage is small, such as accumulator stage 1331, and since the result of each pipeline stage is only dependent on the result of the prior stage. While this is convenient for binary arithmetic, it is not a solution for modular accumulation up to this present disclosure.

Figure 13:
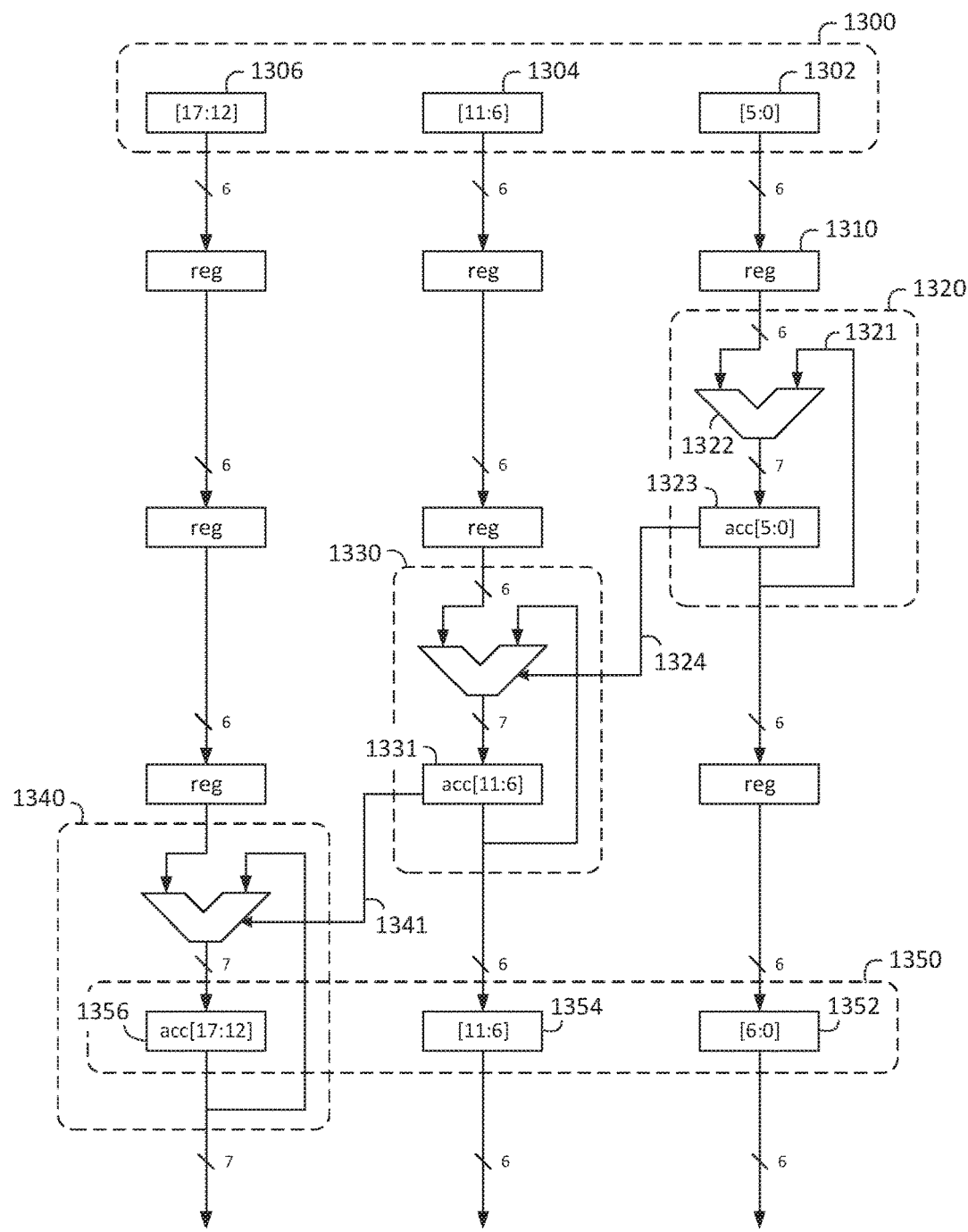
FIG. 13 is a block diagram of an exemplary pipelined binary accumulator circuit.

When considering the modular accumulator 935c circuit of FIG. 12, it is not a simple matter to pipeline the adders 1205, 1210, in a similar manner as described in FIG. 13 since partitioning the binary adder 1210 into smaller adders has an inherent problem; that is, the result of the first stage is dependent on the result of the last stage of the pipeline. To be successful, the partitioning of a binary adder into smaller stages depends on the ability to "close" the accumulation feedback into as short a path as possible. In the example of the first binary accumulator stage 1320 of FIG. 13, the circuit can feedback 1321 its corresponding accumulator value 1323 in one clock cycle, wherein each successive accumulator stage 1330, 1340 is then staggered by one clock cycle. In the case of the modular accumulator 935c, it is not feasible to "close" the accumulator feedback of each stage to a single clock cycle, since the result of the first stage depends on knowing the result of the last stage of the pipeline.

Figure 14A:
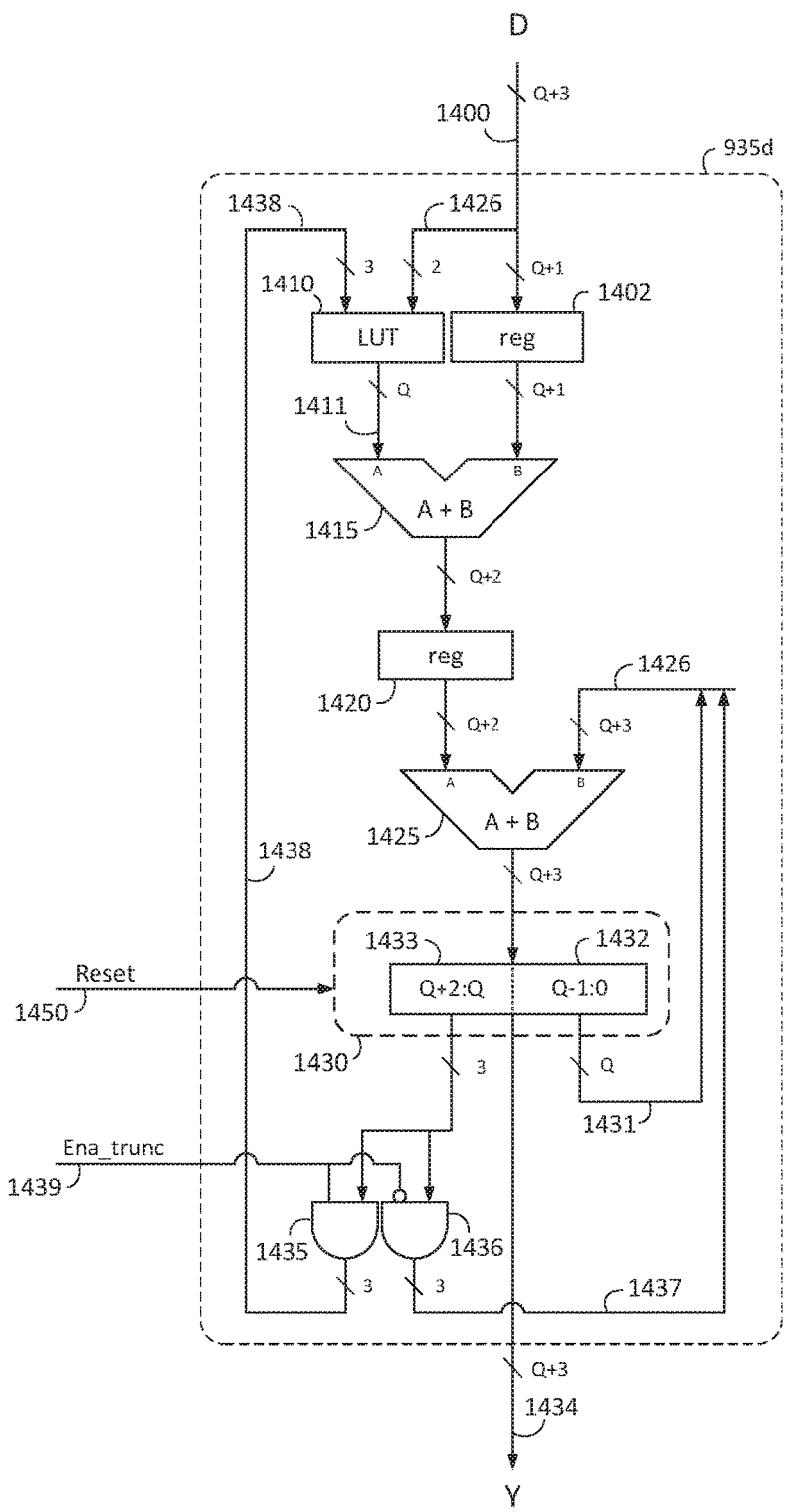
FIG. 14a is a block diagram of an exemplary modular accumulator with truncation enable control.

In one preferred embodiment of the present invention, the modular accumulator 935d of FIG. 14a is used to overcome the limitations of the modular accumulator 935c of FIG. 12. In FIG. 14a, modular accumulator 935d is shown with an input digit 1400 bit-width of Q+3 bits, and an output digit Y 1434 bit-width of Q+3 bits by means of a generalized example. The significance of this configuration will be explained shortly. One important characteristic of the modular accumulator 935*d* is that its operation is based on a method of combined additive reduction and gated truncation based modular reduction; this is a unique and novel technique of the present invention. Other unique features of the modular accumulator 935*d* of FIG. 14*a* is the three accumulator feedback paths 1431, 1437, 1438 and the "Ena_trunc" control signal 1439, among others.

The operation of the modular accumulator 935*d* is explained when an input value D, congruent modulo M, is received on input bus 1400. The input value 1400 supports a binary width of Q+3 bits; the two most significant bits 1426 is routed to LUT 1410 while the least significant Q+1 bits is routed to pipeline register 1402. The output of the LUT 1410 converts the combined value of the three most significant bits of accumulator 1430 plus the most significant two bits 1426 of input value 1400 modulo M and returns an equivalent 18-bit value modulo M entering the binary adder 1415. The most significant Q+1 bits of the input value 1400 stored in pipeline register 1402 is transferred to the other input of binary adder 1415.

The output of adder 1415 is up to Q+2 bits wide and is connected to pipeline register 1420 which in turn is connected to an input of binary adder 1425 where the input value is summed with the value contained in the accumulator register 1430. The following stages of the novel and unique modular accumulator 935*d* significantly differ from the operation of modular accumulators 935*c*, 935*b*. For example, the accumulator 1430 is now Q+3 bits wide "[Q+2:0]" and is divided up into two accumulator sections, a low-order section 1432 supporting accumulator bits "[Q−1:0]", and a high-order section 1433 supporting accumulator bits "[Q+2:Q]". The low-order accumulator section 1432 is Q bits wide, and acts much like an "ideal" 18-bit binary accumulator. The output 1431 of the low-order accumulator section 1432 is routed and connected to the low-order bits of the binary adder input bus 1426 thereby creating a "primary" accumulator feedback path 1431.

The high-order accumulator section 1433 contains the most significant bits of accumulator 1430. In a typical embodiment of FIG. 14*a*, three high-order bits 1433 of the accumulator 1430 are connected to two additional accumulator feedback paths 1437, 1438 via a fast gate function logically comprised of AND gates 1435, 1436, by means of example. The AND gates 1435, 1436 each have one input tied to the truncation enable ("Ena_trunc") control input 1439 in such a way that only one gate is active at once. For example, when the truncation enable control 1439 is high (asserted), the gate 1435 passes the high order accumulator bits 1433 to the input of LUT 1410; simultaneously, AND gate 1436 transmits a "zero" value via the accumulator feedback path 1437 such that the high order input bits of adder 1425 input bus 1426 are zero.

Therefore, truncation of the high order accumulator bits 1433 of the accumulator 1430 is performed by gating to zero the high-order input bits 1437 such that they are not re-calculated by adder 1425 in the next clock cycle. However, the value of the truncated bits 1433 are not lost in this case, since their value is converted by LUT 1410 to an equivalent value 1411 modulo M and re-enters the "outer" accumulator loop defined by the circular data path created by feedback path 1438. In this case, when the truncation enable control 1439 is asserted, the accumulator 1430 is seen to accumulate congruent values in a "modular accumulation mode".

Alternatively, when the truncation enable control 1439 is low (de-asserted), the high order accumulator bits 1433 are passed back via AND gate 1436 and feedback path 1437 to the high order bits of input bus 1426 of binary adder 1425. Simultaneously, the AND gate 1435 transmits a "zero" value via feedback path 1438 to the input of LUT 1410. The LUT is programmed so that when all feedback path 1438 bits are zero, there is no contribution from the accumulator 1430 to LUT function 1410; its output 1411 is zero. In the embodiment shown in FIG. 14*a*, during a summation operation, the truncation enable control 1439 is de-asserted three clock cycles before summation terminates; therefore, the values accrued in the pipeline registers 1402, 1420 and the value output from LUT 1410 are summed by adder 1425 and are accumulated by the full width of accumulator 1430; full width accumulation is to include all Q+2 bits. In this case, while the truncation enable control 1439 is de-asserted, the accumulator 1430 is seen to accumulate congruent values in a "binary accumulation mode".

As shown in the embodiment of FIG. 14*a*, after the last three clock cycles of summation in binary accumulation mode, the accumulation is complete, and all bits of accumulator 1430 are read out data path 1434 for further processing by the matrix multiplier of the present invention. Also shown in FIG. 14*a* is a reset input 1450 connected to the accumulator 1430. Details of the reset are not provided, but is conventionally understood that when asserted, the entire accumulator 1430 will be cleared. The reset control 1450 can be of various types, such as a synchronous reset control, or alternatively an asynchronous reset control. In some embodiments of the present invention not shown, the reset signal 1450 may be replaced with a "load accumulator" control which loads the accumulator 1430 with the first value of a summation from binary adder 1425.

Figure 14B:
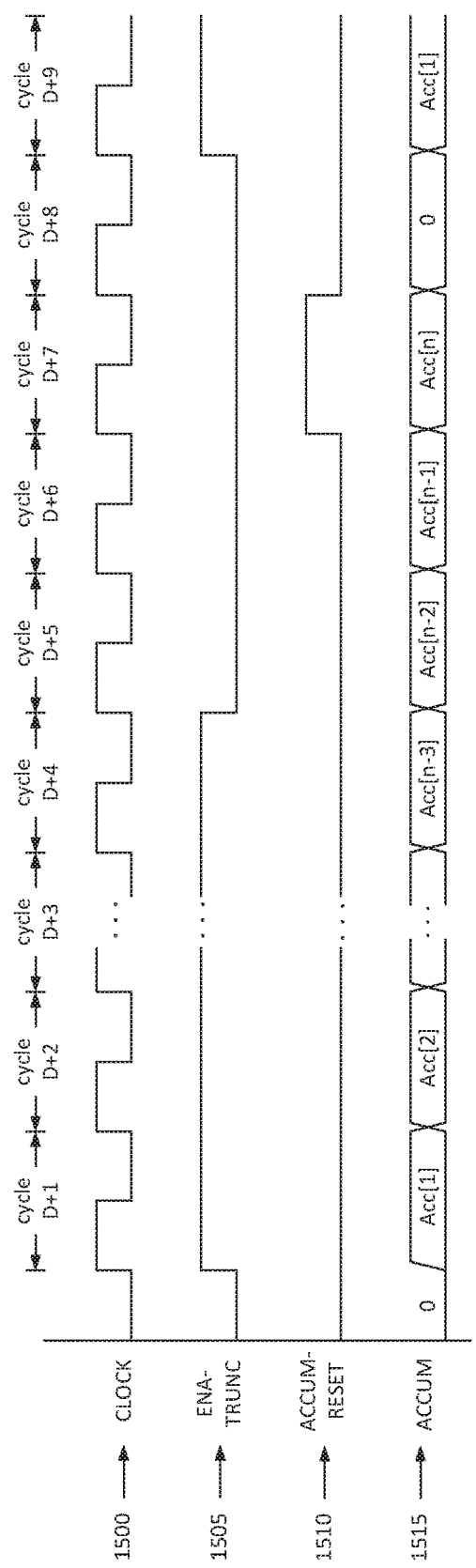
FIG. 14b illustrates an exemplary signal waveform showing control of a modular accumulator with ENA_TRUNC and accumulator reset control inputs.
Figure 14C:
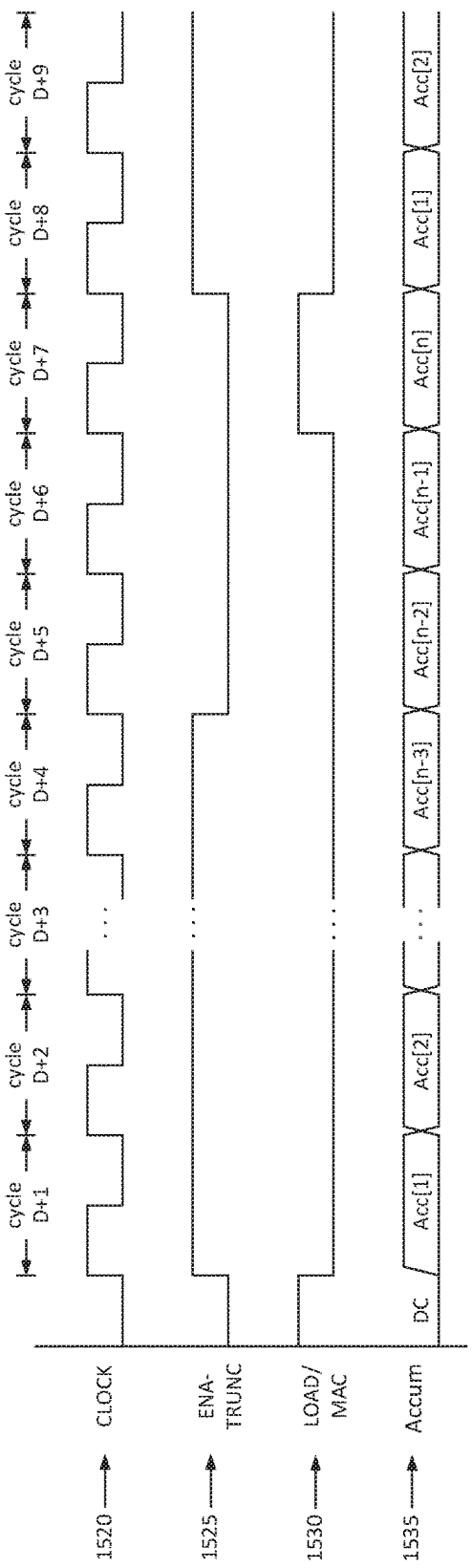
FIG. 14c illustrates an exemplary signal waveform showing control of modular accumulator with ENA_TRUNC and accumulator load control inputs.

FIGS. 14*b* and 14*c* illustrate timing diagrams for the modular accumulator of FIG. 14*a*. In FIG. 14*b*, a timing diagram illustrating the control of a modular accumulator which supports an accumulator reset control input 1510 is shown. At cycle D+1, accumulator 1515 begins to accumulate in a modular fashion while the ENA_TRUNC control input 1505 is asserted. When the ENA_TRUNC control input 1505 is asserted, the modular accumulator 935*d* of FIG. 14*a* performs a modular accumulation in what is referred to as a "modular accumulation mode". Since the pipeline depth of the accumulator 935*d* is two stages, the ENA_TRUNC control 1505 is de-asserted at cycle D+5, i.e., two clocks before summation is complete at cycle D+7. During the last two clocks before summation is complete, (during clock cycle D+5 and D+6) the ENA_TRUNC control is de-asserted, and the modular accumulator 935*d* of FIG. 14*a* operates in what is referred to as "binary accumulation mode". The reason is the binary accumulation mode allows the accumulator 1430 of FIG. 14*a* to overflow at some future summation cycle, whereas during the modular accumulation mode, there is never a possibility of overflow of accumulator 1430 because the high order bits 1433 are repeatedly truncated at each summation cycle.

In FIG. 14*b*, the modular accumulator supports an accumulator reset input 1510. The accumulator reset 1510 is asserted at the same clock cycle as the accumulator summation is ready at clock cycle D+7. The next accumulator value at cycle D+8 is zero and the process of accumulation starts at cycle D+9. In FIG. 14*c*, the modular accumulator is cleared implicitly using a LOAD control input 1530. The waveform of FIG. 14*c* shows the LOAD control input asserted at the same cycle as the product summation 1535 is complete. However, the next product summation (accumulation) starts in the next clock cycle D+8, one clock earlier than the clock cycle D+9 of FIG. 14*b*. However, the reset signal may be implemented easier than a LOAD input within the context of digital circuitry and therefore may be preferable in some FPGA embodiments if the wasted clock period is insignificant to the decrease in overall speed due to the delays of a LOAD circuit.

There are many interesting aspects and properties of the high-speed modular accumulator 935d of FIG. 14a which contribute to a preferred embodiment. For one, a modular reduction function is comprised of a truncation operation of the accumulator 1430 in combination with a specially programmed LUT 1410. In one preferred embodiment, the truncation function is the same for all modulus $M_j$, but the programming of LUT 1410 is specific to each modulus $M_j$ using the nomenclature developed in FIG. 3a.

One advantageous property of LUT 1410 is its relatively small size, which in the embodiment of FIG. 14a consists of a (2^5*18=) 576 bits memory table. For example, LUTs supporting five inputs are common primitives in modern FPGA and ASIC libraries. The programming (data) of the LUT also depends on the input bit assignments which define the address inputs 1426, 1438 to the memory LUT 1410. For example, in one possible variation of LUT 1410, the input bits 1426 are assigned to the least significant bits of the input address of LUT 1410, while the feedback path bits 1438 are assigned to the most significant address input bits of LUT 1410. These types of variations are often arbitrary and known by those skilled in the art and do not materially affect the novel invention of the present disclosure.

Equations can be derived for any variation of address input connection and used to program RAM or ROM based LUT 1410. For the example provided earlier, whereas bits 1426 are assigned to least significant address inputs, and bits 1438 are assigned to the most significant address inputs of LUT 1410, the following equation (24) generates data for each address location, A, of LUT 1410 for a given Modulus, $M_j$:

$$LUT(A)=[((A\&0x3)*(2^Q))+ (((A\&0x1c)>>2)*(2^Q))]\%M_j \qquad (25)$$

Another major advantage of the modular accumulator 935d of FIG. 14a is the high-speed operation of the accumulator 1430 during modular accumulation mode; since the primary feedback path 1431 is a direct connection to a single binary adder 1425 which in turn is directly connected to the input of accumulator 1430 to re-load data directly to the accumulator 1430. Note there is no other intermediate component or function, such as a bus selector unit 1220 of FIG. 12. Moreover, there is no other signal dependency in the primary accumulator feedback path 1431, such as the borrow signal 1211 of the modular accumulator 935c of FIG. 12.

When the modular accumulator 935d of FIG. 14a operates in binary accumulation mode, the truncation enable signal 1439 is de-asserted, so the upper three bits of the accumulator 1433 are fed back to the binary adder 1425 through the delay of a single gate function 1436, illustrated as AND gate 1436 of FIG. 14a. This architecture is conveniently fast, since the delay of carry from the least significant bits to the most significant bits of binary adder 1425 are in tandem to the short delay of a single gate function 1436. Therefore, when operating in binary accumulator mode, the accumulator 1430 is operating at the full speed of a Q+3 bits wide binary accumulator, and is feeding back this entire accumulator width, consisting of both the lower section 1432 and the upper section 1433, into the binary adder input 1426.

Another major advantage of the modular accumulator 935d of FIG. 14a results from the fact that the requirement for "decision logic" of modular accumulators 935b, 935c has been eliminated. For example, decision logic consisting of a subtractor, a borrow signal, and a bus selector is eliminated. Therefore, the ability to partition and pipeline the binary adders 1425, 1415 of FIG. 14a is now possible. The binary adder 1425 and accumulator 1430 may be further partitioned to provide for high speed operation. For example, in one embodiment, the digit width Q is 18 bits, and the accumulator 1430 is Q+3=21 bits wide. Since 21 is evenly divisible by three, one embodiment implements a three-stage binary accumulator 1430, with each stage being seven bits wide.

Another significant advantage of the modular accumulator of FIG. 14a is the ability to accept a congruent digit value D as input 1400, as opposed to a "fully" modular digit value D. In FIG. 14a, the modular accumulator 935d accepts a digit value which can occupy Q+3 bits encoding, or stated another way, the modular accumulator 935d can accept digit values D that are 3 bits more than the digit width Q. The consequence is the modular reduction unit 930a of FIG. 9b can output a congruent digit value D of up to Q+3 bits, so that circuitry requirements for modular reduction unit 930b of FIG. 10a is reduced to that of the modular circuitry 1000 or less. For example, referring to the modular reduction unit 1000 of FIG. 10a, the LUT5 1066, register reg7 1064, and binary adder 1068 can be eliminated, and the output of binary adder 1062 is used to form a 21-bit wide congruent output.

Figure 15A:
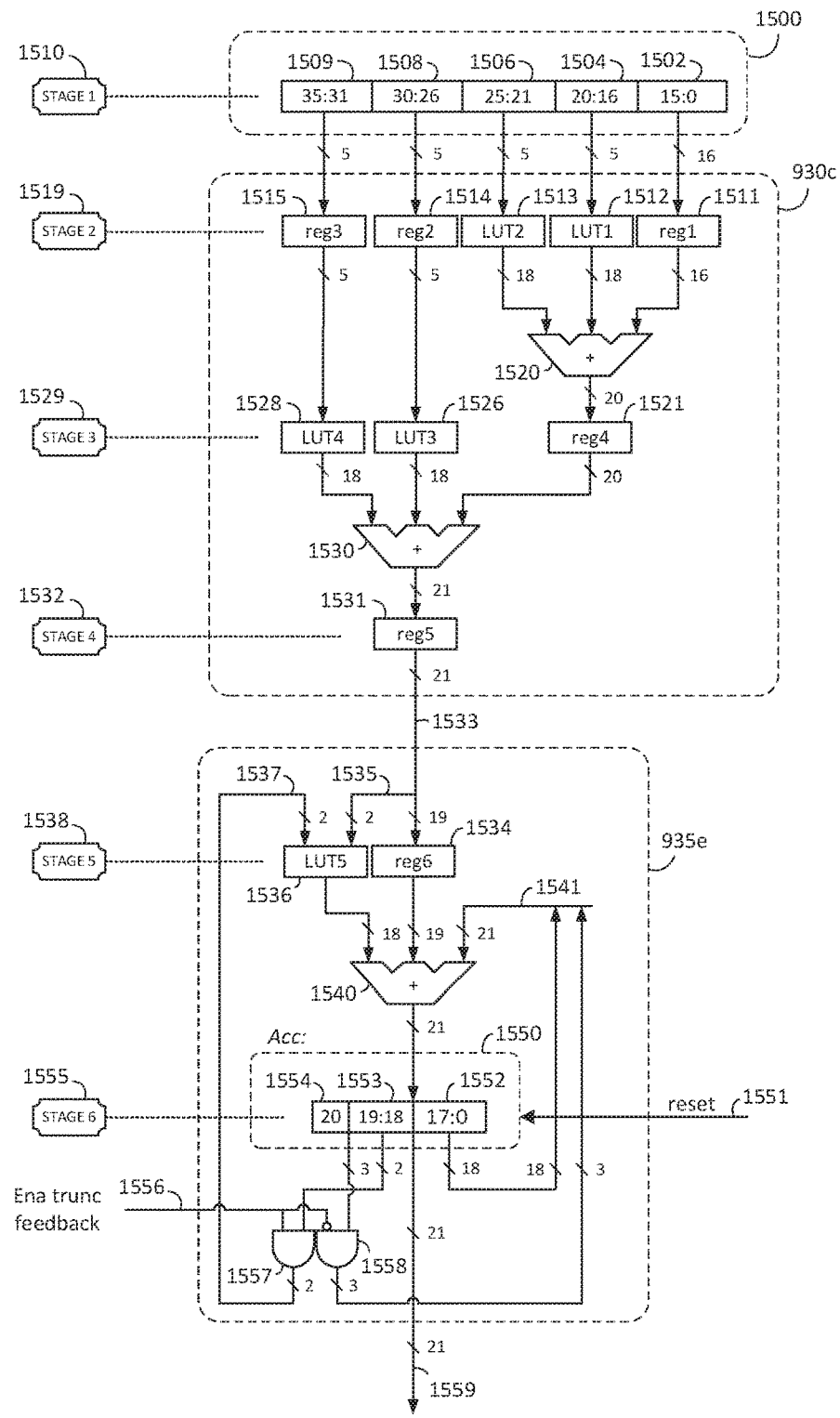
FIG. 15a is a block diagram of an exemplary 36-bit to 21-bit modular reduction unit connected to a modular accumulator with ENA_TRUNC and reset control inputs.

To further clarify the advantages of accepting a congruent digit value and other unique features, an alternate embodiment of the modular multiplier of the present invention is provided in FIG. 15a. The embodiment of the modular accumulator of FIG. 15a uses three-input adders 1520, 1530, 1540 instead of the two-input adders 1415, 1425 of FIG. 14a. The three-input adder is a common primitive in more advanced FPGA devices which support 6-input look-up table memory functions, such as the Cyclone-V series FPGA devices from Intel (formerly known as Altera). This is important, since readily available technology is used to implement the modular accumulator of the present invention.

In FIG. 15a, a pipelined modular reduction unit 930c is shown for a typical 18-bit wide RNS digit and is comprised of several 3-input adders 1520, 1530 and several look-up tables LUT1 1512, LUT2 1514, LUT3 1526, and LUT4 1528 and several pipeline registers, reg1 1511, reg2 1514, reg3 1515, and reg4 1521. It is understood the 18-bit wide example of FIG. 15a is for illustrative purposes only, and that other binary widths other than 18-bit may be constructed without materially changing the present invention. Because the example uses 18-bit wide RNS digits, the input 1500 of the product of two RNS digits may be up to 36 bits wide. The function of the modular reduction unit 930c is to reduce the 36-bit wide product 1500 into an equivalent 21-bit output 1533 having a value congruent modulo M, where M is a general modulus. Note the output 1533 of modular reduction unit 930c is not bound by less than two times the modulus M as was the output 1069 of the modular reduction circuit 1000 of FIG. 10a. Therefore, circuitry for modular reduction is reduced; this is important since modular reduction circuitry for modular multiplication grows as the square of the hardware matrix dimensions of matrix multiplier 400 of FIG. 4. However, an alternate embodiment for modular reduction may include circuitry to implement a full MOD function, since this does not affect the operation or need for the modular accumulator 935e.

In FIG. 15a., the modular accumulator 935e is likewise comprised of a 3-input adder 1540 and look-up table LUT5

1536 which is programmed to implement a "running MOD" function, or more precisely, a "running congruence" summation function at the output 1559. Like FIG. 14a, the LUT5 1536 is programmed to account for the modular summation of the value contributed by the upper two bits 1535 of the incoming congruent operand and the value contributed by the truncated two bits 1557 of accumulator 1550. Equation (25) or similar is used to encode the LUT5 1536 for each modulus M and for each digit accumulator 935e of a matrix multiplier. Another improvement of FIG. 15a is the reduction of truncation bits via feedback bus 1537 to only two bits wide (versus three) since the value in accumulator 1550 never exceeds a 20-bit value ("[19:0]") during the modular accumulation mode (during accumulation when ENA_TRUNC is high). Therefore, LUT5 1537 supports only 4 input address bits and is therefore half the size of the five address LUT 1410 of FIG. 14a. Note the control signal name "Ena_trunc feedback" 1556 may also be called by other names, such as "Trunc_ena", or "Ena_trunc".

The use of 3-input adder 1540 reduces the number of pipeline delay stages for modular accumulator 935e of FIG. 15a which results in two pipelined stages 1538, 1555 of accumulation versus three. The correct operation of the "Ena Truncation" (ENA_TRUNC) control signal 1556 accounts for the reduced number of stages by being de-asserted one clock before summation is complete. This differs from the circuit of FIG. 14a where the ENA_TRUNC control 1439 is de-asserted two clocks before final summation is complete. During the last cycle of summation, it is possible the summation within accumulator 1550 can exceed 20 bits in this example circuit for certain general modulus M, therefore, an extra high order accumulator bit 1554 is provided. Therefore, the accumulator 1550 output bus is 1559 is 21 bits wide and will transmit a 21-bit modular summation congruent modulo M after product summation is complete.

The FIG. 15b is included to show a sample modular digit accumulation. In FIG. 15b a table is shown having eight states illustrated in Row 1567 through Row 1574. The example modulus chosen is the value 177147 in decimal, and a series of 18-bit wide RNS digits labeled Digit A and Digit B 1562 are multiplied using a binary multiplier (not shown) producing a 36-bit binary product 1500 of FIG. 15a whose value is listed in column 1563 of FIG. 15b. At row 1567, the accumulator is initialized at zero. At row 1568, the accumulator sum 1566 takes on the modular reduction of the first multiplication result, i.e., value 0xB798 of column 1565. As modular (and congruent) products are produced, the modular sum 1565 changes in each stage as does the accumulation value 1566. At row 1572, the Ena_Trunc control line 1561 is de-asserted, and the modular accumulator 1566 operates in binary accumulation mode for two cycles as shown in row 1572 and 1573. The accumulation during binary accumulation mode shows the value in the accumulator 1566 will grow without bounds if summation continues and no other action is taken. In a typical application, the summation 1566 is transported after two clock periods of binary accumulation mode, and another product summation starts in modular accumulation mode after an active reset control 1560 is asserted for one clock period. As seen in row 1573, the accumulator value is at its maximum value and grew significantly in value during the period Ena_Trunc control 1561 is de-asserted.

Figure 15C:
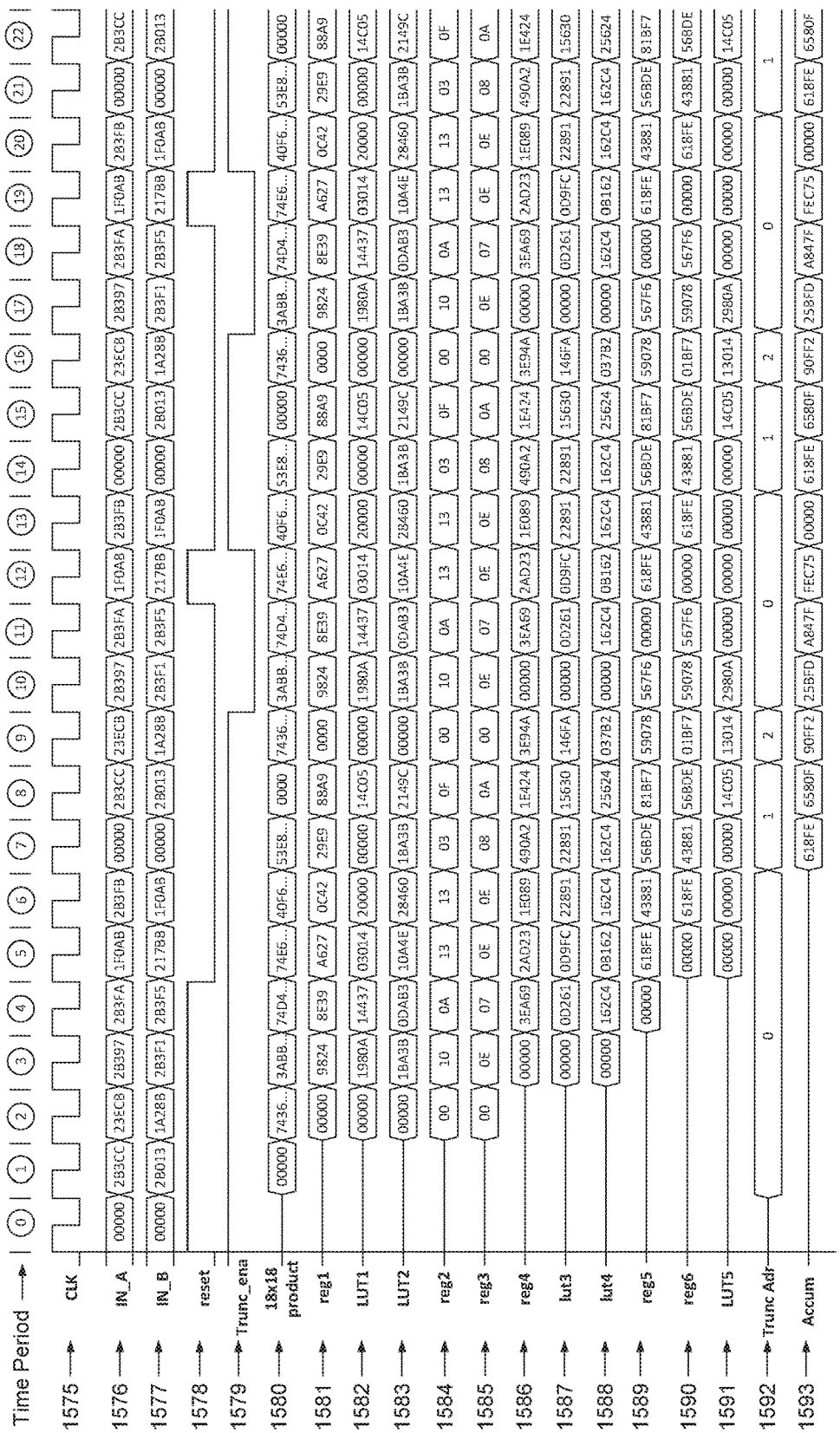
FIG. 15c illustrates an exemplary waveform of modular multiplier-accumulator with ENA_TRUNC and reset control inputs.

FIG. 15c is used to disclose detailed operation of the modular multiplier-accumulator circuit of FIG. 15a comprising a binary multiplier 1500, a modular reduction circuit 930c, and a modular accumulator 935e with support for gated truncation and feedback of accumulator data using Ena_Trunc 1579 (Trunc_ena and Ena_trunc are identical) and reset control 1578 of the accumulator. The same example digit data multiplied and summed in FIG. 15b is multiplied and summed in FIG. 15c over two complete cycles. The signal names of the detailed waveform of FIG. 15c correspond to the registers and LUTs of FIG. 15a by means of reference and disclosure. One difference that FIG. 15c shows that cannot be seen in FIG. 15b is the latency of the modular accumulation operation. For example, the modular digit data for Digit A 1576 and Digit B 1577 appears in clock cycle 1 through clock cycle 6, but the accumulated modular result Accum 1593 doesn't appear until clock cycle 12. The control of the Trunc_ena control signal as well as the accumulator reset control input must be properly timed to coincide with data that is flowing within the pipeline structure.

Another interesting feature of the waveform of FIG. 15c is the truncation address bits 1592, which are seen to change as the value in the accumulator change. During modular accumulator mode, the Trunc_ena control signal 1579 is asserted, and the accumulator value at clock periods 7 through 10 show the accumulator value 1593 stable and not growing out of bounds. Except when the Trunc_ena signal is de-asserted at clock period 10 and 11, then binary accumulation mode is operating, and the accumulator value 1593 grows like an arithmetic binary count sequence, and not in a modular sequence as is the case when operating in modular accumulator mode. Of significance is that if the accumulator can overflow in binary accumulation mode, then information is lost, and the digit summation result is in error, however, during modular accumulation, information is not lost, since the truncated value doesn't overflow, it is re-routed back and its value re-mapped into the outer accumulation loop in a modular fashion.

As previously discussed, modular accumulator circuits of FIG. 10b and FIG. 12 do not allow simple methods of pipelining, so that wide binary accumulators cannot be broken into smaller "cascaded accumulators" such as that shown in FIG. 13. This is a problem, since partitioning a wide accumulator into a plurality of multiple smaller accumulators is a well-known technique for enabling faster execution at the expense of added pipeline circuitry. To overcome this problem, and to provide another variation of the unique modular accumulator apparatus of the present invention, a highly pipelined 18-bit modular accumulator of the present invention is disclosed in FIG. 16.

Figure 16:
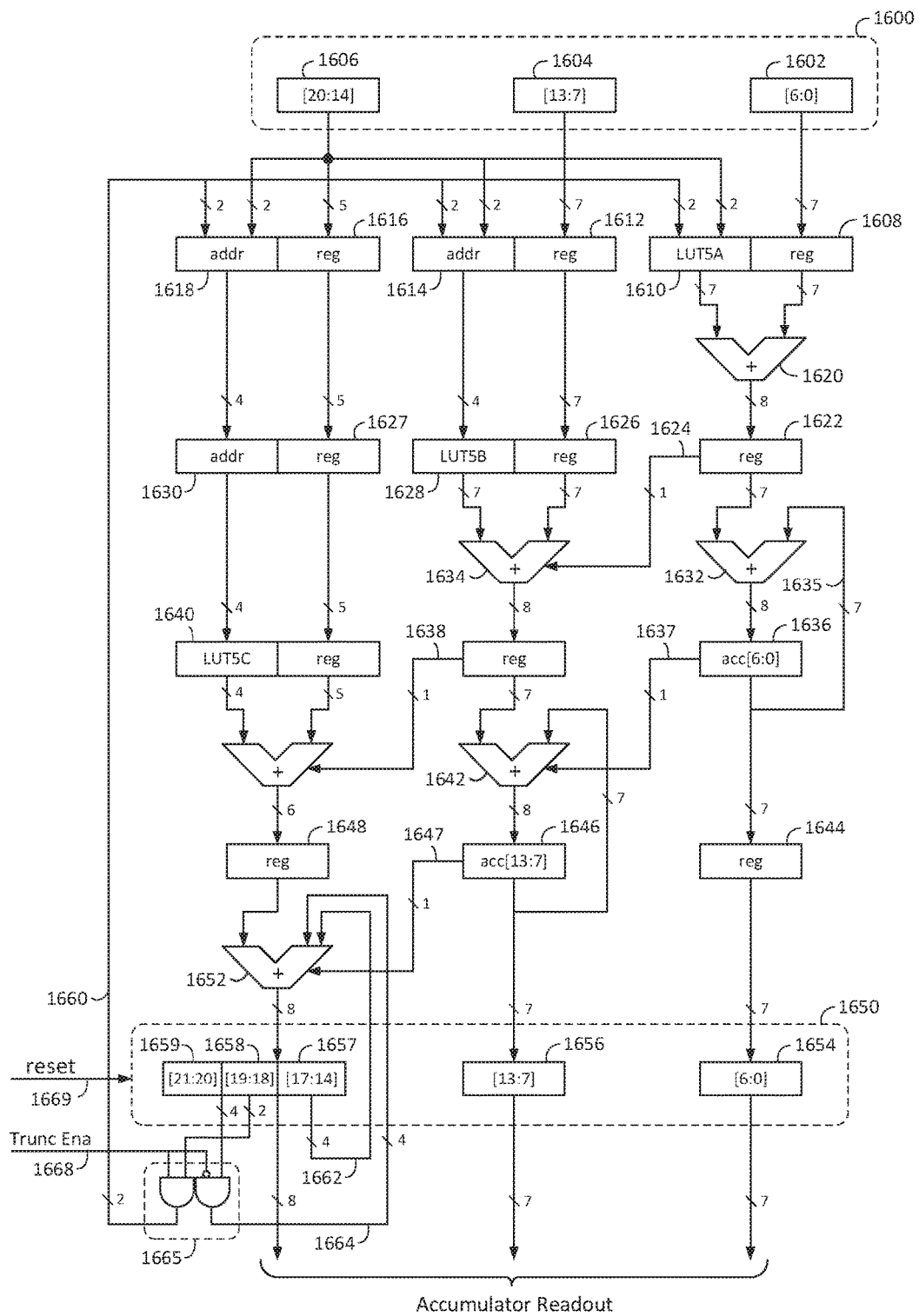
FIG. 16 is a block diagram of an exemplary pipelined modular accumulator with congruent output and ENA_TRUNC and reset control inputs.

In FIG. 16. by means of example, an 18-bit modular accumulator is supported using a 22-bit modular accumulator 1650, which consists of three distinct stages, two stages which are 7 bits wide, and a third accumulator stage of 8 bits wide. In this manner, a modular accumulator uses three high-speed accumulators instead of the one slower 21-bit accumulator of FIG. 15a. Modular data is staged into the pipeline using input register 1600 which is diagrammatically shown divided into three data bit sections, the first section consisting of the first 7 bits [6:0] 1602 of the input, the second section consisting of the data bits [13:7] 1604, and a third input section consisting of data bits [20:14] 1606. The last stage of the modular accumulator of FIG. 16 is the output register 1650 which is also shown as two 7-bit sections 1654, 1656, and one high order 8-bit section consisting of sub-sections 1657, 1658, 1659. The output is therefore larger than the input in this example circuit, consisting of 22 bits wide congruent data. Other embodiments may differ by adjusting the data widths of various components which is obvious to those skilled in this art.

In the apparatus of FIG. 16a, the novel innovations of the present invention are present. For example, the feedback LUT5 1536 of FIG. 15a is shown split into three LUTs, LUT5A 1610, LUT5B 1628, and LUT5C 1640 each providing the LUT5 data bits associated to each respective high-speed accumulator stage 1636, 1646, 1657 respectively. For example, LUT 1610 provides the LUT data for bits [6:0], LUT 1628 provides the data bits [11:6], and the last LUT 1640 provides the data bits [17:12]. Therefore, while the LUT is split into three smaller LUTs, the number of memory bits is the same as LUT5 1536 which supports the full 18-bit data bits [17:0].

In FIG. 16, the modular accumulator differs in that the accumulator counter is broken into three distinct stages, each stage offset by one clock cycle. For example, the first 7-bit accumulator stage 1636 is comprised of adder 1632 and accumulation feedback data bus 1635. A carry bit bus 1637 transmits a carry bit data to the next 7-bit accumulator adder stage 1642 which is added to the second stage accumulator 1646 in the next clock cycle. Like FIG. 15a, the last 8-bit accumulator stage comprised of register sections 1657, 1658, 1659 is coupled to a truncation gating circuit 1665 which provides gating of the upper accumulator bits [19:18] 1658 to feedback LUTs 1610, 1628, 1640 when the Trunc_Ena control signal 1668 is asserted. Because of the additional accumulator stages, the number of pipeline stages for the modular accumulator of FIG. 16a is increased over that of FIG. 15a. This impacts the time when the Trunc_Ena control 1668 is de-asserted as discussed earlier.

Normalization Pipeline Units

In this section, the design of high-speed product normalization pipeline units, such as the pipelined normalization unit 455a of FIG. 4, is disclosed. The product normalization unit performs an important function for general purpose computation in the residue number format and is necessary to properly normalize dot products which exit the matrix multiplier unit 400a of FIG. 4 in the present invention. It is a claim of this disclosure that proper application of "true fixed point RNS normalization" of RNS fractional formats provides a critical ingredient enabling general purpose computation in RNS format. To that end, equations (1) through (80) provide new arithmetic expressions to describe RNS fixed-point processing which aids modular computation design.

In U.S. Pat. No. 9,081,608, a normalization unit for normalizing the intermediate product of two fractional RNS formats is described in FIG. 15c of that patent. This type of normalization is referred to as "true fixed-point RNS normalization" because it normalizes, or divides by, the range of the fractional RNS digits; this is illustrated mathematically for positive fractions using equations (11) through (15) and equations (17) through (18) of the present disclosure. To handle normalization of negative values U.S. Pat. No. 9,081,608 discloses an apparatus which uses two normalization apparatus operating in parallel, one normalization unit processing the original intermediate product, the other processing the complement of the intermediate product. Only the processing of the shorter of the two is kept in this scheme, as it is guaranteed to be positive and valid. If the complemented value processing is shorter, the processed result is complemented, since the normalized result is known negative. In the scheme of U.S. Pat. No. 9,081,608, the normalization apparatus performs a comparison of both values as they are processed to determine which is smaller in magnitude so that the properly normalized value is kept, and the improperly normalized value is discarded. Since direct normalization only works with positive encoded values, and not negative values encoded with the method of complements, the apparatus of the prior art keeps the smaller of two processed values thus ensuring the kept value is correctly processed. If the kept processed value was the complemented value, this indicates the answer is negative, and the kept processed value is "re-complemented" as a result.

It is noted the need to perform normalization on signed RNS values pose significant complexity in terms of design of RNS normalization circuits. For example, a pipelined normalization unit 455b employing the method of U.S. Pat. No. 9,081,608 is illustrated as the block diagram of FIG. 17a. In the apparatus depicted in FIG. 17a, a non-normalized value 1700 is input via data bus 1710 and data bus 1705; both data buses are wide enough to support a full range of RNS digits, such as eight 18-bit wide digits of the example fixed-point RNS format of FIG. 3a. One copy of the non-normalized value is input via data bus 1710 and routed to delay register 1720, the other copy is transmitted via data bus 1705 to a complement function 1715. The delay function does not perform an arithmetic function, it only delays the input value so that it remains in synchronization with the non-normalized value routed to complement function 1715.

Both the value delayed in block 1720 and the value processed in complement function 1715 exit simultaneously and enter a normalization unit 1735 and 1725 respectively. The normalization unit is comprised of an RNS to mixed-radix converter stage followed by a mixed-radix to RNS converter stage illustrated by the two triangular regions denoted by dotted lines 1736, 1726 of normalization pipeline unit 1735, 1725 respectively. Each normalization pipeline unit produces a series of mixed-radix digits transmitted to a comparator pipeline 1730 using digit comparison buses, such as digit comparison buses 1740, 1745. The result of the comparison of the RNS value processed in normalization pipeline 1735 is compared with the RNS (complement) value processed in normalization pipeline unit 1725; the result of the comparison is stored in an optional pipeline storage (delay) unit 1765.

Moreover, each normalization pipeline 1735, 1725 performs a decomposition of the input RNS value to a mixed radix format, then performs a division by the fractional range using truncation in mixed radix format, and then performs a recombination of the truncated mixed-radix value to RNS format. The mathematics of this processing is expressed in equations (17) through (18) for positive values only, since if the value is detected to be negative, it is discarded by selector 1775. Only one of the processed values exiting the normalization pipeline units 1735, 1725 is selected as a result using selector 1775, which is controlled depending on the sign of the processed values comparison stored in sign result register 1765. It should be noted the pipeline design produces a unique result every clock cycle or better, so that multiple values are processed through the pipeline at once.

Figure 17A:
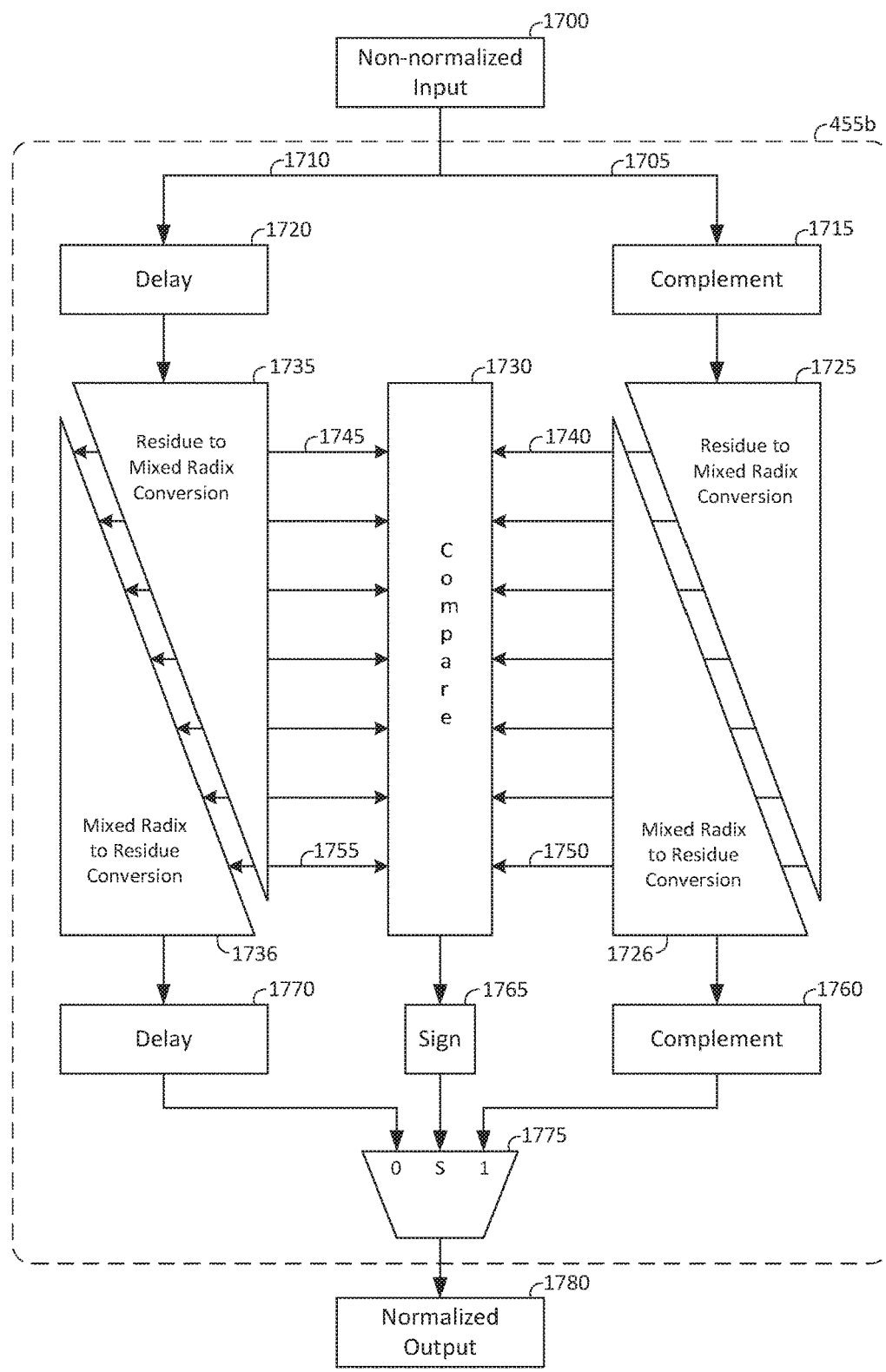
FIG. 17a is a block diagram of an exemplary pipelined product normalization with dual mixed-radix conversions.

The normalization pipeline 455b of FIG. 17a consists of two normalization pipeline units each comprising an RNS to mixed-radix converter 1725, 1735 and each further comprising a mixed-radix to residue converter 1726, 1736. A non-normalized intermediate product or intermediate product summation value in RNS word format enters the normalization pipeline 455b and is transmitted to a delay element 1720 and a word complement unit 1715. The delay element 1720 is used to delay the un-modified RNS word to remain in pipeline synchronization with the RNS complement produced by word complement unit 1715. The original RNS value enters a residue to mixed-radix converter 1735 and the complement of the value enters the residue to mixed-radix converter 1725.

During synchronized conversion of the two values in FIG. 17a, a comparator pipeline 1730 determines if the original residue value or its complement is larger in magnitude; the comparison results in a sign determination flag 1765 being set if the un-complemented value is larger than the complemented value, which indicates the original value undergoing processing is negative. If the sign determination flag 1765 is set, it implies the result is negative so selector 1775 passes the complement of the result of mixed-radix to residue converter pipeline 1726 to the result output register 1780. Otherwise, if the sign determination flag is not set, it implies the result is positive, and the mixed-radix to residue result 1736 is passed by selector 1775 to the output register 1780.

Figure 17B:
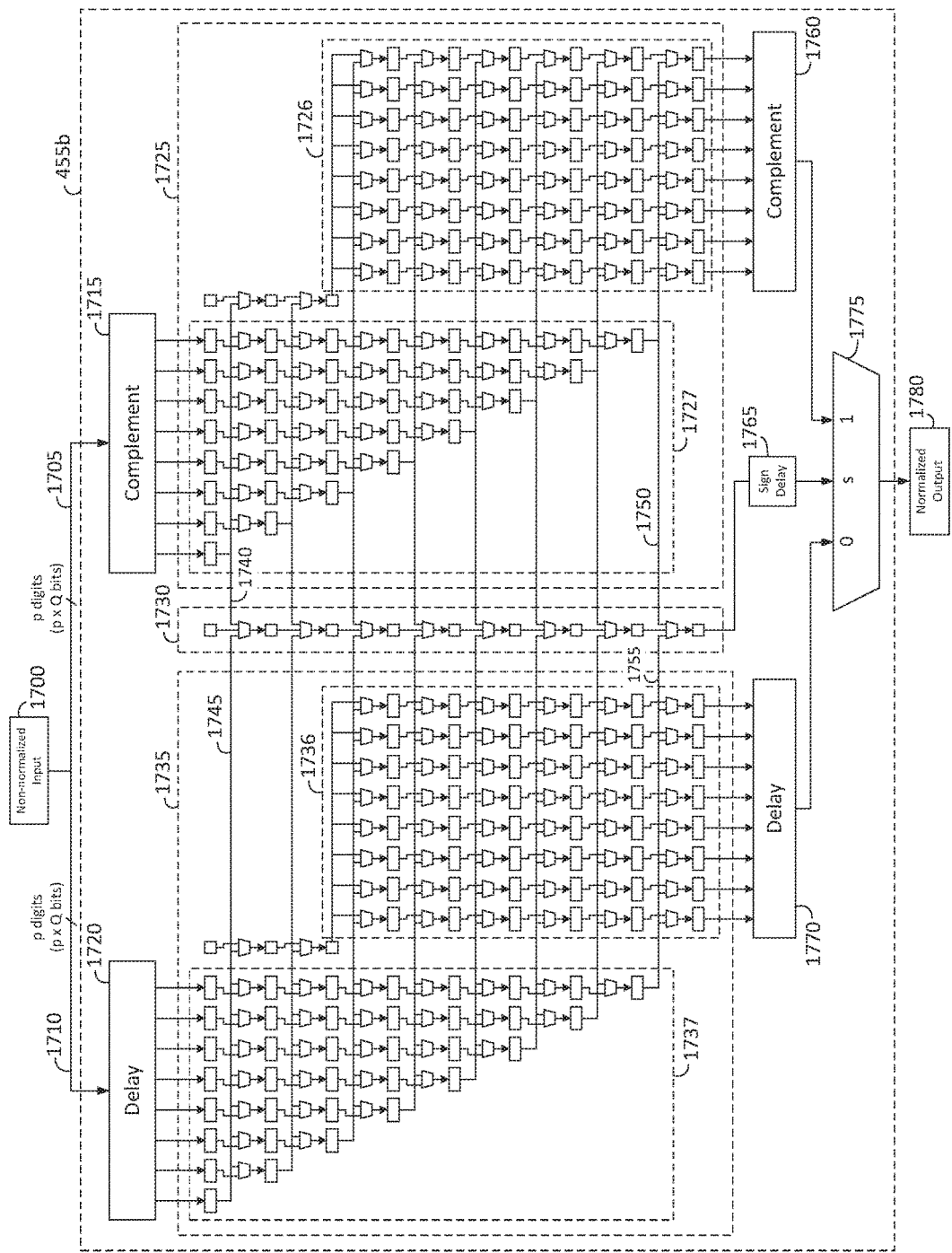
FIG. 17b is a block diagram of an exemplary pipelined product normalization with dual mixed-radix conversions.

FIG. 17a is re-drawn in more detail in FIG. 17b. In FIG. 17b, the normalization pipeline 1735 consists of a pipelined RNS to mixed-radix converter 1737 and a pipelined mixed-radix to RNS converter 1736. Likewise, the normalization pipeline 1725 which processes the complement of the non-normalized value consists of RNS to mixed-radix converter 1727 and mixed-radix to RNS converter 1726. Also shown in FIG. 17b is a pipelined comparison unit 1730 which compares mixed-radix digits via digit comparison buses, such as digit comparison buses 1745, 1740, 1755, 1750. Like FIG. 17a, the selector 1775 of FIG. 17b decides which processed value to pass to the output 1780. Inspecting the operation of the normalization unit 455b of FIG. 17b it is clear that at least half of the circuitry of FIG. 17b is wasted during operation since it produces an incorrect result, and this implies that 50% of the power is also wasted. FIG. 17b is included to reveal the complexity of RNS normalization pipelines, and to reveal the large resource requirements and potential loss of efficiency of a design using the methods of U.S. Pat. No. 9,081,608.

One method of reducing the circuitry required to perform normalization is to attempt to "correct" a negative value that has been normalized using the normalization pipeline 1735 of FIG. 17b. In the prior art, the negative value is in-correctly processed and cannot be used according to equation (28). In a new and novel method and apparatus of the present invention, a single normalization pipeline is used to normalize values despite their sign.

As a review as to the validity of this new approach, the following generalized mathematical description of fixed-point arithmetic is provided. First the sign of an RNS value which adheres to the method of complement is defined as, $$\text{sign}(x) = \begin{cases} 0 : \text{positive}, & \text{if } Y_x < R_T/2 \\ 1 : \text{negative}, & \text{if } Y_x > R_T/2 \end{cases} \quad (26)$$

It follows that the complement of a non-zero RNS value Y can be computed using, $$\overline{Y_x} = R_T - Y_x | x | > 0 \quad (27)$$

In a new method recently developed and now disclosed for the first time, a high-speed normalization is performed using a single mixed radix converter which guarantees normalization regardless of the sign of the intermediate product. To clarify the problem of normalizing negative values, equation (27) for a negative value is substituted into equation (15), so that a normalization of a negative intermediate value is attempted as, $$\overline{Y_R} \ne \left\lceil \frac{R_T - Y_{IP}}{R_F} \right\rceil, 0 < Y_{IP} < \frac{R_T}{2} \quad (28)$$

In this case the result $Y_R$ is not correct since the normalization of equation Error! Reference source not found. is derived for positive numbers only. In other words, dividing the complement $(R_T - Y_{IP})$ directly by the fractional range $R_F$ does not normalize the negative number. In equation (28) the fractional range $R_F$ is dividing both the positive representation of the intermediate value as well as the total range of the number system, so the formula doesn't work as intended. Another minor issue with (28) is the ceiling function, which is used to denote round-up, but should be replaced by a floor function symbol to indicate round-down for negative numbers.

The problem of directly normalizing negative values is solved using a correction factor C which is determined by adding both the positive value and negative value calculation of (14), since adding complements should produce zero, so, $$C = \left\lfloor \frac{R_T - Y_{IP}}{R_F} \right\rfloor + \left\lceil \frac{Y_{IP}}{R_F} \right\rceil, 0 < Y_{IP} < \frac{R_T}{2} \quad (29)$$

To simplify the meaning of this equation, one case is easy to solve, that is, the case when $Y_{IP}$ is evenly divided by $R_F$. In this case, a "perfect correction constant" $C_p$ is therefore equal to, $$C_p = \frac{R_T}{R_F} = R_W \quad (30)$$

The correction constant is used by deriving a positive value from an improperly processed negative value as, $$\left\lceil \frac{Y_{IP}}{R_F} \right\rceil = R_W - \left\lfloor \frac{R_T - Y_{IP}}{R_F} \right\rfloor \quad (31)$$

And next forming a "correct" complement for the corrected positive value of equation (31) using equation (27) the properly normalized negative result is, $$Y_R = R_T - \left( R_W - \left\lfloor \frac{R_T - Y_{IP}}{R_F} \right\rfloor \right), 0 < Y_{IP} < \frac{R_T}{2}, R_F | Y_{IP} \quad (32)$$

Which can be re-organized by observing the subtraction of $R_W$ causes an underflow of the machine word (mod $R_T$) so the need for the MOD brackets to maintain mathematical correctness, $$Y_R = \left\| \left\lfloor \frac{R_T - Y_{IP}}{R_F} \right\rfloor - R_W \right\|_{R_T}, 0 < Y_{IP} < \frac{R_T}{2}, R_F | Y_{IP} \quad (33)$$

Therefore, equation (33) above shows how an in-correctly processed negative value is corrected to a positive answer which is then cast back as a result in the negative range of a larger target number system, i.e. the base extended number system whose range is $R_T$. The two correction operations of equation (32) are merged together as one subtraction operation (33) with corresponding wrap-under of the target number system whose range is $R_T$. Therefore, the novel and unique method of applying a correction factor $C_P$ to a negative value that is processed using a single mixed-radix pipeline is supported in theory and is not to be confused with the well-known "complement" operation 1715 of FIG. 17b, since applying a complement function to an improperly normalized negative value does not yield a correct answer.

For the more general case, a math substitution is made so the round-up and round-down brackets can be removed. To create a substitution, a value ε is defined which represents the truncated value during normalization, $$Y_{IP} = Z_{IP} + \varepsilon, R_F Z_{IP}, 0 < \varepsilon < R_F \tag{34}$$

Therefore, the non-normalized intermediate product $Y_{IP}$ is expressed as a sum of a value Zip which is evenly divisible by $R_T$, and a value ε which represents that portion to be truncated. To make this derivation, the complement of the truncated value ε is required, and is provided as, $$\bar{\varepsilon} = R_F - \varepsilon, 0 < \varepsilon < R_F \tag{35}$$

Therefore, a new "general correction constant" $C_g$ is derived using the following substitution of (34) and (35) into (29) to provide, $$C_g = \left\lfloor \frac{R_T - (Z_{IP} + (R_F - \varepsilon))}{R_F} + \frac{Z_{IP} + \varepsilon}{R_F} \right\rfloor, 0 < Y_{IP} < \frac{R_T}{2} \tag{36}$$

where the floor function brackets denote integer function only (not round down) since the truncation remainders is now included in the equations. The general correction constant is therefore, $$C_g = R_W - 1 + \left\lfloor \frac{2\varepsilon}{R_F} \right\rfloor, 0 < \varepsilon < R_F \tag{37}$$

The general correction constant $C_g$ accounts for the values influencing rounding. After careful analysis of the meaning of equation (37) above, it is shown that the perfect correction factor $C_P$ is equivalent to the general correction constant $C_g$ provided the rules for rounding of positive values is used for the case of negative values. The one exception is when the truncated remainder is equal to $R_F/2$, known as the tie-splitting case. In this case, the sign of the intermediate value dictates the polarity of the rounding value. Therefore, the summary for the mathematics of the new form of normalization is now, $$Y_R = \begin{cases} MR2R(\lfloor M_{IP} \rfloor_W) + ru, & \text{if } M_{IP} < \frac{R_T}{2} \\ MR2R(\lfloor M_{IP} \rfloor_W) - R_W + ru, & \text{if } M_{IP} > \frac{R_T}{2} \end{cases} \tag{38}$$

with a single bit round-up value ru calculated using, $$ru = \begin{cases} 0, & \text{if } \lfloor M_{IP} \rfloor_F \leq \frac{R_F}{2} \\ \overline{\text{sign}(x)}, & \text{if } \lfloor M_{IP} \rfloor_R = \frac{R_F}{2} \\ 1, & \text{if } \lfloor M_{IP} \rfloor_F > \frac{R_F}{2} \end{cases} \tag{39}$$

Equation (38) describes a new procedure for fixed-point arithmetic in RNS which can be explained as follows. If the value of $M_{IP}$ is less than $R_T/2$, the intermediate value is positive, and the standard procedure for normalization applies, i.e., the mixed-radix value is truncated and converted back to RNS; a round-up value is also added if the truncated mixed-radix digits exceed a rounding trigger value $R_F/2$. If the value of $M_{IP}$ is greater than $R_T/2$, the intermediate value is negative, and the standard procedure for normalization is performed followed by a subtraction of the whole range value $R_W$; a round-up value is also added to the value if the truncated digits exceed $R_F/2$.

It might be argued that correction of an improperly normalized negative number is simply a standard complement function, however, as demonstrated in this disclosure, this is not correct. In both fixed-radix and RNS number systems, a complement is derived by subtracting the equivalent positive value from the entire range of the number system, $R_T$, as provided in (27). For the problem of correction of negative values normalized as if they are positive values, equation (38) indicates the whole number range $R_W$ be used for correction; moreover, the order of subtraction is different, i.e., the correction constant is subtracted from the "improperly" normalized negative value. If a basic complement function is used instead, the incorrectly processed value is subtracted from the total range $R_T$, thereby complementing the incorrect result and so the result is still not correct.

For the objective of correcting an improperly normalized negative value of equation (28), it is noted equation (38) contains two case terms each of which operate on the same value $M_{IP}$, which implies a single pass mixed-radix conversion be used instead of two mixed-radix conversions of the prior art, or the two mixed-radix conversions suggested by equation (20). However, for the correction to be applied per the case clause of equation (38), the normalization apparatus must also detect the sign polarity of the normalized value $M_{IP}$. The sign polarity of the value $M_{IP}$ can be detected by measurement of the magnitude of $M_{IP}$ using a mixed-radix conversion comparison approach. In one preferred embodiment of the present invention, the pipeline normalization unit performs a mixed-radix conversion for several reasons, one reason is to determine the comparison result of the magnitude of $M_{IP}$ versus half the total range $R_T/2$ so the comparison case of equation (38) can be determined.

Figure 18A:
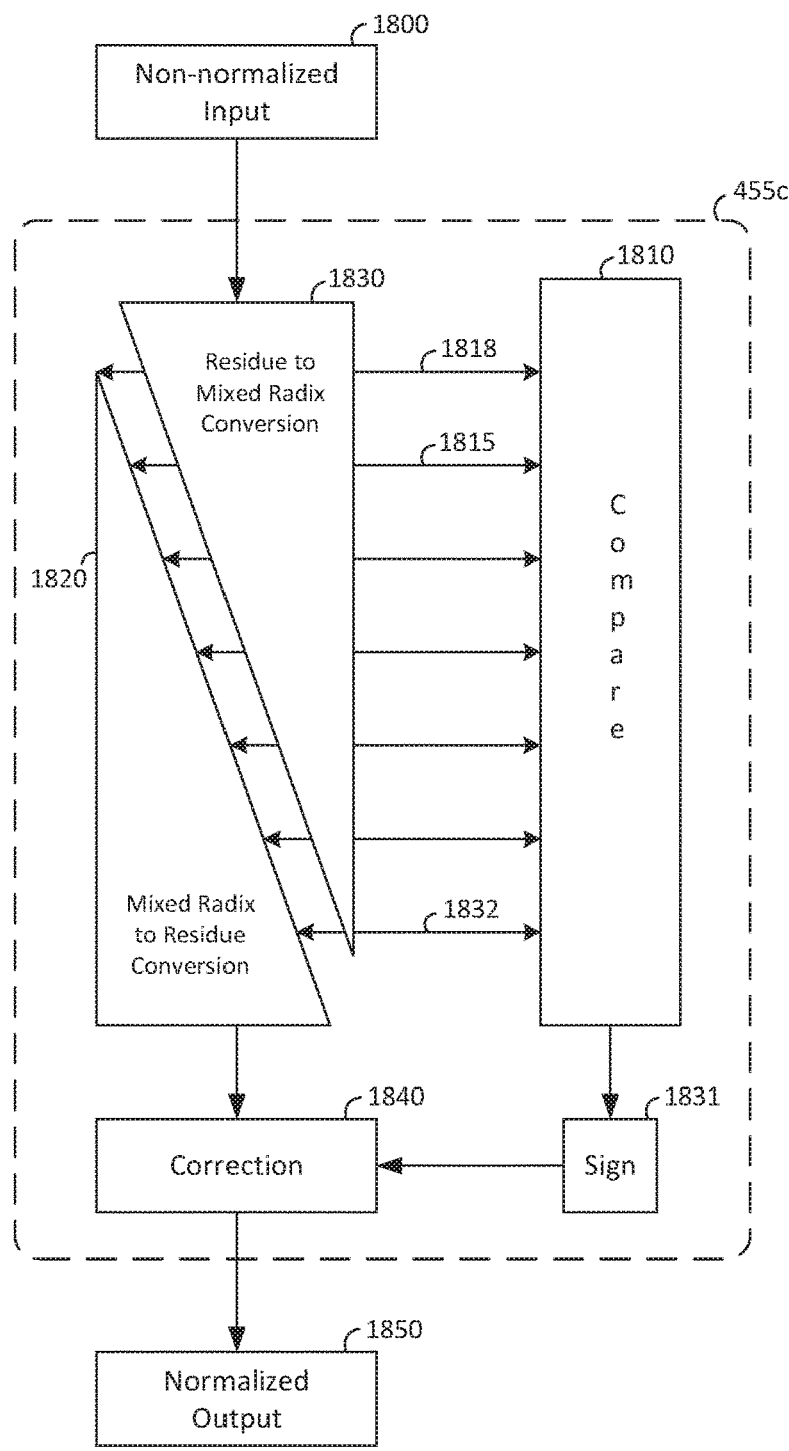
FIG. 18a is a block diagram of an exemplary pipelined product normalization unit with single mixed-radix conversion and negative value correction.
Figure 18B:
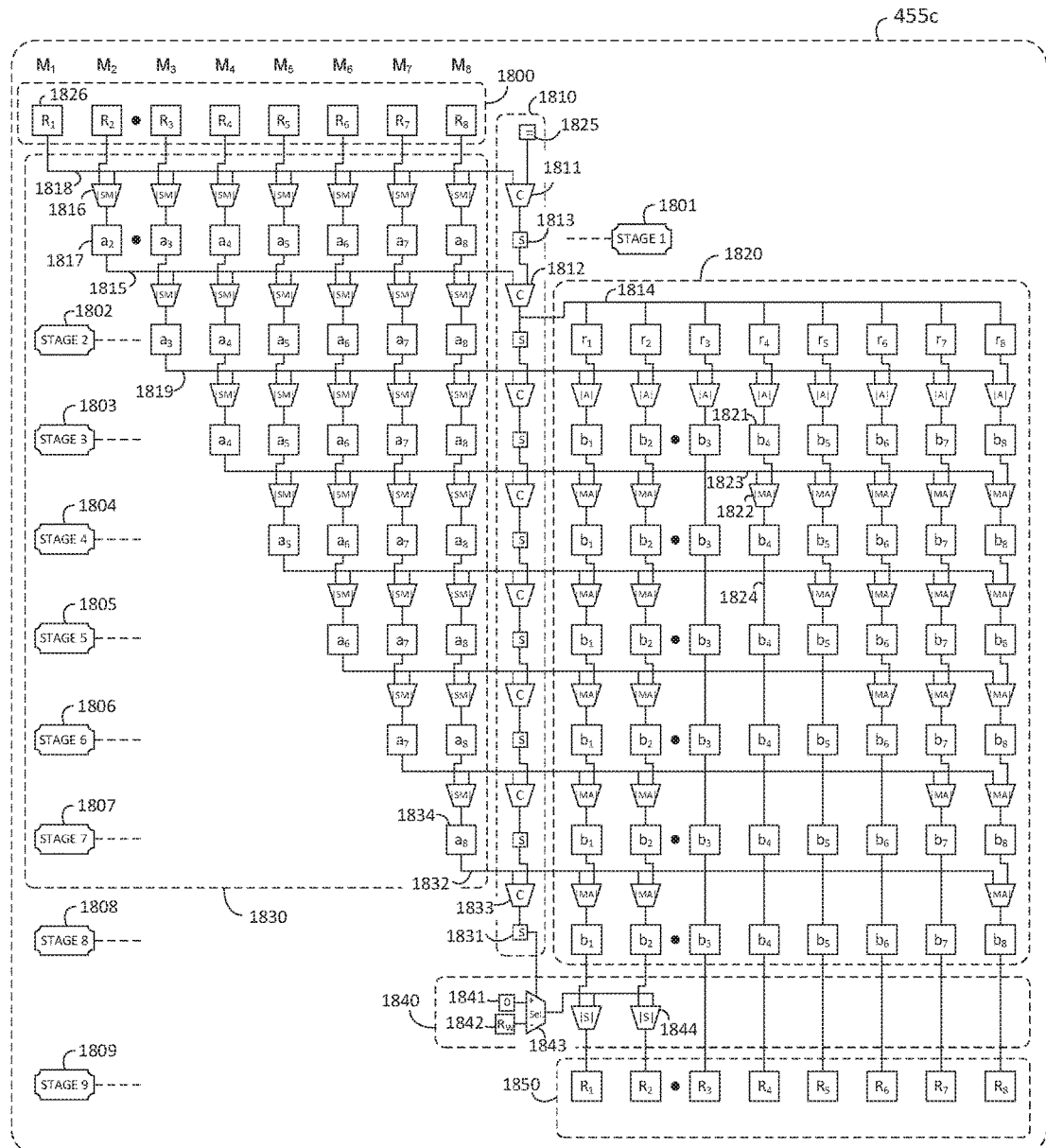
FIG. 18b is a block diagram of an exemplary pipelined product normalization unit with single mixed-radix conversion and negative value correction.

FIG. 18a and FIG. 18b discloses a preferred embodiment for a pipelined normalization unit 455c which may be used to implement the normalization pipeline 455a of FIG. 4. FIG. 18a is one example only and is suitable for use with the eight-digit fixed-point example number system of FIG. 3a. Many other variations are possible, which is plainly evident to those skilled in the art of modular circuit design. The preferred normalization pipeline 455c of FIG. 18b requires less than half the circuitry versus the pipelined normalization unit 455b of FIG. 17b. This significantly improves efficiency of the RNS matrix multiplier design since values are not processed and then discarded as in the pipeline 455b of FIG. 17b.

FIG. 18a shows a preferred pipelined normalization unit 455c consisting of four major sections; an RNS to mixed-radix conversion unit 1830, a pipelined comparison unit 1810, a pipelined mixed-radix to RNS converter 1820, and a negative value correction circuit 1840. A non-normalized input is stored at input register 1800 and is available in nine pipeline stages at the output register 1850 as shown in FIG. 18b by means of example. Each major section of the pipelined normalization unit 455c is comprised of one or more functional elements. FIG. 18b is provided to provide detailed explanation of FIG. 18a.

The next sections introduce each basic functional element of the normalization pipeline 455c of FIGS. 18a and 18b and a typical FPGA or ASIC solution for each functional element before disclosing a normalization data example of FIG. 18f.

The functional element symbols used in the present disclosure may be a modular arithmetic function or may be a binary arithmetic function. To identify each type, this disclosure adopts a convention so that modular arithmetic elements are denoted using arithmetic or alphanumeric symbols enclosed by MOD brackets | |, so that the symbols "|+|" and "|x|" are used to denote a modular adder and a modular multiplier, respectively. To denote a standard binary adder or multiplier, only the "+" and "x" symbol is shown on the element block symbol.

Figure 18C:
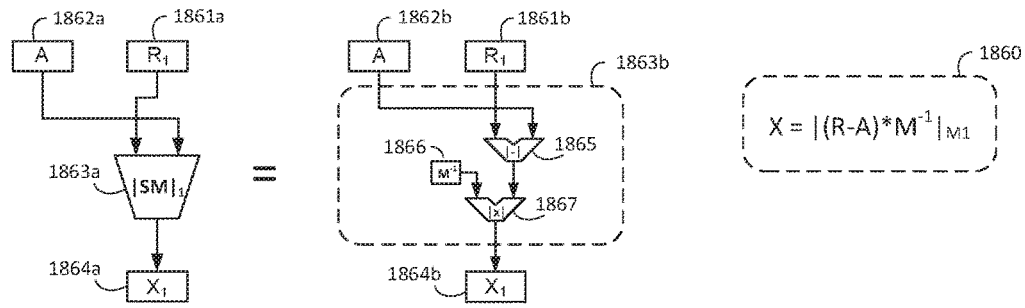
FIG. 18c is a block diagram of an exemplary modular subtract then multiply |SM| element.

To organize and abbreviate the complexity of the modular circuits of the present invention, it is preferable to adopt symbols for the "processing elements" (PE) that comprise the modular circuits. PEs hide the complexity of their internal operation and are useful building blocks as they may be re-usable in more than one design or application. For example, FIG. 18c illustrates a symbol for a modular "subtract then multiply" (|SM|) processing element 1863a. The basic |SM| symbol is typically denoted by a trapezoid symbol 1863a in FIG. 18c and represents a modular operation on an RNS digit R 1861a and an RNS (or mixed-radix) digit A 1862a. The |SM| function is provided in equation form denoted within dotted circle 1860; note that the equation 1860 includes a MOD function associated to a digit modulus M. In some illustrations, the subscript of the MOD operation of the trapezoid symbol 1863a indicates the modulus of the digit operation, as is the case of symbol 1863a by means of example. In other illustrations of the present invention, the subscript is omitted, and the modulus of the digit processing element is implied by its position in the pipeline or circuit.

The |SM| function 1863a is a common task in mixed radix conversion, since at each stage of mixed radix conversion, a digit value A 1862a is subtracted from a residue digit R 1861a. The |SM| symbol may be expanded to disclose more of its internal operation using an equivalent modular circuit enclosed by dotted lines 1863b. The processing element |SM| is therefore seen to be a modular subtraction 1865 followed with a modular multiplication 1867. Note the modular multiplier 1867 is a "multiply by constant" variation, which requires less circuitry than an arbitrary modular multiplier, (such as arbitrary modular multiplier consisting of stages 925a, 930a of FIG. 9b, which is required within the matrix multiplier 400a of FIG. 4.) The value of the multiplicative constant used in each processing element is dependent on the modulus of the digit, and on the position of the PE in the circuit. For most applications, the multiplication is performed using a constant $M^{-1}$ 1866, which represents the multiplicative inverse of a "dividing modulus" $M_A$ with respect to the modulus of the digit processing element, $M_1$, in this example.

The |SM| processing element 1863a of FIG. 18c appears in numerous locations within the RNS to mixed-radix conversion pipeline unit 1830 of FIG. 18b, such as |SM| processing unit 1816. The specific |SM| processing element 1816 subtracts the value of the incoming RNS digit $R_1$ from the incoming RNS digit $R_2$ and multiplies the result by the multiplicative inverse of $M_1$ with respect to $M_2$, which is implied by the relative position of the PE 1816 in the pipeline section 1830. The result of the digit operation is stored in digit register $a_2$ 1817. This is a common digit operation during mixed radix conversion and forms the basis for schematic representation and definition of each mixed radix conversion cycle, or "STAGE" denoted using STAGE 1 plaque symbol 1801 which designates the first pipeline stage or cycle of mixed radix conversion for purposes of reference and disclosure. Labeling specific stages of the pipeline of FIG. 18b is helpful to aid the disclosure but may not coincide with pipeline stage references in practice.

Figure 19:
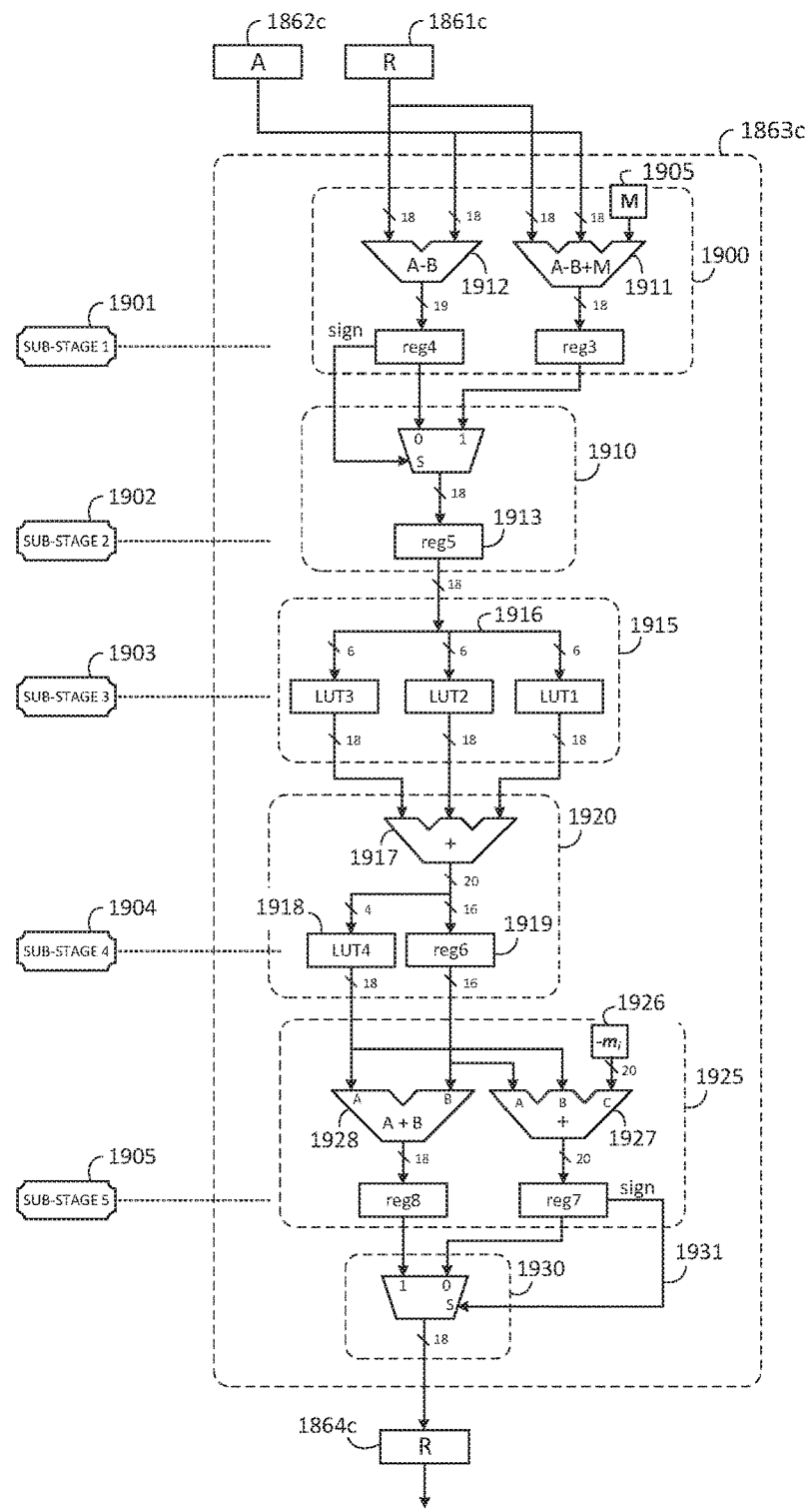
FIG. 19 is a block diagram of an exemplary modular subtract then multiply |SM| element schematic using binary resources.

There are many circuits that may be used to implement a modular subtract then multiply |SM| processing element. In one example of the present invention, the |SM| processing element is implemented from common Verilog or VHDL components descriptions available in FPGA and ASIC libraries. For example, the |SM| processing element 1863a of FIG. 18c may be constructed using commonly available "binary" library components as shown in the schematic of FIG. 19. (At the time of this writing, modular library components are not readily available, so that virtually all FPGA and ASIC libraries consist of only "binary" components.)

In FIG. 19, an example implementation of the |SM| processing element 1863b of FIG. 18c is shown as a pipelined |SM| processing element enclosed within dotted circle 1863c. FIG. 19 shows each pipeline stage is designated using stage plaques, such as SUB-STAGE 1 plaque 1901. The stages are labeled as "sub-stage" to differentiate them from the primary pipeline cycle stages introduced earlier, but this designation is arbitrary. At SUB-STAGE 1, 1901, the incoming digit value A, 1862c, is subtracted from the incoming digit value R, 1861c using two subtractors, 1911, 1912. The result of the subtraction which is positive is passed to register reg5 1913 via selection circuit 1910. The subtraction is modular, so that a "wrap-under" is detected and corrected in circuit section 1910. Note the modular subtraction is limited in range such that the digit A is generally restricted to be less than the modulus M 1905 of digit R 1861c.

Because of the range restriction of the modular subtraction of a basic |SM| element, mixed-radix conversion is typically performed on the least value digit modulus $M_1$ of digit $R_I$ first and proceeds with successively larger value digit modulus up to the "highest value" modulus $M_8$ of digit $R_8$ of the normalization pipeline 1830 of FIG. 18b. In the sample embodiment of the TPU invention, the hardware pipeline 1830 organizes digit modulus $M_1$ through $M_8$ from least value to most value 1800 corresponding to the sample RNS modulus set of FIG. 3c such that the first RNS digit converted by mixed-radix conversion pipeline 1830 starts with $R_I$ and progresses digit-by-digit at each STAGE of the pipeline until digit $R_8$ is processed at STAGE 7 1807.

It should be noted that other embodiments of the RNS to mixed-radix converter 1830 may perform mixed-radix conversion on digits of varying size and sequence, such that modular subtraction comprising a subtractor circuit 1900 of FIG. 19 is generally not sufficient.

With the modular subtraction complete, the |SM| processing element 1863*c* of FIG. 19 multiplies the result of the modular subtraction 1913 with a pre-set constant designated as $M^{-1}$. One method for performing the modular multiplication by a constant value $M^{-1}$ is to use a look-up table (LUT), or alternatively a series of smaller LUTs, such as LUT1, LUT2, and LUT3 as shown enclosed in circuit section 1915. Each LUT1, LUT2, LUT3 of section 1915 translates the input value to be the product of the input value 1916 with the constant $M^{-1}$ and reduced modulo $M_1$. In a typical embodiment, the input value data bits 1916 are split between separate memory devices as shown by the 18-bit address bus 1916 divided into three buses of 6-bit address bits each, since it is only the significance of the input (address) bits at each LUT that are translated to a product by a constant $M^{-1}$, and reduced modulo $m_i$. Therefore, as additional LUTs are used to perform the modular multiplication, additional values modulo $m_i$ must be summed and further reduced modulo $m_i$.

Equations to fill each LUT of circuit section 1915 with the required data patterns for modular multiplication by a constant $M^{-1}$ are disclosed in equations (40), (41) and (42), $$\text{LUT1}(x) = ((x \& 0 \times 3f) * M^{-1}) \% m_i \qquad (40)$$

$$\text{LUT2}(x) = (((x \& 0 \times 3f) << 6) * M^{-1}) \% m_i \qquad (41)$$

$$\text{LUT3}(x) = (((x \& 0 \times 3f) << 12) * M^{-1}) \% m_i \qquad (42)$$

The tradeoff of using more LUTs results in less memory bits required but at the cost of more modular results to sum and then reduce. These tradeoffs are known by skilled modular circuit designers and may be made without affecting the invention at hand. For example, in the circuit of FIG. 19 the output of three LUTs are shown feeding a 3-input adder 1917 in circuit section 1920. The final modular result of a modular multiplication is restricted to be less than the digit modulus $m_i$, but cannot be so restricted when using more than LUT since it is possible the sum of more than one value modulo $m_i$ may exceed the value $m_i$. This problem is solved using the circuit section 1920 where the result of the sum of three values modulo $m_i$ is further reduced using LUT4 1918 and reg6 1919 at sub-stage 4, 1904. In the circuit section 1920, the LUT4 1918 translates the upper 4 bits of the summation 1917 modulo $m_i$ thereby producing a value modulo $m_i$, and this value is summed to the least significant sixteen bits of the summation 1917 using circuit section 1925.

The summation of LUT4 1918 and reg6 1919 is a modular sum, so that circuit section 1925 provides addition modulo $m_i$, using constant $m_i$ 1926. The circuit of FIG. 19 handles a single digit modulus $m_i$ so the constant $m_i$ 1926 matches the constant $m_i$ for programming LUT entries using equations (40), (41), an (42). In circuit section 1925, two summations are made, one using a two-input adder 1928 and the other a three-input adder 1927 with the third input of adder 1927 assigned to the negative value of the digit modulus $m_i$ 1926. Using the sign of the result of adder 1927, the selector unit 1930 steers the correct modular result to be stored in output register R 1864*c*. In other words, if the result of adder 1927 is positive it is the correct result, otherwise, the correct result is sourced from adder 1928, passed by selector 1930 and stored in output register R 1864*c*.

Figure 18D:
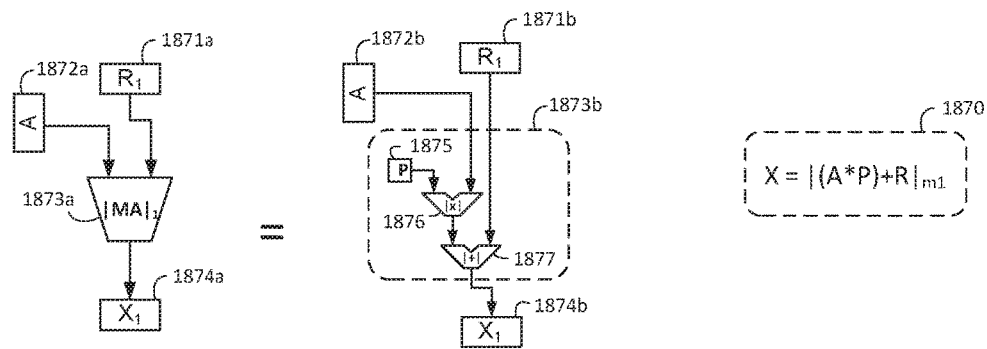
FIG. 18d is a block diagram of an exemplary modular multiply then add |MA| element.

Another common processing element comprising the normalization pipeline unit 455*c* of FIG. 18*b* is a "modular multiply then add" PE element 1822 denoted using the |MA| symbol. The |MA| processing element is also shown in FIG. 18*d* as a trapezoidal symbol 1873*a* designated with the |MA| symbol. Additional detail of an equivalent |MA| processing element is enclosed within dotted lines 1873*b* which shows a modular multiplier 1876, modular adder 1877 and multiplier constant 1875. The functional equation for the modular multiply-add |MA| processing element 1873*a* is enclosed in dotted lines 1870. In practice, the multiply-add processing element 1873*b* performs modular multiplication of an incoming digit A 1872*b* with a preset constant value P 1875 using modular multiplier 1876, and then performs a modular addition of the modular product with the incoming value R 1871*b* using modular adder 1877.

The modular multiply-add function 1870 is typically used to reconvert mixed-radix digits back to RNS format, therefore, |MA| processing elements appear in the mixed-radix to RNS conversion pipeline 1820 of FIG. 18*b*. One method used for reconversion is to compute the respective weight, or "positional significance" of each mixed-radix digit and sum all computed values. In a fixed-radix number system like decimal, we often cite a digit having a "positional power", but mathematically speaking, the mixed-radix number is not a series of powers but a series of products, so more specifically each mixed-radix digit has an associated "positional product" which is designated by the constant P 1875. The constant P 1875 of FIG. 18*d* is generally different in value for each |MA| processing element of pipeline 1820 since the digit modulus is different for each digit column in a pipeline, and since the positional power at each pipeline STAGE is different.

In FIG. 18*b*, the |MA| processing element 1822 receives a residue digit from a previous stage digit storage register $b_4$ 1821 and adds to it the modular product of the weighted mixed-radix digit received via bus 1823 and a constant value representing the digit power, such as constant P 1875 of FIG. 18*d*. During the re-combination of mixed-radix "weighted powers" into RNS, certain digit powers may be zero in specific locations of the converter pipeline 1820, and therefore the |MA| processing element is replaced with a delay line, such as delay line 1824. The delay line 1824 is required to maintain synchronization between digits needing processing by a |MA| processing element, and those digits only requiring delay storage.

Figure 20:
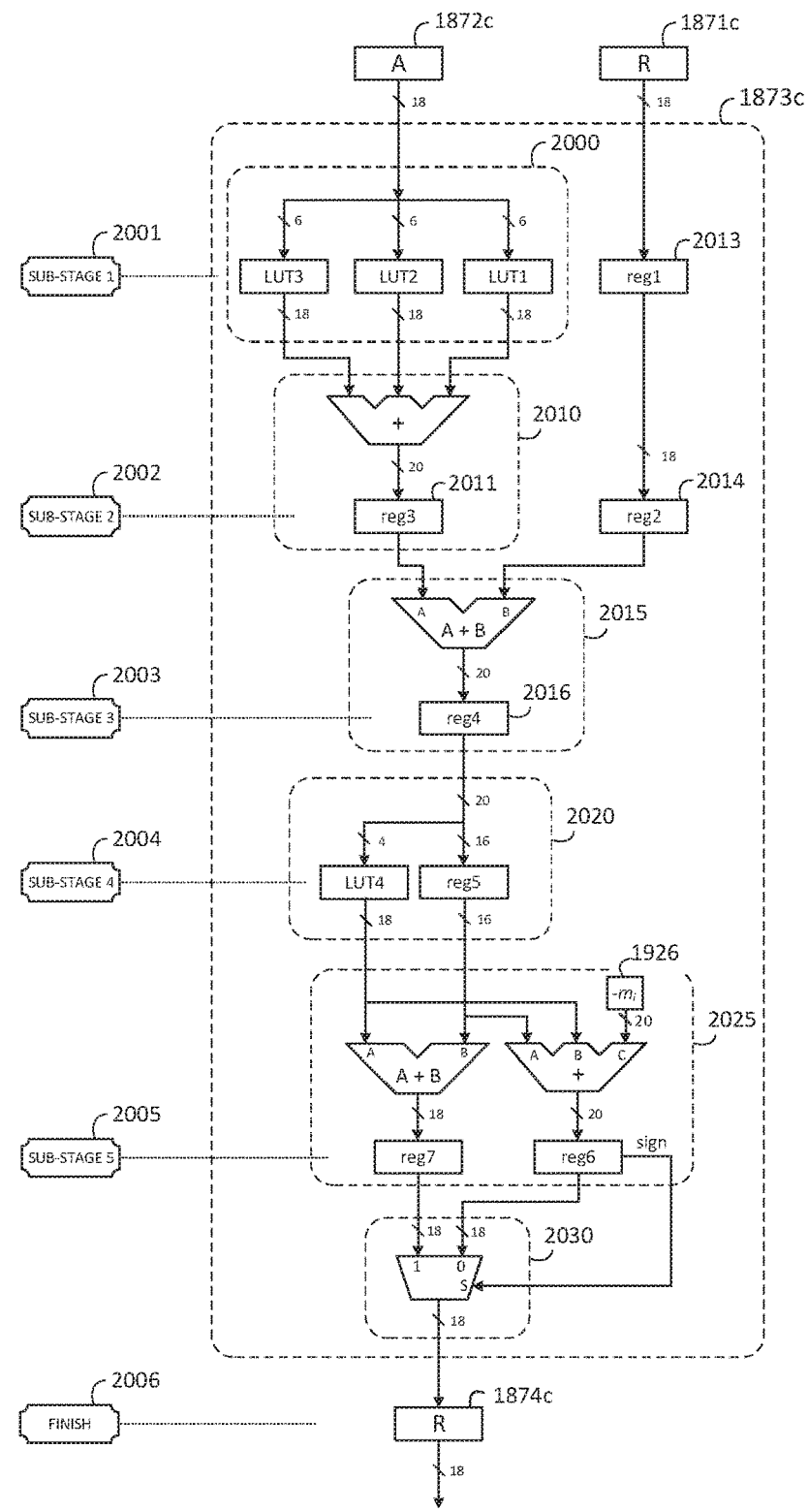
FIG. 20 is a block diagram of an exemplary modular multiply then add |MA| element schematic using binary resources.

In one embodiment of the present invention, the multiply-add |MA| processing element 1873*b* of FIG. 18*d* is synthesized using of the schematic of the |MA| processing element 1873*c* of FIG. 20. FIG. 20 shows a detailed schematic block diagram of a pipelined multiply-add |MA| processing element constructed from standard binary library components and suitable for the example TPU apparatus of the present invention. FIG. 20*a* shows the |MA| processing unit divided into a plurality of sub-stages, such as SUB-STAGE 1, 2001, to help clarify the operation and data flow of the pipeline 1873*c*.

In FIG. 20, the value of the input digit A 1872*c* is multiplied by a constant P using three LUTs LUT1, LUT2, LUT3 shown enclosed within dotted lines 2000. Any number of LUTs may be used to perform the multiplication by a constant; for example, as many as eighteen 1-bit memory tables, or as few as one LUT can be used. There are subtle tradeoffs in selecting the number of LUTs known by those skilled in the art of modular circuit design. Less memory has a tradeoff of more summation terms, while less LUTs result in less summation terms but at the expense of more LUT memory bits.

In the example |MA| circuit 1873*c* of FIG. 20, three LUTs are used to perform a modular multiplication by a constant value P. The input operand A 1872c is 18 bits wide which is partitioned into three 6-bit buses, each bus representing a portion of the total value to be multiplied by constant P. The product of P and the equivalent value of the 6-bit bus is pre-computed modulo $m_i$ and stored into the associated LUT memory location. Equations which define the data patterns in each LUT enclosed in dotted lines 2000 is given by means of example as, $$LUT1(x)=((x\&0\times3f)*P)\%m_i \quad (43)$$

$$LUT2(x)=(((x\&0\times3f)<<6)*P)\%m_i \quad (44)$$

$$LUT3(x)=(((x\&0\times3f)<<12)*P)\%m_i \quad (45)$$

Because three LUTs are used, the final answer is first derived by taking the sum of the three modulo results using the 3-input adder circuit 2010 and storing the result in reg3 2011. The |MA| processing element 1873c must also perform a modular addition with the additive operand R 1871c. The operand R 1871c may be delayed using one or more registers, such as register 2013, 2014, so that operand R is staged in synchronization with the associated sum reg3 2011 to be summed using adder circuit 2015 and stored in register reg4 2016. The value stored in reg4 2016 is congruent to the desired modular digit result referred for this discussion as 'X' and is 20 bits wide. To reduce the congruent value X farther, reduction circuit 2020, 2025 and selector circuit 2030 is included. The operation of the reduction circuit 2020 and 2025 is like the reduction circuit 1920 and 1925 of FIG. 19 respectively and will not be explained here. The output of selector circuit 2030 sends the modular result to the output register R 1874c of the multiply-add processing element 1873c by means of example.

The normalization pipeline 455c of FIG. 18b is also comprised of a pipelined comparison unit 1810 which in turn is comprised of a series of comparison processing elements denoted with a "C" and a series of sign data storage registers denoted with an "s", ex., such as comparison processing element 1811 and sign storage register 1813. The RNS to mixed-radix converter pipeline circuit 1830 produces a mixed-radix digit at each pipeline stage, such as pipeline STAGE 1 1801 and transmits each mixed-radix digit via a series of mixed-radix digit buses, such as bus 1818. The pipelined circuit produces a mixed-radix digit at each digit bus on every clock cycle in one embodiment. For example, at the start 1800 of the pipeline 1830, a mixed radix digit (equivalent to RNS digit $R_I$) is transmitted on digit bus 1818 which is connected to comparison processing element 1811. As an RNS value progresses through each STAGE 1 1801 through STAGE 7 1807 of the mixed-radix conversion pipeline 1830, a mixed-radix digit is generated and transmitted via a mixed-radix digit bus and connected to a corresponding comparator processing element. In this manner, an RNS value 1800 is converted to mixed-radix format and is simultaneously compared to one or more constants in a typical embodiment of the normalize pipeline 455c of FIG. 18b of the present invention.

One reason to compare the RNS value processed in the mixed radix pipeline section 1830 of FIG. 18b is to determine if a round-up is to be applied to the result 1850. In one embodiment of the present invention, a round-up unit stored in register $r_1$ through $r_8$ is added to the result 1850 if the fractional digits are greater than or equal to half the fractional range, $R_F$, as described by equation (39). In the example apparatus of FIG. 18b, the first two mixed-radix digits generated by pipeline unit 1830 comprise the value of the fractional range, $R_F$, since two digits are assigned to the fractional range in this example which supports the example number system of FIG. 3a.

In FIG. 18b, the first mixed radix digit is sourced as the initial $R_I$ digit register 1826 and transmitted via bus 1818 to comparator 1811. The comparator 1811 compares the value of the mixed-radix digit to a constant digit C and the result is stored in sign bit register storage s 1813. The constants stored in each comparator processing element C are mixed-radix digit values which represent a constant value organized least significant digit first starting with comparator 1811 and progressing through each STAGE of the comparator pipeline 1810 until comparator 1833.

Figure 18E:
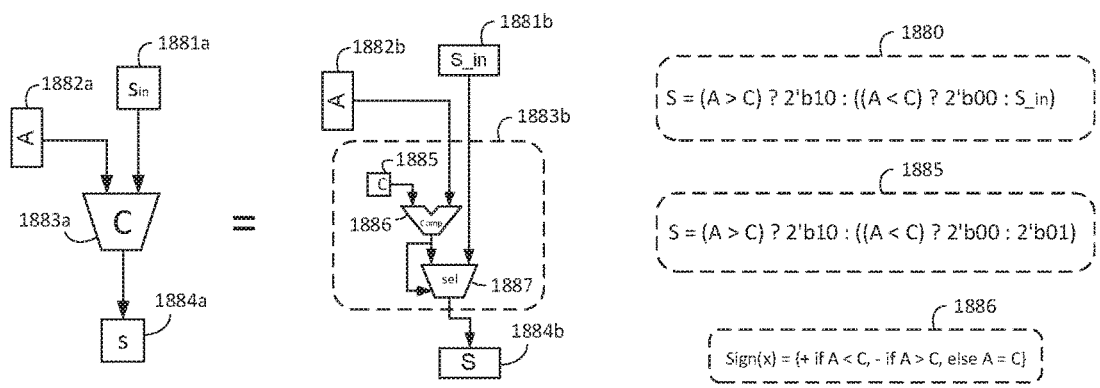
FIG. 18e is a block diagram of an exemplary pipeline comparator C element.
Figure 21:
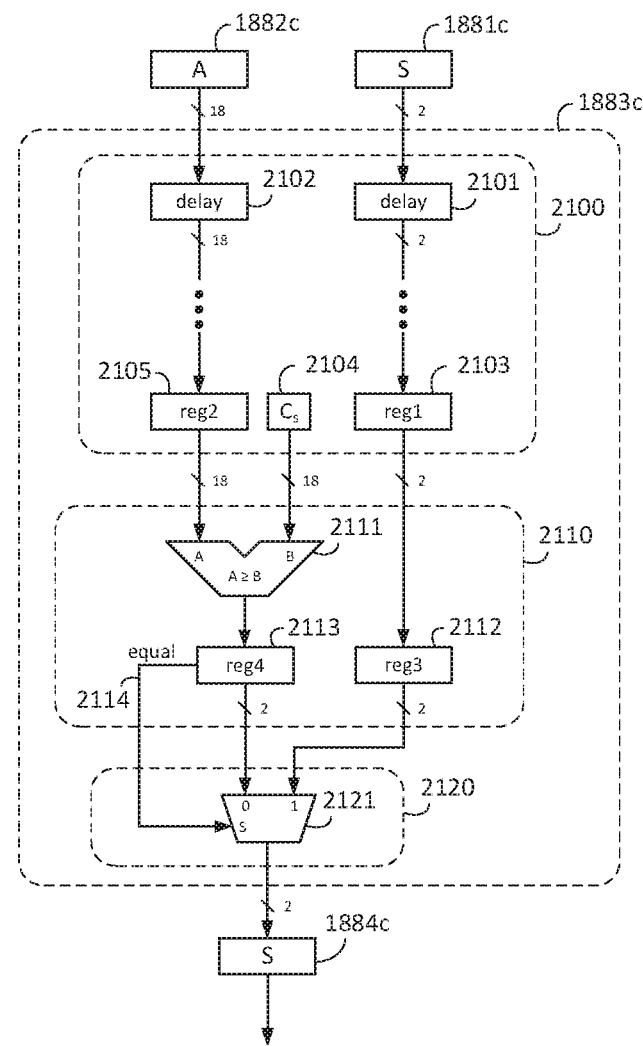
FIG. 21 is a block diagram of an exemplary pipeline comparator element.

The comparator unit 1883a, 1883b of FIG. 18e may be implemented using standard binary components and using the schematic of comparator processing unit 1883c of FIG. 21. In FIG. 21, the comparator processing unit 1883c is comprised of a digit value input A 1882c, and a prior stage sign state input 1881c and produces a sign state output S 1884c. The sign state is arbitrarily encoded, however, in one embodiment, two bits are used to encode up to three sign states using logic function 1885, FIG. 18e, i.e., a greater than state is encoded to a binary 2, a lesser than state is encoded to a binary zero, and an equal state is encoded to a binary one. Using this two-bit encoding, an equal state can be detected which is mapped to a negative value, or alternatively, to an error condition.

The comparator processing pipeline 1810 of FIG. 18a is designed to compare least significant digits first; as a consequence, the comparator processing unit 1883c of FIG. 21 will "over-write" the sign state calculated by a prior stage comparison unless the digit comparison result is "equal". If the comparison of the input value A 1882c is equal to constant C 2104, the selector circuit 2120 passes the prior stage sign state reg3 2112 to output sign state register S 1884c. Otherwise, if the comparator output 2113 is not an "equal" result, i.e., the comparator 2111 result is greater than or lesser than, the result of the comparison 2111 is passed to output sign state 1884c via selector 2121. For the first comparator element 1811 of FIG. 18b, the prior sign stage is set to an equal sign state as indicated by the "=" constant symbol 1825. The digit comparison element 1883c may also include a delay circuit 2100 to delay the value of the input digit A 1882c and prior sign state 1881c to coincide with the result of other processing elements within the normalization pipeline 455c of FIG. 18b.

Continuing the disclosure and discussion of FIG. 18b, at pipeline STAGE 1 1801 the second mixed-radix digit is sourced from register $a_2$ 1817 and is transmitted via digit bus 1815 to comparator processing element 1812. If the digits are equal the result of the prior comparator processing element 1811 stored in register 1813 is passed to the next sign bit storage register at pipeline STAGE 2 1802. In the example of the present invention, the result of the comparison of two mixed-radix digits produces a rounding bit, or round-up unit ru, which is transmitted from comparison processing element 1812 via round-up bus 1814 to each digit $r_1$ through $r_8$ of the initial value stage of recombination pipeline 1820 (STAGE 2, 1802) of the mixed-radix to RNS conversion pipeline 1820.

Because of the method used to recombine and convert mixed-radix digits back to an RNS value within the pipeline section 1820 of the present example, the carry unit may be added at the initial cycle at pipeline STAGE 2 1802. Other embodiments may add the carry unit at the final stage, or at some other convenient stage of the normalization pipeline unit 455c. However, the initial STAGE 2, 1802, as shown, is convenient and represents optimal distance in many cases.

Many details are left out of FIG. 18b, such as register to register data flows that may help in re-timing, etc. These advanced topics, such as signal fan-out and bus loading are known to those skilled in the art of circuit design.

Another reason to perform a comparison of the RNS value undergoing mixed-radix conversion (MRC) in pipeline section 1830 is to determine the sign polarity of the value. To perform this task, the comparison must include all digits of the value, which is why the comparison pipeline unit 1810 extends downwards to compare each mixed-radix digit as they are generated, including the first mixed radix digit $R_1$ 1826 and progressing to the last mixed radix digit as 1834 transmitted via bus 1832 connected to the last comparator element 1833. The result of the complete comparison is stored in sign storage register 1831. In some embodiments not shown, the sign result is converted to "sign bits" associated with or stored alongside the result 1850, i.e., to support encoding of sign magnitude notation for output 1850.

Some details of the design of comparison pipeline unit 1810 may differ depending on several factors, one factor being the chosen number system modulus. For example, in many cases, the same digit constants used to compare half the fractional range $R_F$ are used during the comparison of half the total range $R_T$. In some cases, if a modulus based on a power of two is implemented as the final fractional digit, a single high-order bit of the mixed-radix digit may be used to indicate round-up, and the comparator processing elements used for fractional digit comparison, such as comparator element 1811, are removed. Note, however, the sign comparators generally remain if fully signed normalization is supported.

The normalization pipeline 455c of FIG. 18b. is a preferred embodiment and includes advanced features, such as negative value correction circuitry 1840 which allows the normalization unit 455c to support a single pass mixed-radix conversion cycle regardless of the sign of the intermediate product 1800. (Note that negative correction circuitry is not to be confused with arithmetic complement circuitry). The negative value correction circuitry 1840 is activated when the final sign range comparison state 1831 indicates the magnitude of the converted RNS value 1800 exceeds the end of the positive number range according to the sign(x) function of equation (26). In this case, the correction constant equal to the whole range $R_W$ 1842 is subtracted from the fractional range digits $R_1$, $R_2$ using a modular subtractor, such as modular subtractor 1844 and the result is stored in the final output register 1850 for further processing. If the converted RNS value 1800 is positive, the sign range comparison state 1831 indicates a positive value so that the correction circuit 1840 is not activated, i.e., the correction circuit 1840 subtracts the value zero 1841 from the result stored in output register 1850.

Note that since the correction constant $R_W$ 1842 is a product of all whole digit moduli, the RNS digit values associated with the whole range of the constant $R_W$ are zero; therefore, there are no modular subtractors required for whole digits within the correction unit 1840.

FIG. 18f shows a data dump table of the normalization pipeline 455c of FIG. 18b for a positive input value 1800 which is held stable at the input 1800 for a period of 9 pipeline stages. Holding the input data to a pipeline unit provides a means to see the progression of a single data value as it is processed at each stage of a pipeline. In actual applications, each data value at each stage of a pipeline is independent in the methods disclosed herein. At the start row 2260 of the table of FIG. 22b, the intermediate product of the fixed-point value "3.14159265" and the value "2.71828182" which is expressed in RNS format in the starting row is the number 89545603522057926247910. The intermediate product number doesn't mean much in a casual glance, but this value is normalized to a smaller RNS integer 1896 which represents the correct answer "8.53973422" in RNS fixed-point format as shown by the normalized RNS value of Row 384a of FIG. 3c.

Improved and Streamlined Normalization Pipeline

Figure 22A:
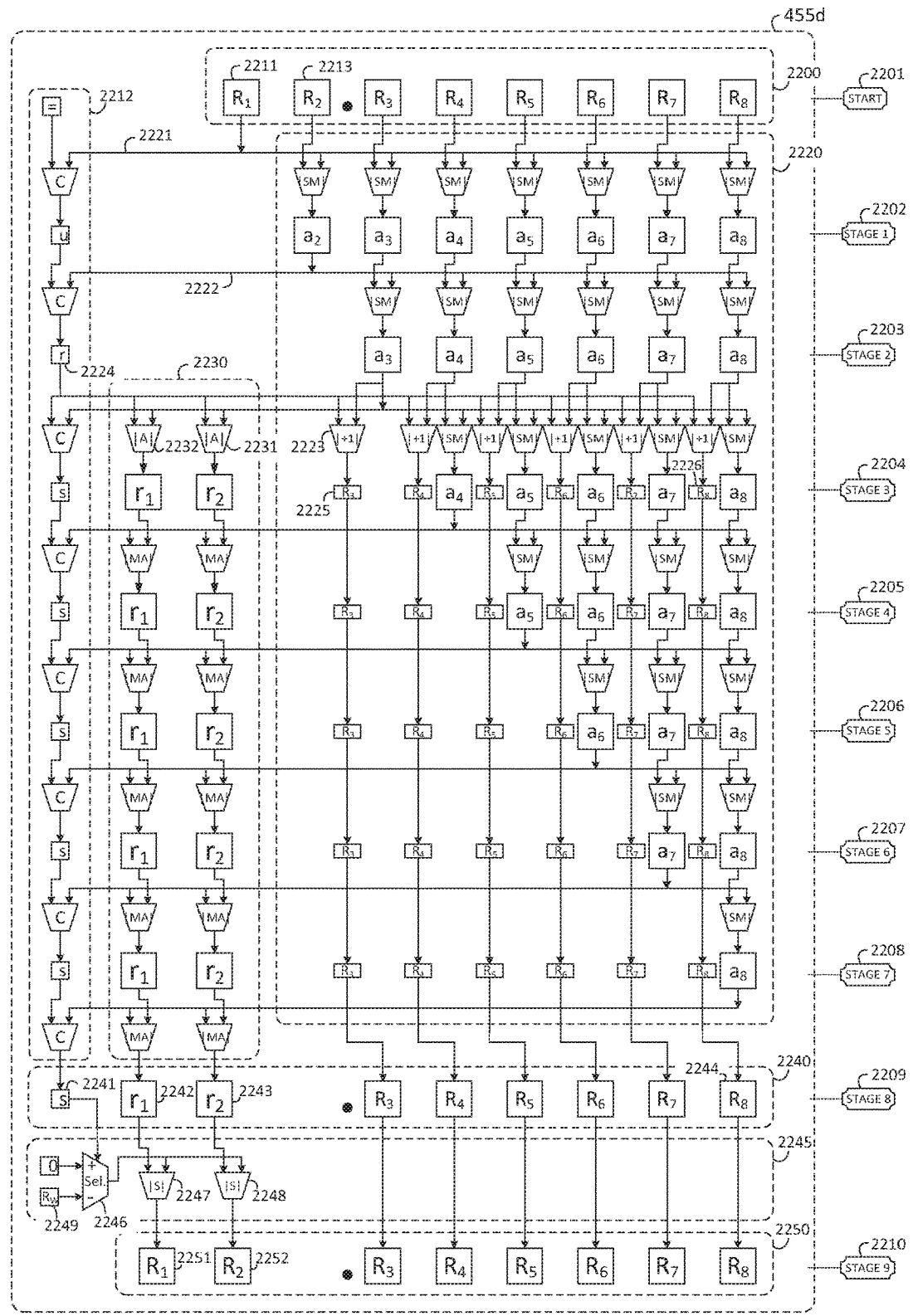
FIG. 22a is a block diagram of an exemplary streamlined product normalization pipeline with negative value correction.

An alternate embodiment and a further streamlined version of the normalization pipeline unit 455c of FIG. 18b is shown as the normalization pipeline unit 455d of FIG. 22a.

An overview of the normalization pipeline unit 2200 of FIG. 22a. is as follows. The non-normalized input 2200 is coupled to an RNS to mixed-radix converter pipeline 2220. The mixed-radix converter 2220 generates mixed-radix digits at each stage of the pipeline, such as at pipeline stage 2 designated by the STAGE 2 plaque 2203 and dotted line. Mixed-radix digits are transmitted from the mixed-radix converter pipeline 2220 to a pipelined comparison unit 2212 using digit buses, such as digit bus 2221 and digit bus 2222. The mixed-radix digit buses are also connected to a mixed-radix to RNS recombination unit 2230. Note the mixed-radix to RNS recombination unit 2230 of FIG. 22a is significantly smaller than the mixed-radix to RNS recombination unit 1820 since the mixed-radix to RNS converter 2230 only includes support for recombination of the fractional digits ($r_1$, $r_2$) of the RNS fixed point number system.

In FIG. 22a, the reconversion of the whole digits of the RNS fractional number $R_3$ through $R_8$ is not required by noting the pipeline storage registers $a_3$ through as of the mixed-radix converter 2220 at pipeline STAGE 2, 2203, represent the final reconverted RNS digits $R_3$ through $R_8$ 2250 but without rounding added. The reason is the normalized result represents a division by the fractional range $R_F$, according to equation (15); therefore, after "dividing out" both fractional digit modulus during mixed-radix conversion, the remaining RNS digits $a_3$ through as of pipeline STAGE 2, 2203, represent the desired whole RNS digits of the answer but without any rounding applied. In terms of RNS terminology, therefore only the fractional digits $r_1$, $r_2$ are required to be "base extended" using the mixed-radix to RNS digit recombination pipeline 2230.

The streamline circuit of FIG. 22a adds a rounding value to each whole digit of stage 2, 2203, using a modular adder, such as modular adder (or modular increment unit) denoted by a trapezoid with a |+1| designation 2223, and stores each modular sum to storage registers $R_3$ 2225 through $R_8$ 2226 of STAGE 3, 2204. As shown each modular adder |+1| will add a single rounding unit if the rounding comparison result storage u 2224 is true. Storage registers $R_3$ through $R_8$ of pipeline STAGE 3, 2204, through STAGE 7, 2208, route the RNS digits from STAGE 2, 2203 to the final stage registers 2240, at STAGE 8 2209 and generally serve to delay RNS digits to maintain synchronization with other associated data in the pipeline.

The normalization pipeline 455d of FIG. 22a supports an RNS number system as shown in the example number system of FIG. 3c wherein two digits, $R_1$, $R_2$ are assigned to the fractional range 370. As previously stated, each stage of the mixed-radix converter unit 2220 produces a mixed-radix digit which is transmitted to each stage of the mixed-radix to RNS recombination pipeline 2230; each digit is converted to an equivalent RNS value and summed with the prior stage digit value of the same digit modulus (column). This recombination of mixed-radix digits back into RNS digit data is performed using multiply-add |MA| processing elements at each stage of the recombination pipeline 2230, such as |MA| processing elements 2231, 2232.

A normalized RNS result is produced by the normalization pipeline 455d of FIG. 22a at pipeline STAGE 8, 2209, and is stored in digit register $r_1$ 2242 through $r_8$ 2244 of result register 2240. A sign state associated with the result 2240 is stored in sign polarity state storage register s 2241 and is used to control the correction value passed by selector 2246 to modular subtract processing elements 2247, 2248. If the processed value 2240 is a positive value as indicated by sign stage 2241, a zero value is passed by selector 2246 which is subtracted from the result before the result is stored in final result register 2250; thus, positive values are not affected by the correction circuit. Alternatively, if the sign state register 2241 indicates a negative value, the selector 2246 passes a correction value $R_W$, 2249, which is subtracted from the register result 2240 before the result is stored in the final register 2250. Note because the correction constant $R_W$ has zeroes in all whole digit positions $R_3$ through $R_8$, there is no requirement for a modular subtraction unit |S| for whole digits in correction processing stage 2245.

The normalization pipeline 455d of FIG. 22a requires less than 30% of the resources versus the normalization pipeline unit 455b of FIG. 17b obtained by "un-rolling" or "pipelining" prior art methods. The significant reduction of circuitry results in better overall efficiency and speed. Furthermore, the normalization pipeline circuit of FIG. 22a is implemented using standard binary logic and requires only general-purpose logic resources in FPGA devices, such as 6-input LUTs (MLABs), arithmetic logic modules (ALMs) and Logic Elements (LEs). This is important, since "hard IP resources" such as hardwired 18×18 binary multipliers within FPGA devices are reserved for use within the matrix multiplier 400a of FIG. 4.

It should be noted the resource requirements of the streamlined product normalization pipeline 455d of FIG. 22a provides an excellent balance for modern RNS based computation since it takes relatively few matrix multipliers to make up for the "cost" of the array of modular multipliers within pipeline elements such as the |SM| and |MA| elements; one reason is the normalizer pipeline multipliers are of the "multiply by a constant" variety, and they are significantly smaller in IC area than an arbitrary binary or modular multiplier needed for the matrix multiplier unit 400. A second reason is the normalization unit 455d pipeline depth and digit input-width are independent of the matrix row and column dimensions.

In FIG. 22b, an arithmetic example of the operation of normalization pipeline 455d of FIG. 22a is provided. Because pipeline designs may operate on a plurality of data at once, for analysis and illustration it is instructive to hold the input data to a single data value for all clock cycles, so that the propagation of data derived from the same input can be seen at each stage of the pipeline. In actual operation, the data values at any instant in the pipeline will hold data that is generally un-related in each stage of the pipeline.

The normalization pipeline arithmetic example of FIG. 22b begins with an RNS input data value listed in the first row 2260 which is the example RNS value in row 383b of the sample data Table 360 of FIG. 3c. This data value is the RNS (integer) product of data value "3.14159256" of Row 382 and data value "2.71828182" of Row 383a of FIG. 3c. The product of Row 383b is herein called an "intermediate product" since it represents a value which must be normalized; the value is re-listed in Row 2260 in FIG. 22b as the starting data value for the present example.

The RNS intermediate product value at row 2260 is processed at each stage of the normalization pipeline 455d corresponding to STAGE 1, 2261, through STAGE 9, 2269, of FIG. 22b. In the present example of FIG. 22c, the data result is determined to be positive by the sign comparator pipeline result column 2074 which indicates a "lesser than" sign at STAGE 8 row 2268. Because the positive result does not require a correction, the processed data at STAGE 8 2268 is passed to the final STAGE 9, 2269, without correction applied. Since correction only affects fractional digits $R_I$ of column 2275 and $R_2$ of column 2276, the resulting fractional digits of STAGE 8, 2268 are passed unchanged to STAGE 9, 2269, as a final fractional digit result 2079. The final fractional digits 2279 is part of the overall RNS answer when combined with the final whole digit result 2277.

In FIG. 22b, during processing of the fractional digits $R_I$, column 2275, and $R_2$ column 2276, at row 2262 of STAGE 2, a value of "one" is generated by the rounding comparator which is stored as the initial starting values 2080 for fractional digit $R_I$ and $R_2$ at row 2063 of STAGE 2. In some embodiments, a sign flag associated with the sign of the normalized result 2277, 2279 may be stored based upon the sign comparison result 2278.

In FIG. 22c, the complement of the starting value of FIG. 22b is used. The complement is the value that would be processed in the case of a negative answer. For example, the product of 3.14159256*−2.71828182 provides a negative intermediate product indicated by residue digits column $R_I$ 2292 through column $R_8$ 2293 and is in Row 2282 labeled Start of FIG. 22c. By means of example, data values for each stage of the pipeline processing is again indicated in each Row 2283 STAGE 1 through Row 2291 STAGE 9 with the assumption that the input data value of Row 2282 is held for 9 clocks. This allows the progression of a single processed value to be tabulated as it progresses through the pipeline normalization unit 455d of FIG. 22a.

In the example of FIG. 22c, the negative value of the present example is processed using mixed radix conversion and has a different set of outcomes from the example of FIG. 22b; specifically, the rounding value for fractionally associated digits $R_I$ and $R_2$ 2296 are set to zero at Row 2284, and the sign comparison result S of column 2294 and Row 2290 STAGE 8 is "greater than" which indicates the processed value is negative. In FIG. 22c, a negative result occurs because the mixed radix digits generated by mixed radix converter 2220 of FIG. 22a are treated as a mixed-radix number, and the comparison pipeline 2212 of FIG. 22a determines this number is greater than the mixed radix constants listed in column 2295, also treated as a mixed-radix number. Note the last residue digit $R_8$ of Row 2289 STAGE 7 contains the value 0×3FFFA which is larger than the constant 0×1FFFD, column 2295 of Row 2289, so the residue value reduced into mixed radix is larger than half the total numeric range, $R_T$, which indicates the value is negative according to equation (26).

Significant to the present invention is the data transition from row 2290 STAGE 8 to row 2291 STAGE 9 of FIG. 22c, since a correction to the fractional digits $R_I$ and $R_2$ of column 2296 is made before storing the fractional digits at STAGE 9, row 2291 if the result is negative. This is also shown in the circuit of FIG. 22a; the selector 2246 passes the whole range value $R_W$ to the subtractors 2247, 2248 so that a modular subtraction of the value $R_W$ is made to the STAGE 8 result 2209 registers labeled $r_1$ 2242 and $r_2$ 2243. Referring to FIG. 22c, the "whole" digits of the result 2297 remain un-modified in the transition from STAGE 8 to STAGE 9 and were transferred from STAGE 2 of row 2284 using pipeline registers in some embodiments to be latched as a final result, as indicated in the present example enclosed by dotted lines 2297.

The novel inventions and apparatus of FIG. 22a as further illustrated in examples of FIGS. 22b and 22c are numerous. For example, the normalization pipeline 455d of FIG. 22a only performs mixed-radix to RNS recombination on fractionally associated digits; in contrast, the normalization unit 455c of FIG. 18b performs RNS recombination on all digits using recombination unit 1820, which requires more circuit resources. For an 8-digit TPU design as shown herein for purposes of illustration, there are only two factional digits $R_1$, $R_2$ that must support re-combination of mixed-radix digits. Furthermore, RNS data representing negative values are directly normalized by the normalization unit 455d of FIG. 22a; direct normalization of negative values produces an incorrect result which is then "corrected" by subtracting a suitable correction constant. This novel and innovative RNS feature means only one mixed-radix conversion unit or pipeline is required for high-speed operation supporting both positive and negative numbers as direct input.

Base Extension Unit for Signed Operands

Referring to the matrix multiplier accelerator card 406 of FIG. 4, a base extend unit 443a is shown between DDR4 DRAM memory 445 and High-Speed Memory Interface 435. The base extend unit 443a is supported in some embodiments of the present invention to decompress, i.e., or base extend, the short word format RNS data stored in memory and output a fully extended format RNS word required by the matrix multiplier 400a. The TPU design of the present invention may support any number of digits for an extended RNS word, but the example used in the present disclosure supports 8 digits in a fully extended format, as shown in FIGS. 3a and 3b. Without the use of base extend unit 443a, storing and retrieving extended RNS data from memory device 445, such as DDR4 DRAM in one embodiment, will require at least twice as much memory storage, and twice as much energy compared with storing and retrieving "short" RNS format 351 data of FIG. 3a consisting of only 2 fractional digits 370 and two whole digits 372 as shown in FIG. 3b and by means of example.

The assumption for the operation of the base extend unit 443a is that RNS operands are sufficiently represented in a reduced digit format. This is to say that the longer "extended" RNS format 350 of FIG. 3a consists of one or more redundant digits 330, 340. Not shown in FIG. 4 is that redundant digits of the extended RNS data format are "truncated", i.e. discarded, before the RNS value is stored to memory via memory bus 444. RNS digits are restored, or "base extended" when data is moved from data memory 445 through base extend unit 443a; the base extend unit 443a outputs a fully extended RNS format which is moved to its intended location by the memory data router 435.

Figure 23A:
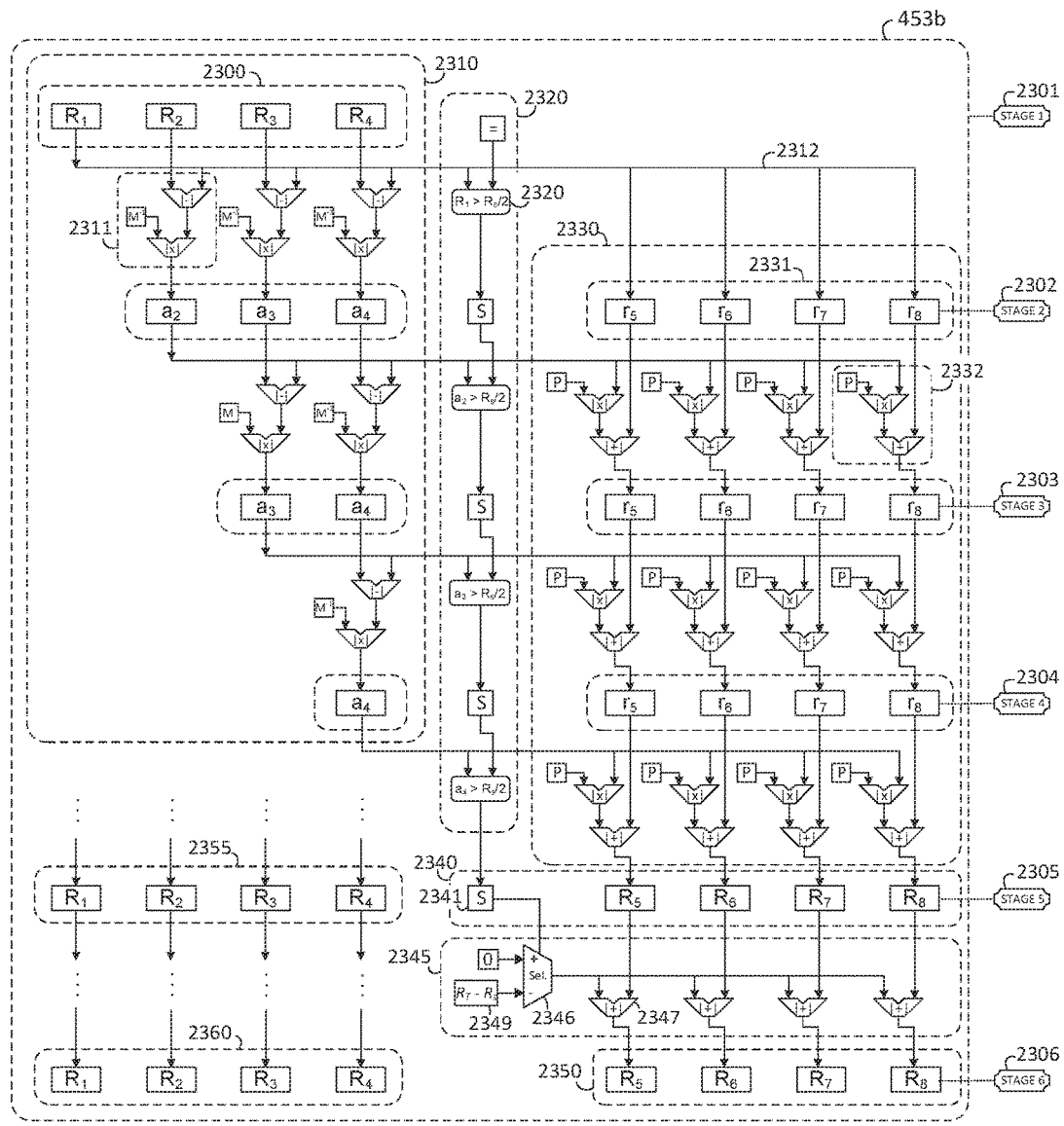
FIG. 23a is a block diagram of an exemplary base (digit) extension pipeline unit with sign extend.

In the example embodiment of the present invention, a base extend unit 453b of FIG. 23a is shown as a working example for means of disclosing key elements of the present invention. The base extend unit 453b of FIG. 23a is a pipelined unit and consists of a pipelined mixed-radix conversion unit 2310, a pipelined comparator unit 2320, a pipelined mixed-radix to RNS recombination unit 2330, and a negative range correction unit 2345.

Short format RNS data is presented as input at register 2300 and is converted to mixed-radix in the converter unit 2310. At pipeline STAGE 2, 2302, the first mixed-radix digit generated is transmitted via bus 2312 and is received into the recombination register 2331. As explained in similar circuits of this disclosure, the mixed-radix digits generated are simultaneously compared to a series of stored or hard-wired mixed-radix digits representing the sign range of the number format using comparator pipeline 2320; the series of digit comparisons, such as comparison 2320, results in a sign determination of the value presented at register input 2350 at STAGE 5, 2306, indicated by the state of the sign storage register S 2341. If the value detected by comparator unit 2320 is negative, the sign flag register S 2341 is set and directs selector unit 2346 to gate the value of the quantity $(R_T-R_S)$ 2349 to the modular adders, such as modular adder 2347, to correct for the proper offset for the negative value range.

The base extend unit of FIG. 23a is a novel invention. One property of RNS is the truncation of long format negative values to short format preserves the "method of complements" encoding, albeit in a smaller range $R_S$. However, when base extending the short format value, the base extend cannot account for the loss of range in returning to a two's complement value with respect to the larger range $R_T$ of the extended RNS format. The base extend unit 453b applies the negative range correction 2349 when a short format value is detected to be negative. To perform this function, the base extend unit measures the sign of a short format value using a sign range with respect to $R_S$, i.e., the comparator 2320 uses a constant $R_S/2$; the sign range $R_S/2$ is stored in mixed-radix format, typically in digit format, and applied as an operand to comparators of pipeline unit 2320. In one embodiment, the mixed-radix range comparison digits (not shown) are stored within or alongside comparators of the comparison pipeline 2320. When the value input at register 2300 is detected to be negative, an offset value of $R_T$-$R_S$ is restored to the result 2340 using modular adders 2347 thereby producing a corrected, base-extended negative result 2350, at final STAGE 6, 2306.

Equations for deriving the correction constant for the case of base extending a negative value in short fixed-point RNS format is, $$R_T - Y_x = C_{BE} + (R_S - Y_x) \tag{46}$$

The base extend correction constant $C_{BE}$ is therefore, $$C_{BE} = R_T - R_S \tag{47}$$

In FIG. 23b an example base extend operation is shown for purpose of disclosure. The value used in the present example is a short format fixed-point RNS value of Row 384b of FIG. 3c which is the same value of Row 384a except that only the first four digits are defined and is equivalent to the decimal value "8.53973422". This allows the short format fixed-point value to be stored in a memory location which is smaller than that required for the long format number of Row 384a of FIG. 3c. However, when the short format data value is moved from memory into the matrix multiplier unit 400a, it must be fully extended, i.e., all eight RNS digits must be valid in this example.

The example value is four digits wide comprising digit $R_7$ 2367 through $R_4$ 2368 and is held for 6 clocks at the input Stage 1 2360 of FIG. 23b representing data held at input register 2300 of FIG. 23a. In this example case, holding the data for 6 pipeline stages allows the data progression of a single data value to be listed stage by stage, such as STAGE 1 2360 through STAGE 6 2365. In actual operation, each stage of the base extend unit of FIG. 23a may contain processed data derived from different input values. During mixed radix conversion, the example value is determined to be less than the sign range constant indicated by the mixed-radix digits of column 2370 during mixed radix conversion. During the same mixed radix conversion, the digits undergoing base extend are recombined in digit columns $R_8$ 2371 through $R_8$ 2372 of FIG. 23b.

At STAGE 5 2364 of FIG. 23b, the mixed-radix conversion and mixed-radix digit recombination are complete and sign flag S of column 2369 indicates a lesser than state 2373. Because the value is positive, the extended digits $R_5$ through $R_8$ are correct, and are passed unchanged to STAGE 6 2365. Note the values of the digits are correctly base extended according to the long format example value of Row 384a of FIG. 3c.

In the example of FIG. 23c, the complement of the starting value of FIG. 23b is used. In this case, the first four digits of column $R_1$ 2387 through column $R_4$ 2388 is equal to the first four digits of the complement of the value "8.53973422" of Row 384c of FIG. 3c, which represents the decimal value "−8.53973422". The issue which arises is the result at STAGE 5 2384 is base extended, but only to the magnitude represented by the four digits alone. However, the sign flag S of column 2389 is set to "greater than" (>) 2393 at STAGE 5 2384 which indicates the value is negative with respect to the "short" negative value range $R_8/2$.

The minimum range of the negative numbers of a fully extended data value starts at the value $R_T/2$, which is significantly greater than the maximum range of the negative numbers of a short format data $R_8$, so that the value which is base extended using four digits cannot produce a value in the extended negative range. The reason is the range information of the negative representation of the long format fixed-point RNS word was lost during truncation of the value to short format. To recover the lost range information for the case of extending negative short format fixed-point value (or integer) value, the correction constant 2395 derived in equation (47) is added to the result of STAGE 5 2384 since the sign flag S 2393 is set to greater than, and so a final result at STAGE 6 2394 is produced which is correctly offset to an equivalent negative value relative to the long (extended) format range $R_T$.

The base-extend unit 443a of FIG. 4 in combination with the technique of storing short format RNS values to memory 445 provides a unique strategy in RNS processor design, since it relieves the high storage requirement of fully extended values and preserves the complement of truncated RNS values during short format storage and restores the complement after base extension to a fully extended value when the short format value is detected to be negative.

Forward Conversion Pipeline Unit

Important to the present invention is the high-speed forward converter 441a of FIG. 4. Many methods for forward conversion exist in the prior art of RNS research, however, complete pipelined forward converters which handle signed fixed-point or floating point forward conversion is not known in the prior art and is disclosed for the first time in this present invention.

Figure 24:
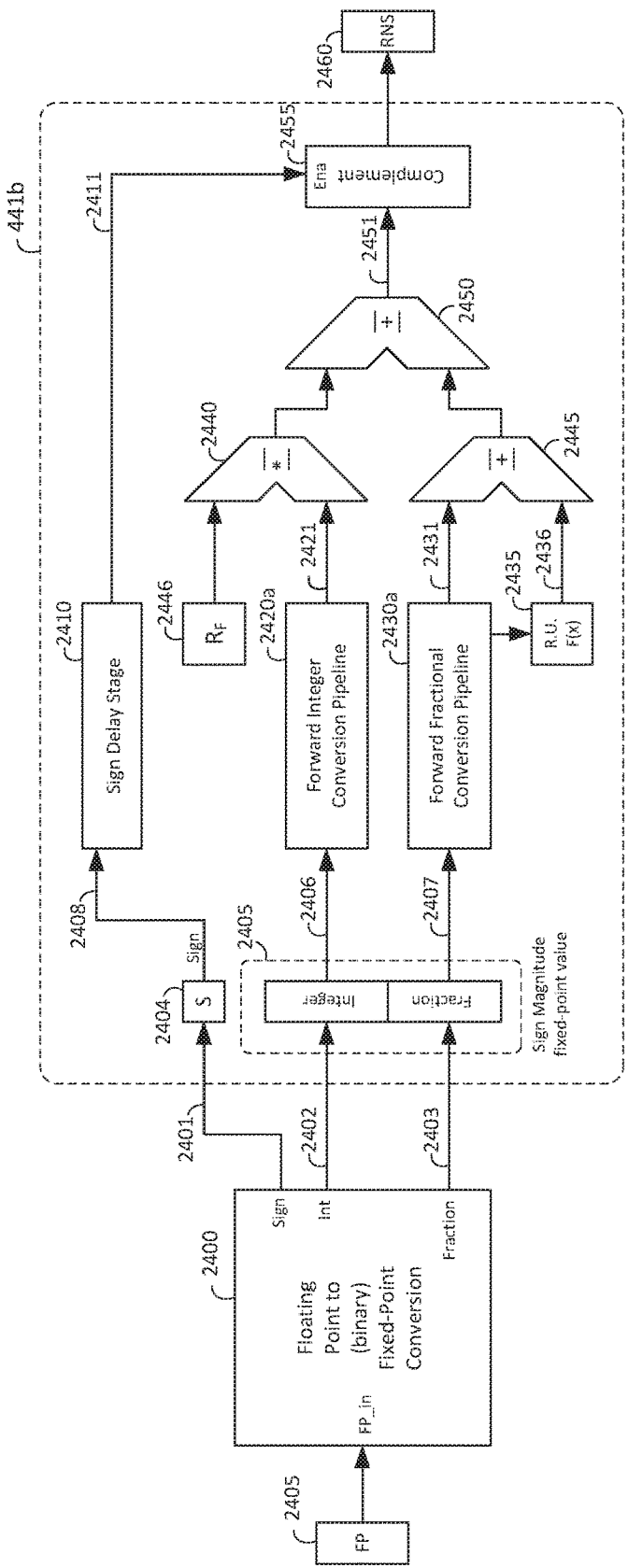
FIG. 24 is a block diagram of an exemplary floating-point number to RNS fixed-point converter pipeline block.

In FIG. 24, a block diagram for a forward converter 441b is disclosed which converts a binary floating-point format value from register source 2405 to a signed RNS fixed point value output to register destination 2460. IEEE standard floating-point formats are in common use and many Verilog and VHDL libraries exist to support common FPU operations including format conversions. One common format conversion is a floating point to fixed point converter 2400 of FIG. 24. The floating-point to binary fixed-point conversion unit 2400 converts a binary floating-point format and outputs a sign state signal 2401, a positive integer representing the whole portion of the floating-point value via bus 2402, and a positive fraction representing the fractional portion of the floating-point value via bus 2403. In one embodiment, the sign state transmitted via sign signal 2401 is latched into sign register 2404 and the signed whole integer and fractional binary values are latched into a register 2405 which stores the fixed-point equivalent value of the floating-point value in sign magnitude format.

A controller unit not shown synchronizes the latched sign data 2404 and the latched integer value 2406 and the latched fractional value 2407 by transmitting them in tandem to sign delay unit 2410, forward integer conversion pipeline 2420a, and forward fractional conversion pipeline 2430a respectively. The sign state delay line 2410 is used to keep sign data for each processed data element in synchronization. The forward integer conversion pipeline 2420a converts a binary value input using bus 2406 and outputs an RNS integer value at bus 2421 which is multiplied by the fractional range $R_F$ 2446 using modular multiplier 2440. The result of the modular multiply unit 2440 is transmitted to modular adder 2450.

The forward fractional conversion pipeline 2430a converts a binary fractional value input via bus 2407 and outputs an equivalent fractional RNS value via bus 2431 to modular adder 2445 where it is summed with the result of rounding function 2435 which in turn derives rounding data via the forward fractional conversion pipeline 2430a as shown in FIG. 24. The output of modular adder 2445 is transmitted to be summed with the output of modular multiplier 2440 using modular adder 2450. Modular adder 2450 performs a modular summation of the scaled whole RNS value and the rounded fractional RNS value in one embodiment of the present invention.

Continuing with FIG. 24, the output 2451 of the modular adder 2450 represents a positive value since the binary input 2406, 2407 is always a positive value. If the sign flag associated with a processed value 2451 indicates the value should be negative, a complement unit 2455 is enabled by the associated sign state via signal path 2411 so that the positive value is complemented, and therefore encoded into a negative number suitable for RNS processing. In some embodiments, a sign flag is also included with the fixed-point RNS output 2460 but is not shown in the block diagram of FIG. 24.

In the forward conversion embodiment of FIG. 24, a complement unit 2455 unit is used instead of a correction unit, since the value converted is always positive. Therefore, there is little need for the negative value correction circuitry described in other circuits of the present invention. This is because floating point format is typically encoded in a binary sign magnitude notation format.

Figure 25:
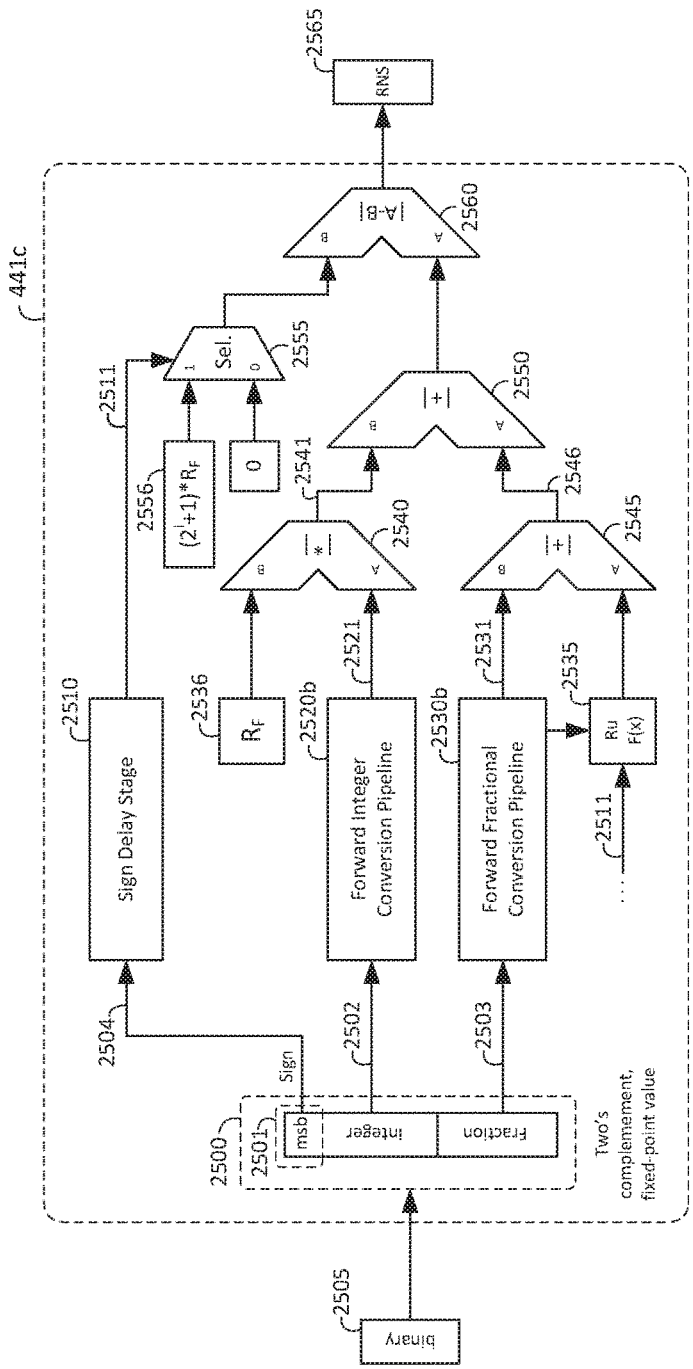
FIG. 25 is a block diagram of an exemplary signed fixed-point binary to fixed-point RNS converter pipeline block.

However, in some cases it is desirable to convert two's complement binary format directly into a signed RNS fixed-point format; one embodiment is disclosed in block diagram of FIG. 25. The forward converter of FIG. 25 accepts two's complement format directly, and if negative, applies a correction factor 2556 to adjust the incorrectly processed negative values into correctly signed values in RNS.

The correction factor for fractionally associated digits is ascertained by considering the conversion of a positive binary fraction n of a binary fractional range $2^N$ to a positive residue fraction r of an RNS fractional range $R_F$, $$\frac{n}{2^N} = \frac{r}{R_F} \tag{48}$$

Therefore, a positive residue fraction r is derived using, $$r = \frac{(n*R_F)}{2^N} \quad (49)$$

An issue occurs in the conversion equation (49) above when a negative value encoded using two's complement is directly converted since the converted value is not equal to the complement of the equation (49) since, $$\bar{r} = R_T - \frac{(n*R_F)}{2^N} \neq \frac{(2^N-n)*R_F}{2^N}, n > 0 \quad (50)$$

By solving for a forward fractional correction constant $C_{FF}$ (that will be subtracted) we have, $$R_T - \frac{(n*R_F)}{2} = \frac{(2^N-n)*R_F}{2^N} - C_{FF} \quad (51)$$

and reducing yields, $$-C_{FF} = |R_T - 1.0|_{R_T} \quad (52)$$

$$C_{FF} = 1.0 = R_F \quad (53)$$

The final interpretation of the correction constant, $C_{FF}$, in equation (53) above is that $C_{FF}$ is equal to −1.0, which is equivalent to subtracting the fractional range $R_F$, according to the definition of the value 1.0 in Row 385 of FIG. 3b. This interpretation accounts for the fact the modulo $R_T$ function in equation (52) is equivalent to under-flow of the machine word (i.e., word wrap-under) and so is removed by convenience of notation in equation (53). In other words, a modular subtraction of the value $R_F$ will invoke an under-flow of the machine word as it normally does.

The forward converter of FIG. 25 uses two conversion pipelines in tandem, an integer conversion pipeline 2520, and a fractional converter pipeline 2530. This provides more speed than the use of a single converter pipeline which attempts a full conversion of a binary value having both an integer and fractional quantity. If the binary input value is a positive quantity, the forward integer conversion pipeline converts the magnitude of the positive value and converts it to the same magnitude value in RNS which is correct. However, if the binary input value is a negative quantity, the forward integer conversion pipeline 2520 converts the magnitude of the two's complement of the integer portion, which is not the correct negative representation in RNS.

To correct for the case of directly converting negative values, a forward integer correction constant CFI is derived for the integer portion 2502 of the two's complement value 2501 of FIG. 25. To derive this constant, it is necessary to understand the binary ranges of the two's complement fixed-point value of the binary source operand 2501; the binary integer range ($2^i$) and binary fractional range ($2^f$) of the source operand are expressed as a product of the total range as, $$R_T|_{binary} = 2^T = 2_i * 2^f \quad (54)$$

It can be shown that if the input integer value 2502 is obtained by truncation of the fractional bits as suggested in FIG. 25, the negative integer value is encoded in a two's complement value with respect to the integer range ($2^i$), and not the total range. Therefore, when converting a negative encoded integer value k, 2502, the forward integer conversion pipeline 2520 converts an offset value, which can be corrected by subtracting the offset value. By observing the complement and its positive value should cancel to zero, and by observing the correction constant is negative if it is to be added to correct the incorrectly converted answer, the correction constant CFI, can be calculated, $$C_{FI} = (2^i - k) + k \quad (55)$$

$$C_{FI} = 2^i \quad (56)$$

Once the negative encoded value of k, i.e. ($2^i$−k), is converted to RNS, the equation for applying the correction constant in RNS to provide a correctly encoded negative value in RNS accounts for the underflow in the RNS system, so that the subtraction is performed in RNS using a modular subtraction, $$-k = |(2^i - k) - C_{FI}|_{R_T} \quad (57)$$

In other words, a modular subtraction of the correction constant $C_{FI}$ results in an underflow with respect to the RNS word size, which is $R_T$, and this operation corrects the value of the incorrectly converted negative integer to a properly encoded negative value in RNS.

The forward converter apparatus of FIG. 25 converts both the fractional portion and integer portion of the fixed-point input value 2501 which is summed using modular adder 2550. In one embodiment of the present invention shown in FIG. 25, the integer conversion constant $C_{FI}$ and the fractional conversion constant $C_{FF}$ are combined. Because the converted integer value is scaled by the fractional range $R_F$ using modular multiplier 2540, the integer conversion constant for correcting negative values is also scaled by $R_F$, so that a total forward correction constant $C_{FT}$ 2556 is subtracted using a single modular subtractor 2560 from the sum of the improperly converted negative fractional value 2546 and the improperly converted and scaled negative value of the integer value 2541, $$C_{FT} = C_{FF} + R_F * C_{FI} \quad (58)$$

$$C_{FT} = (2^i + 1) * R_F \quad (59)$$

Figure 26:
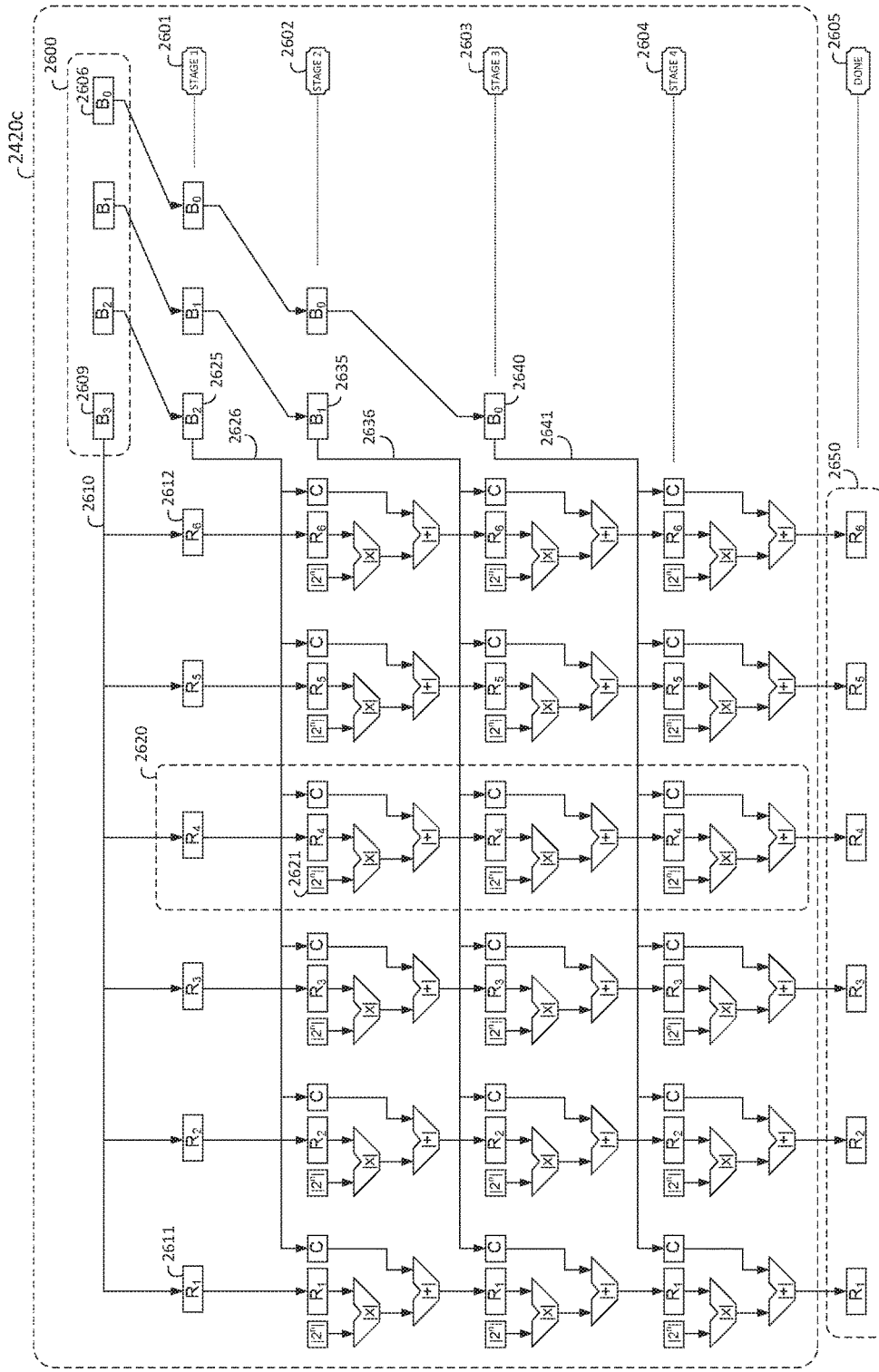
FIG. 26 is a block diagram of an exemplary forward integer conversion pipeline.

One embodiment for the forward integer conversion pipeline 2520b of FIG. 25 is shown using the forward integer conversion pipeline 2520c of FIG. 26. In FIG. 26, an input binary integer value 2600 is stored and partitioned into a plurality of binary digits $B_0$ 2606 through $B_3$ 2609 with each digit typically associated to a binary radix; for example, each of the four digits $B_0$ 2606 through $B_3$ 2609 in one embodiment will support a 16-bit encoding, i.e., or binary radix of $2^{16}$, which allows for a total binary integer conversion range of $2^{64}$, and a signed integer range of $2^{63}$. In each stage of the integer conversion pipeline 2420c an input binary digit is converted to a series of RNS digits, such as RNS digits $R_1$ through $R_6$, using a plurality of RNS digit recombination units, such as RNS digit recombination unit 2620.

For example, at STAGE 1 2601 of FIG. 26, the most significant binary digit $B_3$ is transmitted via bus 2610 to the input stage of each of the RNS digit recombination units $R_1$ 2611 through $R_6$ 2612. At each subsequent stage of the forward integer conversion pipeline 2420c, the most significant binary digit remaining is added to the current summation of the residue digits after the summation is scaled by a binary range representing the width of the binary digits $B_1$ 2606 through $B_3$ 2609. In the next stage, at STAGE 2, 2602, of the pipeline 2420c, the binary digit $B_2$ 2625 is transferred to the carry-in registers of each residue recombination digit unit. Each residue recombination unit, such as recombination unit 2620, multiplies the residue digit R at STAGE 1 by a modular constant representing the binary range of the previous binary digit modulo m, such as binary digit range constant |2^n| 2621, where n represents the binary width of a single binary digit in this context. In a typical embodiment, each binary digit $B_3$ 2609 through $B_0$ 2606 is the same width, so the constants are the same for each stage of the conversion unit for each digit modulus; however, the invention is not restricted to having binary digits of the same width.

A forward fractional conversion pipeline unit 2530b of FIG. 25 is shown. The forward fractional conversion pipeline 2530b converts an incoming binary fractional value 2503 to an RNS fractional value 2531. The converter 2530b performs two types of conversions, a format conversion, which is converting binary format to RNS format, and a fractional range conversion, which converts the binary value represented in a binary fractional space to an RNS value in an RNS fractional space.

The 'fractional space' may be fixed in some embodiments or may be adjustable, i.e. dynamic, in other embodiments. For means of disclosure, it is easiest to describe the operation of converter 2530b using a fixed binary input fractional space, and a fixed output RNS fractional space. It is noted that circuit details of a dynamic fractional range converter are not included in this disclosure but are understood by those skilled in the art of modular circuit design, and further those designers that understand the fixed range conversion operation of fractional converter pipeline 2530b of the present invention.

Figure 27A:
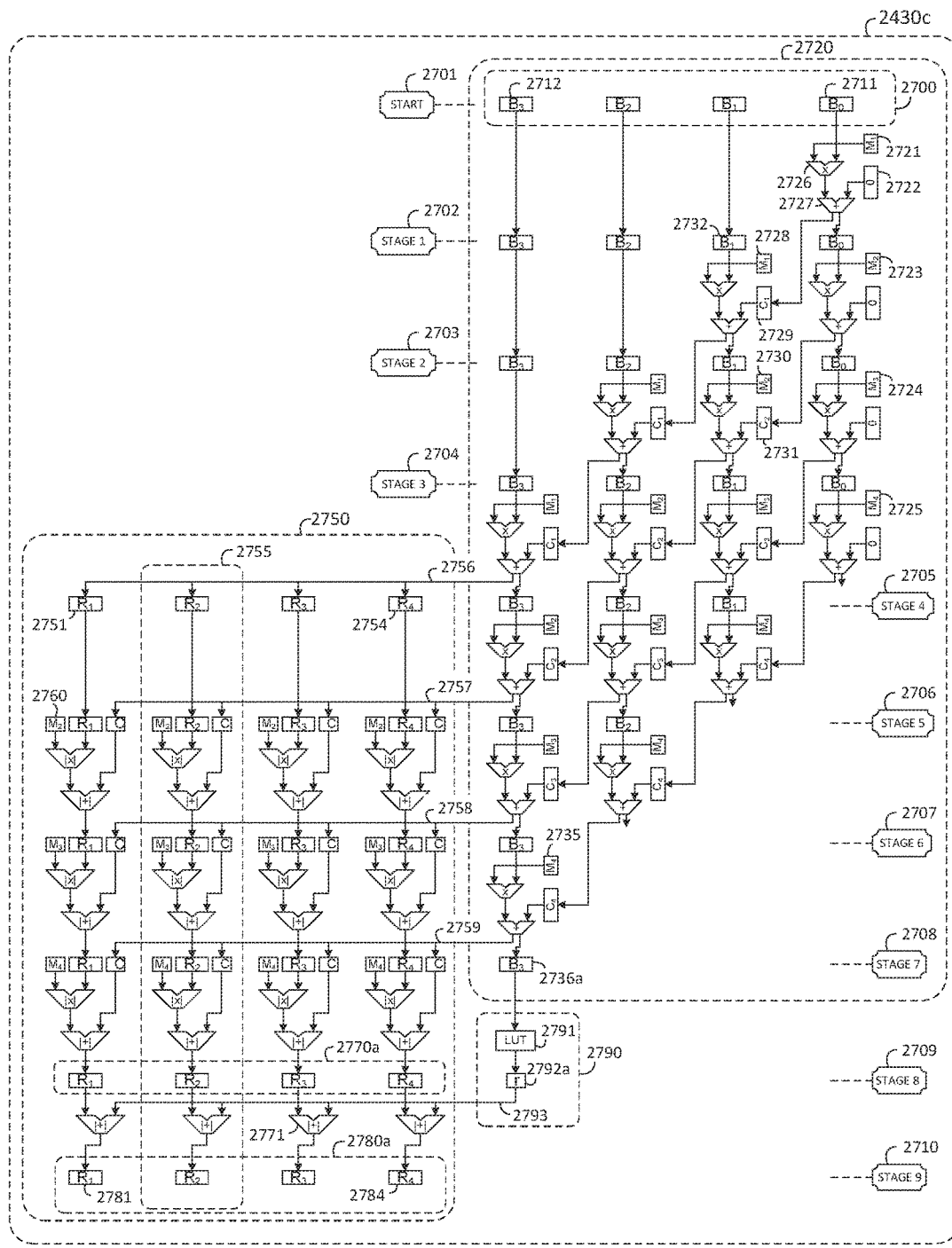
FIG. 27a is a block diagram of an exemplary forward binary fraction value to RNS fraction value conversion pipeline.

FIG. 27a discloses details of an example forward fractional conversion pipeline 2430c which may be used in a full forward conversion unit 441b, 441c to perform the function of forward fractional conversion pipeline 2430a, 2430b respectively. In FIG. 27a, a fractional binary input 2700 is sub-divided into a plurality of binary digits $B_0$ 2711 through $B_3$ 2712. In the context of the example, each binary digit $B_0$ 2711 through $B_3$ 2712 is 8-bits wide for a total of 32 bits of binary fractional range; one way to describe the binary fractional range is through the definition of its fractional unit, $$\text{binary fractional unit} = \frac{1}{2^N} = \frac{1}{2^{(4*8)}} = \frac{1}{2^{32}} \quad (60)$$

The fractional range is always expressed as "1.0", and a binary fractional value within a fractional range is any fractional value expressed where the numerator can take a value between zero and $(2^{(4*8)}-1)$ and the denominator is fixed at a value of $2^{32}$ in the example apparatus.

In the FIG. 27a, the forward fractional converter pipeline consists of a pipelined binary fraction to RNS fractional space converter unit 2720 coupled to an RNS digit recombination unit 2750 comprising a plurality of modular RNS digit recombination units, such as digit recombination unit 2755. The output of the plurality of RNS digit recombination units 2780 comprising digits $R_I$ 2781 through $R_4$ 2784 latch a converted binary fractional value at 2700 in RNS format and after nine stages of pipeline processing, each stage designated in FIG. 27a such as STAGE 1, 2702. The RNS fractional range is different than the binary fractional range, and may be expressed using the smallest unit of fractional measure called "ump", or unit of most precision, $$ump = \frac{1}{(m_1 * m_2 * \ldots * m_p)} = \frac{1}{R_F} \quad (61)$$

In general terms, fractional range conversion is facilitated by finding a suitable residue number, r, which completes an approximation of the binary fraction represented by n, so that, $$\frac{r}{R_F} = \frac{n}{2^N} \quad (62)$$

So that an RNS machine word value r which approximates a fractional binary quantity n is calculated as, $$r = \frac{(n * R_F)}{2^N} \quad (63)$$

The fractional space conversion unit 2720 of FIG. 27a processes the input value n of equation (63) at input port 2700 and multiplies the value n by a plurality of modulus $M_1$ 2721, $M_2$ 2723, $M_3$ 2724, and $M_4$ 2725 as the value proceeds through the pipeline. For example, the binary digit $B_0$ 2711 is multiplied using multiplier 2726 by the modulus value $M_1$ 2721 and the result is added to value zero 2722 during the processing of STAGE 1, 2702. In a typical embodiment, the adder 2727 is removed and replaced with a bus wire but is shown for purposes of symmetry since the carry in stage 2722 will not be zero in subsequent binary digit stages, such as carry in register $C_1$, 2729. In fact, the high order result from the multiplier 2726 is routed to the carry register $C_1$ 2729 of the next digit processing column, i.e. processing of the $B_1$ digit 2732 whereas the digit value contained in register $B_1$ 2732 is multiplied by the modulus value $M_1$ 2728 and summed with the value of carry register $C_1$ 2729.

The multiply-sum ladder network of the fractional space conversion unit 2720 employs binary multipliers and binary adders as opposed to modular multipliers and modular adders. The function of the binary multiplier-adder network 2720 is to simultaneously multiply a binary fractional value 2700 by each modulus $M_1$ 2721 through $M_4$ 2735 at each stage of the pipeline 2720 thus producing a binary product, while also dividing the binary product by the binary fractional range $2^N$ as expressed in equation (63). Division by the binary fractional range $2^N$ is accomplished by the novel pipeline circuit 2720 by successive shifting of the binary product left by exactly the number of binary digits representing N bits, which is N=32 bits, the number of bits represented by the four binary digits $B_0$ 2711 through $B_3$ 2712 by means of the present example.

The output of the fractional space conversion unit 2720 is a plurality of digit values transmitted via digit value buses 2756, 2757, 2758, 2759, to RNS digit recombination pipeline 2750. The RNS word recombination pipeline 2750 may consist of any number of individual digit recombination circuits, such as individual digit recombination circuit 2755, so that a completely extended RNS word size is supported, or so that a short format word is supported. In the example of FIG. 27a, four fractionally associated RNS digits $R_I$ 2781 through $R_4$ 2784 is shown as an output result 2780 of the fractional conversion pipeline 2430c for means of brevity of the illustration. It is understood that additional RNS digits are supported by employing additional individual RNS digit recombination units 2755, each unit associated with and supporting a distinct pair-wise prime modulus, $m_i$.

For the example system of FIG. 27a, four moduli $M_1$ 365 (=0×1312D), $M_2$ 366 (=0×20000) $M_3$ 367 (=0×2B3FB), $M_4$ 368 (=0×3FFDF) of FIG. 3c are associated with an RNS fractional range which differs from the example system of FIG. 3c. In the example of FIG. 27a, instead of two RNS fractionally associated digits, the example uses four fractionally associated RNS digits to illustrate the conversion circuit 2430c capabilities in more detail, and to explain the effects of converting and rounding in cases where the binary and RNS fractional ranges differ significantly. Moreover, in some embodiments the quantity of binary input digits 2700 and RNS output digits 2780 is equal, and the encoding width of binary digits and RNS digits is equal or approximately equal. These embodiments provide a balanced circuit so that multipliers and adders have operands of approximately the same binary encoding width.

Figure 27B:
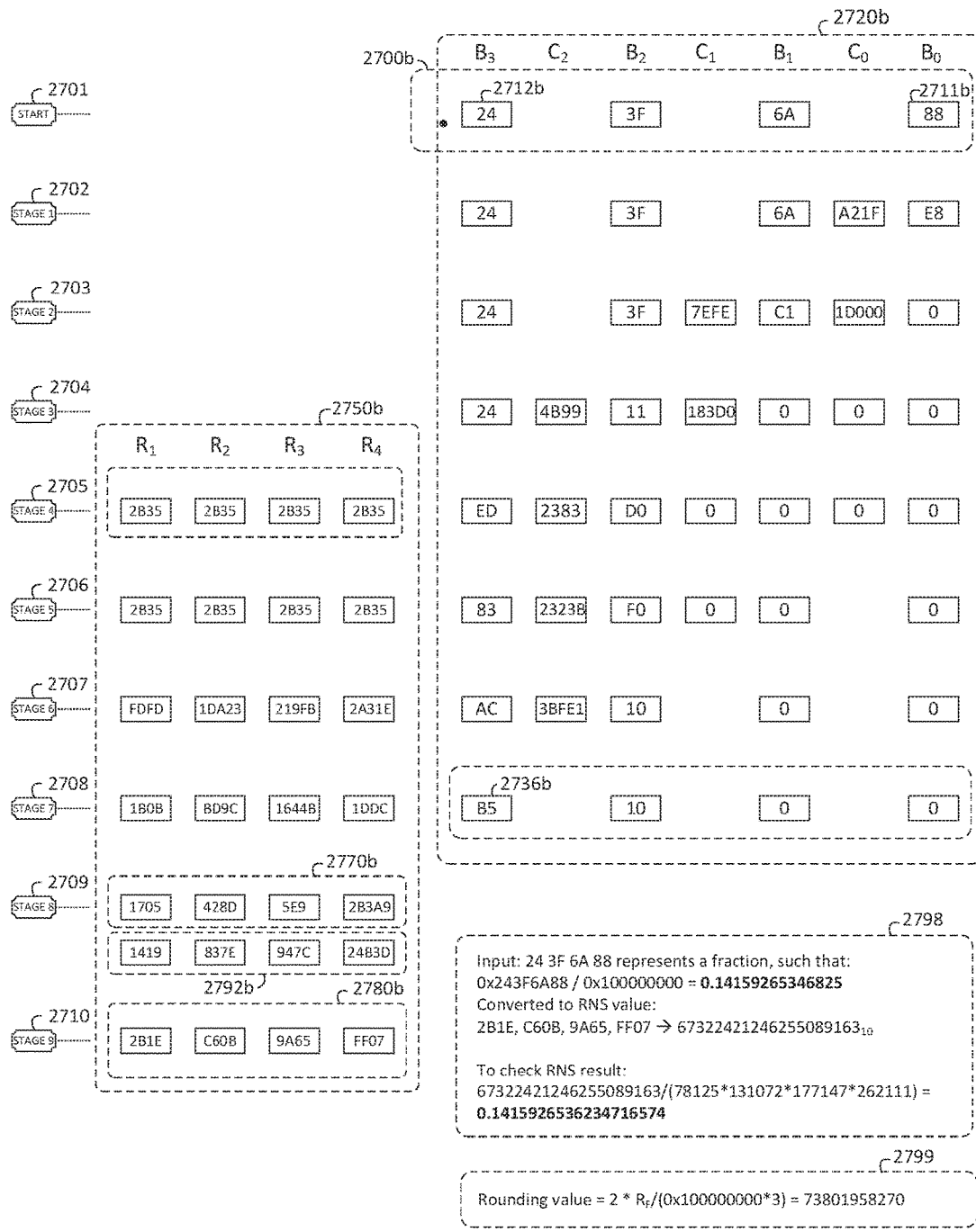
FIG. 27b is a block diagram of an exemplary forward binary fraction to RNS fraction value conversion pipeline.

In FIG. 27b, an example conversion problem is provided which corresponds to the circuit of FIG. 27a. In FIG. 27b, an example binary fractional value "0.14159265" is represented by a binary integer (hex) number 0×243F6A88 since the binary fractional range is 0×100000000, and since 0×243F6A88 divided by 0×100000000 is 0.14159265346825 as shown using calculations enclosed within dotted circle 2798. The binary integer input value 2700b is partitioned into four 8-bit binary digits $B_0$ 2711b through $B_3$ 2712b and for the purposes of this example, the input value is held for a period of execution of nine pipeline stages, such as STAGE 1, 2702. The effect of holding input data 2720b is to show the state sequence of a data value as it undergoes processing at each stage of the pipelines 2720b, 2750b.

In the example of FIG. 27b, data is processed by the fractional space conversion unit 2720b and output to the RNS digit recombination unit 2750b; in the example circuit of FIG. 27a, an extra register stage is wasted, i.e., not needed, but was included for clarity in the drawing. For example, the circuit has duplicate RNS values $R_1$ through $R_4$ for STAGE 4 2705 and STAGE 5 2706 as can be seen from examination of FIG. 27a. As RNS digits are processed in further stages, the RNS value is multiplied by a constant of a modulus $M_1$, such as modulus $M_2$ 2760 of FIG. 27a, and summed with a digit value from a digit bus, such as digit bus 2757. In FIG. 27b, at pipeline processing STAGE 8, 2709, the final RNS recombination result 2770 is produced but is not rounded.

At the STAGE 9, a rounded RNS fraction is produced and stored in output register 2780 in FIG. 27b. A rounding constant is generated using LUT table 2791 of the rounding circuit 2790 in one embodiment. The rounding value is not necessarily a single unit as in the case of fractional normalization but may be a significantly larger value if the RNS fractional range is significantly larger than the input binary fractional range, which is the case in the example presented. Moreover, the rounding value, r, 2792 may not be a constant value, but may be one of a plurality of values stored in look-up table memory 2791 or may be calculated using a formula applied to the remainder of the conversion; the remainder is derived from the value of binary remainder digit $B_3$ 2736 in some embodiments. A fully rounded RNS fractional result 2780 is produced when a rounding value, r, 2792, is transmitted via bus 2793 and summed to each digit $R_1$ through $R_4$ of result 2770 using modular adders, such as modular adder 2771 of FIG. 27a.

In the example of FIG. 27b, a rounding value is derived using the upper two bits of binary remainder register $B_3$ 2736 of FIG. 27a and multiplying these bits with the ratio of the RNS fractional range to the binary fractional range divided by the range of the truncated bits minus one. In the example, the RNS fractional range is many times the binary fractional range, so that the input binary value is converted too accurately. While the conversion is highly accurate without rounding, a properly interpreted value of the binary fractional input value 2700b is not preserved, since the rounding constant in the binary fractional space will be much larger in the RNS fractional space.

Therefore, a whole unit of RNS fractional rounding can be approximated by the ratio of the RNS fractional range to the binary fractional range; moreover, some or all of the most significant bits of $B_3$ 2736 can be used to index a sub-divided whole unit of RNS fractional rounding; an example calculation is shown in the equation enclosed in dotted lines 2799. In the example provided, the two most significant bits of $B_3$ 2736b are used to scale a rounding value; since the value of the remainder digit is 0×B5, the upper two bits equal 2, so a value of 2 is multiplied by the ratio of the RNS to binary fractional range, which is then sub-divided into three equal rounding values according to 2799. Other more linear rounding conventions can be formulated and are left to design specifics. In other embodiments, a fractional rounding value in RNS, $ru_{rns}$, is expressed and indexed as i number of most significant bits of a j bit binary digit $B_3$ 2736a, $$ru_{rns} = \left\lceil \frac{R_F}{2^N} * \frac{B_3}{2^{j-i}} \right\rceil \tag{64}$$

Scaled rounding provides a means to more accurately convert fractional values of a low resolution (small range) to a target value in a high resolution (large range) or vice-versa. Therefore, the example output value 0.14159265362 is closer to the intended value 0.14159265358 compared to 0.14159265346 because the rounding constant 2792b is scaled to account for a significant difference in the input value range $2^{32}$ versus the output value range $R_F$ of the conversion example of FIG. 27b. Scaled rounding circuit 2790 as disclosed herein is a significant advancement and novel feature in the art of fractional range conversion integrated into a binary to RNS format conversion apparatus 2430c of FIG. 27a.

Figure 28:
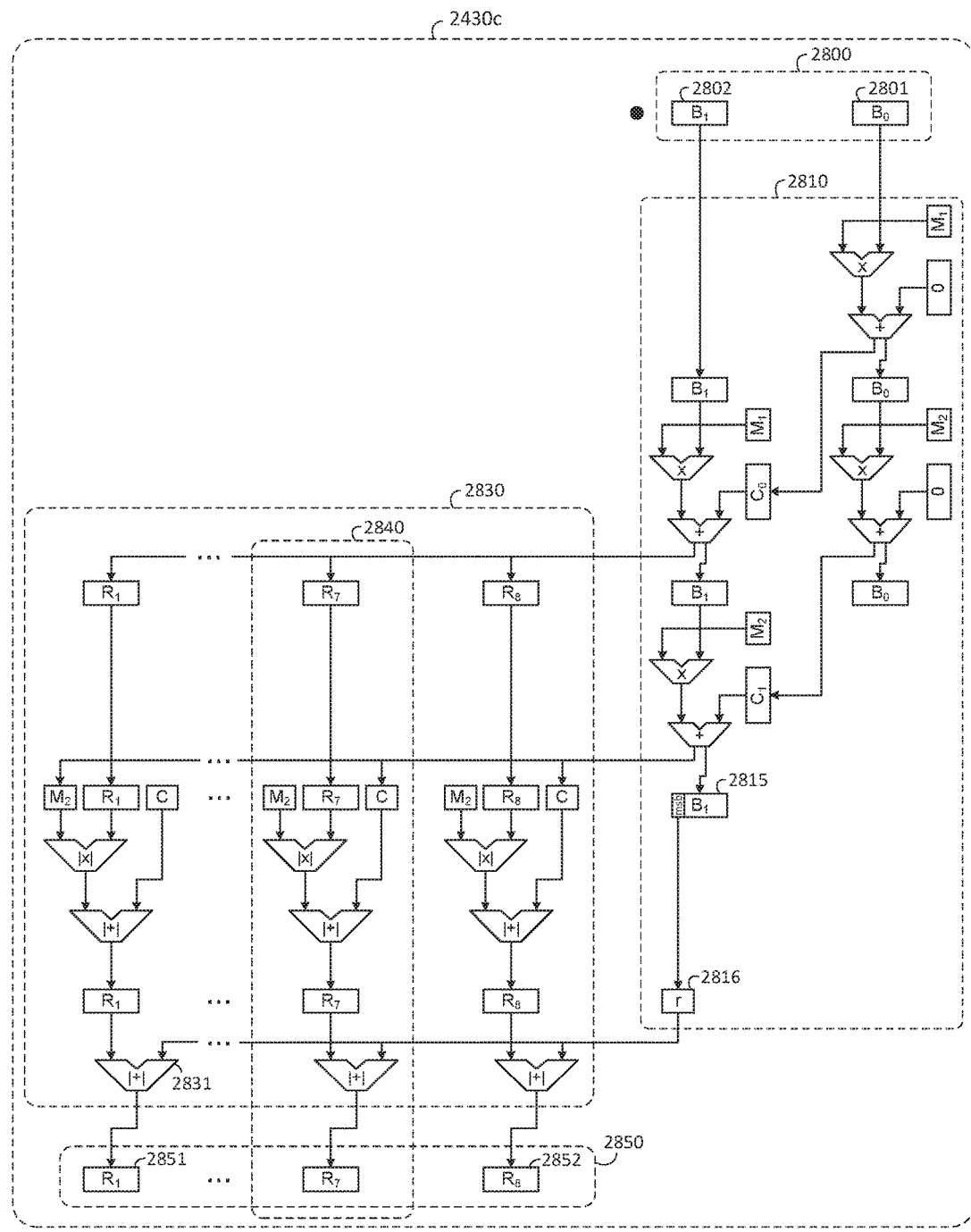
FIG. 28 is a block diagram of an exemplary 2-digit forward fractional value converter pipeline arithmetic circuit for a TPU.

FIG. 28 is provided to illustrate components of a fractional forward converter supporting a 32-bit binary fraction input 2800 comprising two 16-bit input binary digits $B_0$ 2801 and $B_1$ 2802 which can support the TPU example of the present disclosure. The output 2850 of the forward fractional converter unit 2430c is comprised of eight RNS digits $R_1$ 2851 through $R_8$ 2852 which in one embodiment represent a fully extended word conversion. In other embodiments, the output 2850 includes only four digits $R_1$ through $R_4$ to support a short RNS word format which occupies less memory storage than a fully extended RNS word.

Like the apparatus of FIG. 27a, the forward fractional conversion pipeline of FIG. 28 includes a binary fraction to RNS fraction space conversion unit 2810 coupled with an RNS word recombination unit 2830 comprising a plurality of digit recombination units, such as digit recombination unit 2840. Because the example TPU of the present disclosure supports two RNS digits associated to the fractional range, binary input digits $B_0$ 2801 and $B_1$ 2802 typically share the same or approximate RNS digit encoding width, so that the input and output ranges of conversion are approximately equal. The RNS output 2850 may support more than two digits overall, such as digits $R_I$ through $R_8$, because RNS fixed point format (11) requires the fractional portion to be fully extended to all digits before it is summed with the integer conversion 2541 using modular adder 2550 in FIG. 25 by means of example.

When the input ranges and output ranges of fractional conversion are approximately equal, the rounding circuitry is simplified to the application of a single, un-scaled unit of value; in this case, the rounding logic and rules resemble those of fractional product normalization. In FIG. 28, the rounding unit, r, 2816 is derived from the most significant bit of the remainder digit $B_1$ 2815, is added to the result of the RNS word recombination unit 2830 using modular adders, such as modular adder 2831, before being transmitted to the converter output 2850.

Figure 29:
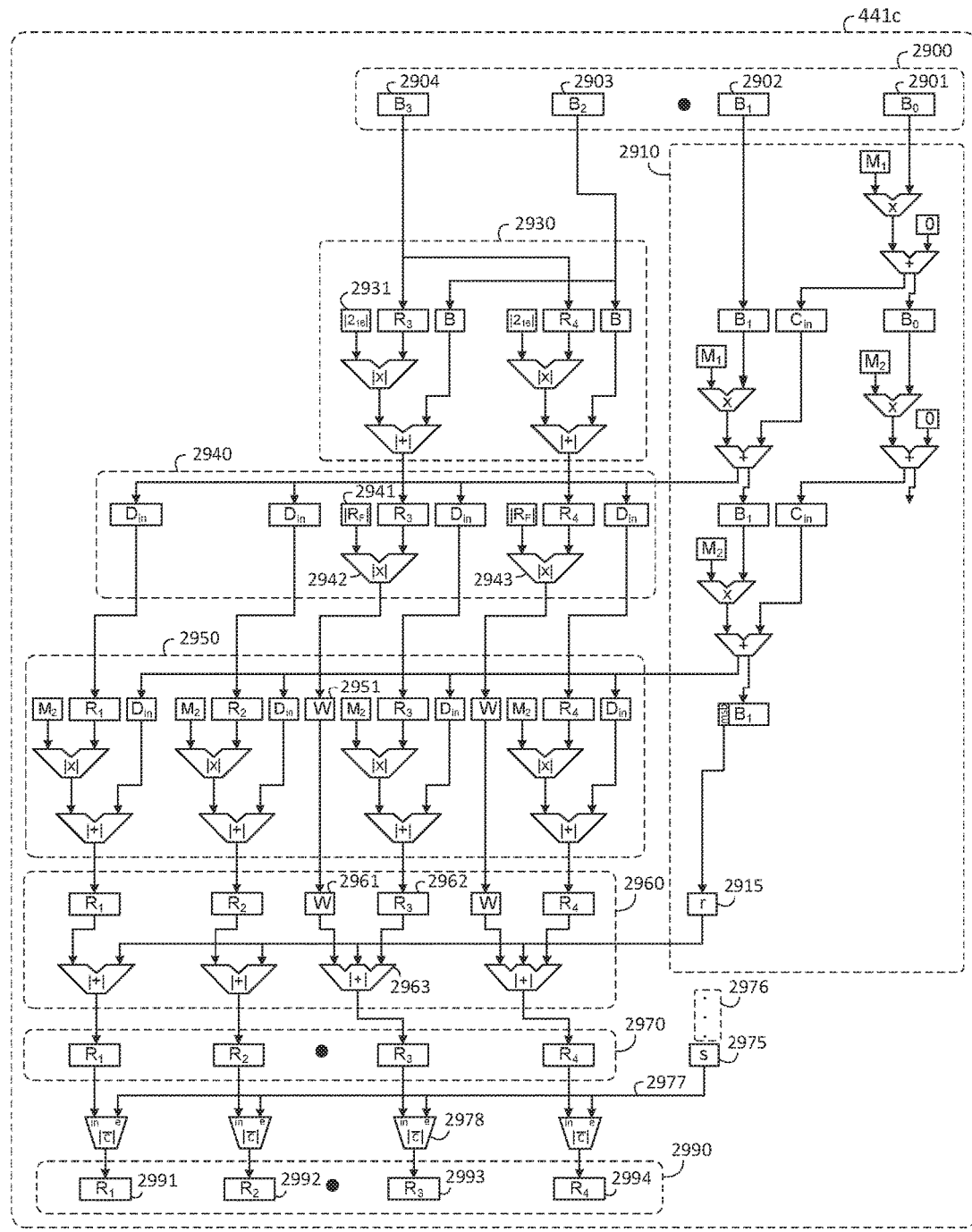
FIG. 29 is a block diagram of an exemplary complete 32.32 fixed-point binary to RNS forward converter schematic for a TPU.

One embodiment for the forward conversion pipeline unit 441a of FIG. 4 is shown in more detail using forward conversion pipeline 441c in FIG. 29. The diagram of FIG. 29 is provided to illustrate a typical embodiment of the forward fractional conversion pipeline 441b of FIG. 24 which includes integration of the component blocks shown therein. For example, an unsigned binary fractional value comprising fractional digits $B_0$ 2901 and $B_1$ 2902, and further comprising integer value digits $B_2$ 2903 and $B_3$ 2904 is input at input port 2900. At some number of clock cycles later, the result representing the converted binary digits appears at output port 2990 represented in RNS format comprising two fractionally associated digits $R_I$ 2991 and $R_2$ 2992 and two digits $R_3$ 2993 and $R_4$ 2994 associated to a whole number range.

As shown in previous illustrations, FIG. 29 shows a fractional space converter 2910 coupled to an RNS word recombination unit 2950. In addition, a forward integer conversion unit 2930 performs modular multiplication by a binary scaling factor 2931 and subsequent modular addition to provide a two-digit RNS integer conversion. The RNS integer result is scaled by the fractional range constant $R_F$ 2941 using a modular multiplier, such as modular multiplier 2942, and then stored in a pipeline storage register W, such as register 2961, before summed using a three-input modular adder, such as modular adder 2963. Only two modular multipliers are needed, because fractionally associated digits are always zero.

One input of the modular adder may accept a carry bit signal 2977 generated from the state of the sign stored in delay register 2976, 2975. A recombination result which includes a scaled whole portion and a fully extended RNS fractional portion is stored in 2970. If the sign flag 2975 indicates the answer is negative, the positive RNS word 2970 is complemented using a plurality of conditional digit complement units, such as digit complement unit 2978. Output port 2990 stores a fully converted 32.32 binary fractional value in RNS format, which is four RNS digits $R_I$ 2991 through $R_4$ 2994 representing, or approximating, a 32.32 fixed point representation, and is converted to a short format in the example of this disclosure.

It is to be understood by those practiced in the art of modular circuit design that additional circuits may be added to FIG. 29 to produce a fully extended result 2990 consisting of eight RNS digits for some embodiments and when the converted value is to be immediately processed within the matrix multiplier 400a of the example of the present disclosure.

Reverse Converter Pipeline Unit

The matrix multiplier 400a of FIG. 4 processes product summations and passes non-normalized RNS data via bus 453 to a MOD function 454a and then through a normalization pipeline 455a. Normalized data may then pass through a non-linear ReLU function 465 during neural network processing and may be stored back to memory 445 via data bus 411, data cache 430, memory interface 435, and high-speed memory bus 444. In many cases, data is returned to the host system (not shown) via reverse converter 442a and PCIe interface 440. The PCIe interface may be substituted with a high speed optical network interface in some embodiments, for example, employing such interface standards as SFP+ or QSFP+ gigabit network interfaces.

When RNS fixed point data is returned to the host system, it is generally converted to binary format. For the example TPU design of the present disclosure, RNS fixed point format data is converted to 32.32 binary format by reverse converter 442a; the binary format is suitable for direct use by a host system, or the binary format may be converted to floating-point format (not shown). The examples of this disclosure will focus on the conversion of signed fixed-point RNS format to signed fixed-point binary format. Conversion of signed fixed-point binary format to floating-point format can be supported with the apparat herein and is well known and so not described. The present disclosure will discuss two important RNS reverse converter variations, the first reverse converter 442b of FIG. 30 relies on a valid sign bit in RNS format, and the second reverse converter 442c of FIG. 31 converts a signed RNS fixed-point format directly, regardless if the value is negative, and regardless of knowledge of the sign of the data value. The second embodiment provides an advantage for applications since the sign bit for each RNS data value need not be stored within the TPU accelerator card 406.

The mathematics for reverse conversion are introduced by considering that a binary value n must be found to complete a binary fraction equivalent to the RNS fraction, $$\frac{n}{2^N} = \frac{r}{R_F} \tag{65}$$

Conversion requires we find a value n which completes a binary fractional value $$\frac{n}{2^N}$$

that is equivalent, or approximately equal to, the fractional value $$\frac{r}{R_F}$$

of the RNS value 3002, so that, $$n = \frac{(2^N * r)}{R_F} \tag{66}$$

Figure 30:
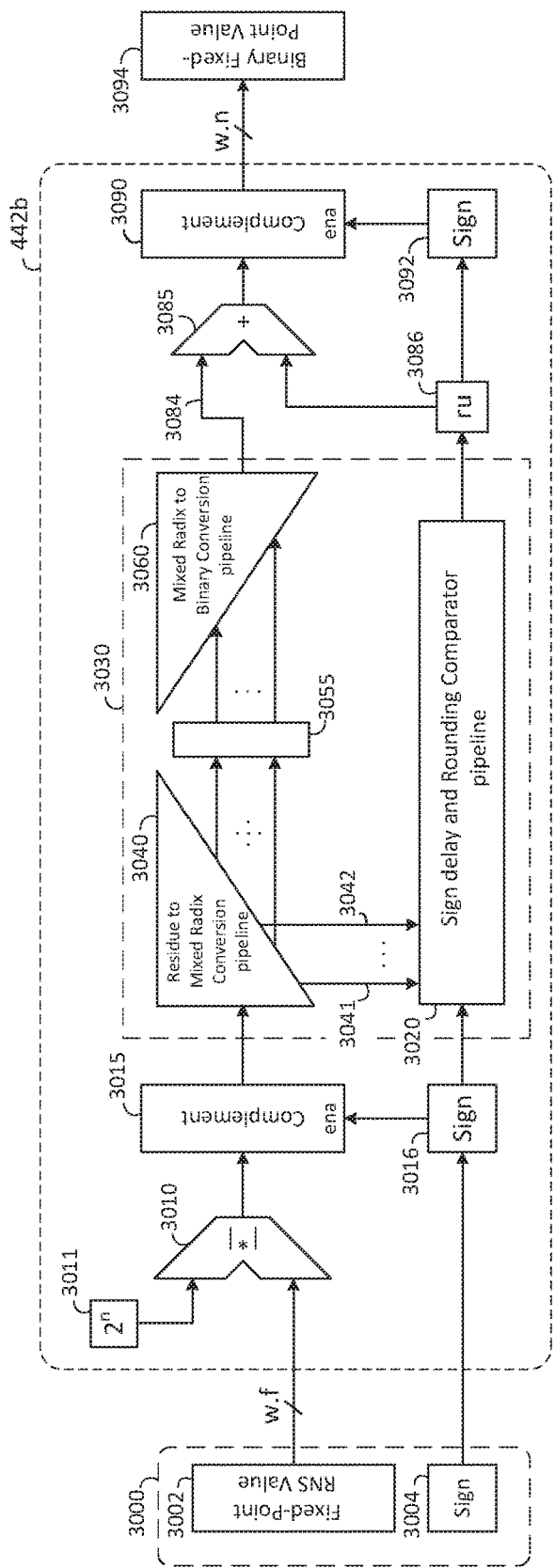
FIG. 30 is a block diagram of an exemplary reverse RNS fixed-point to binary fixed-point converter pipeline block diagram with sign magnitude requirement.

In one embodiment, the block diagram of FIG. 30 is used to perform the processing of equation (66). In FIG. 30, an RNS fixed-point value is input to register 3002, and additionally, a sign bit indicating the sign polarity of the data value 3002 is input to sign register 3004. The RNS input value 3002 is first processed by multiplying by the binary fractional range $2^N$ using modular multiplier 3010. If the product is positive as indicated by the sign register 3016 it is passed unchanged by the conditional complement unit 3015 to the reverse converter pipeline 3030 where the RNS value undergoes division by the fractional range $R_F$ during format conversion to binary. Therefore, equation (66) describing reverse fractional range conversion is fulfilled during the processing of the RNS to binary format conversion using the apparatus 442b.

If the RNS input value is negative, the sign bit stored in sign register 3016 enables the RNS word complement unit 3015 so that a complement of the product is sent to the reverse conversion pipeline 3030, else if the sign bit is not set, the complement unit is not activated, and it passes the product unchanged to the reverse converter pipeline 3030. The reverse converter pipeline 3030 is designed to convert positive encoded values only, so it is important the sign bit 3016 correctly reflects the correct sign encoding of the RNS value (i.e., using method of complements). If the sign bit 3016 does not correspond to the encoding of the value, then an error in conversion will occur, since the converter 3030 will convert a negative value directly.

During conversion of the scaled RNS value by the reverse fractional conversion unit 3030, a residue to mixed-radix converter 3040 converts the incoming value to mixed-radix format and stores the mixed radix number to the register 3055. Next, a mixed-radix to binary converter pipeline 3060 processes the mixed-radix value input from storage register 3055 and outputs a binary value 3084 to binary adder 3085 to add a round up value ru 3086 generated by the sign delay and rounding comparator pipeline 3020. If the sign bit storage 3092 indicates the value is negative, the converted and rounded value output from adder 3085 is complemented using conditional complement unit 3090.

Once again, the conversion unit 3030 only handles the processing of positive encoded values, so the apparatus of FIG. 30 handles sign processing exterior to the main conversion unit 3030 using two complement units 3015, 3090. The issue with the converter unit 3030 is the conversion of negative encoded values will be incorrect since the direct division of a negative encoded value does not provide a properly scaled result. The residue to mixed-radix conversion unit 3040 measures only the fractional digits using data paths 3041, 3042 so that a rounding value may be generated.

Figure 31:
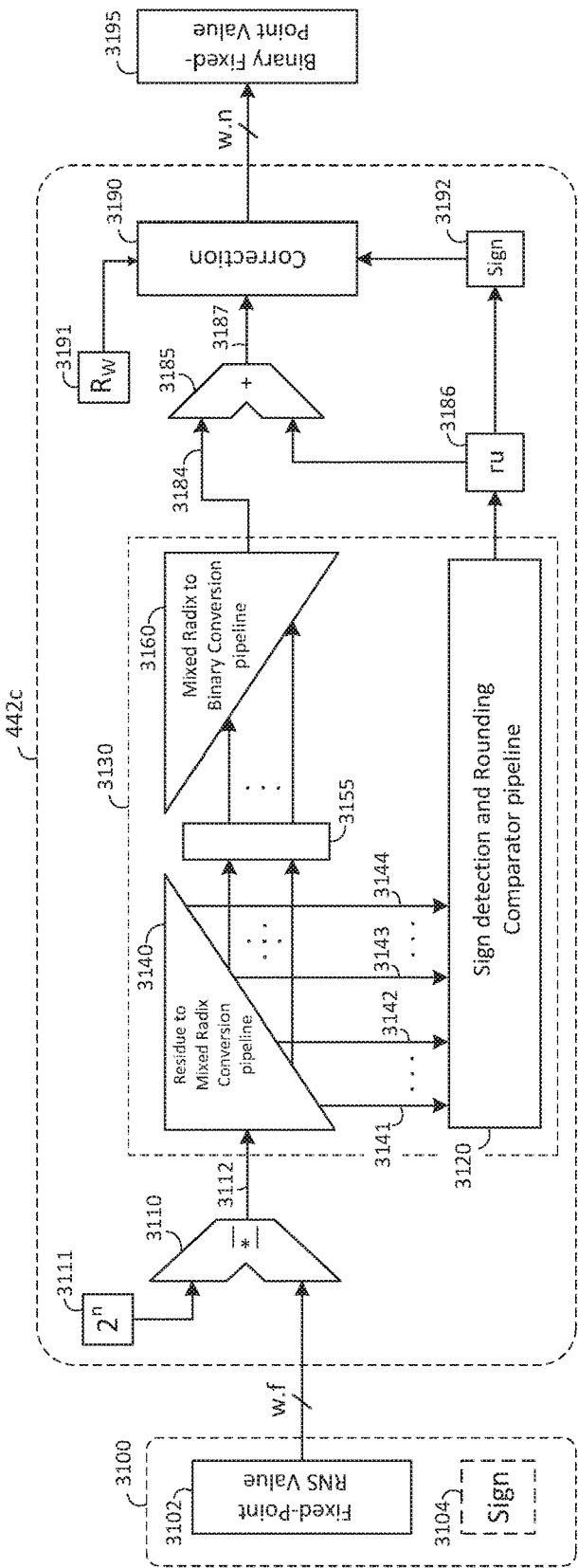
FIG. 31 is a block diagram of an exemplary reverse RNS fixed-point to binary fixed-point converter with sign detect and negative value correction.

In one preferred embodiment, a novel invention of the present disclosure is shown in FIG. 31. The reverse conversion unit 442c is unique since it does not require a sign bit 3104 to be input; this means the matrix multiplier circuitry of FIG. 4 does not need to include support for sign bits for each data value 3100 to be output to the host system. However, this is not a limitation, since clearly sign bits such as sign bit 3104 can be supported in some embodiments of the present design but will not be used by the reverse converter unit 442c of FIG. 31. Reduction of sign bit storage 3004 of FIG. 30 implies that sign information is not required, and this means sign bit and sign information need not be attached or transported alongside RNS data encoded using method of complements; this results in reduction of circuitry and memory, so the TPU 406 as disclosed does not need support for sign bit storage, such as sign bit 3104 of FIG. 30, and other sign bit storage, such as within memory storage elements 445, 435 of FIG. 4.

The overall architecture of reverse fractional conversion unit 442c differs from the reverse conversion pipeline unit 442b of FIG. 30 since the front-end word complement unit 3015 is removed as well as the input sign storage register or delay line 3016 from the FIG. 30. In addition, the back-end word complement unit of 3090 of FIG. 30 is replaced with a word correction unit 3190 driven by a sign storage bit 3192 generated by the sign detection and rounding comparator pipeline unit 3120. The reverse fractional conversion unit 442c of FIG. 31 is more flexible than the reverse fractional converter unit 442b of FIG. 30 because the sign of the input RNS value 3102 is always detected by the sign detection and rounding comparator pipeline 3120 so that there is no reliance on redundant sign bit information, such as sign bit information 3104 represented alongside the RNS fixed-point value 3102.

In the operation of the converter 442b of FIG. 30, there is an error condition generated if the sign information 3004 and method of complement encoding of the input RNS word 3002 differ for some reason. If a negative number, i.e. a negative RNS value encoded using method of complements, is processed using the reverse fraction processing unit 3030, the result 3084 will be incorrect. The reason is the direct conversion of a negative number results in the expression of equation (66) above into, $$n \neq \left\lceil \frac{(R_T - (2^N * r))}{R_F} \right\rceil \quad (67)$$

The incorrectly processed value of n using equation (67) above can be corrected by subtracting a reverse conversion correct constant $C_R$ which can be expressed by observing the negative and positive values of a converted result should cancel to zero, so that, $$C_R = \left\lceil \frac{(R_T - (2^N * r))}{R_F} \right\rceil + \left\lceil \frac{(2^N * r)}{R_F} \right\rceil \quad (68)$$

For the negative term of equation (68), the round-up INT bracket is replaced with a round-down INT bracket to denote round-down of negative values, i.e., brackets in equation (68) denote symmetrical rounding towards negative and positive infinity. Assuming a perfect divide result by $R_F$, the round-up and round-down brackets of equation (68) above can be removed, so that correction constant $C_R$ is equal to the whole number range $R_W$, $$C_R = \frac{R_T}{R_F} = R_W \quad (69)$$

For the perfect case, using equation (69) above, the correction constant can be applied to correct an incorrectly processed negative value 3102 into a correctly processed equivalent positive value using, $$\left\lceil \frac{(2^N * r)}{R_F} \right\rceil = C_R - \left\lfloor \frac{(R_T - (2^N * r))}{R_F} \right\rfloor \quad (70)$$

The positive value of equation (70) above can be re-converted to a negative value in the binary number system by observing the rules for calculating the method of complements in the binary number system, so that a negative value machine number n. can be recovered from a positive machine number $n_+$ which is first recovered using, $$n_+ = \frac{(2^N * r)}{R_F} = R_W - \frac{(R_T - (2^N * r))}{R_F} \tag{71}$$

so that a negative n. is recovered by processing the complement of a positive $n_+$ with respect to a T-bit binary number system with a range of $2^T$ expressed as, $$n_- = 2^T - \left(R_W - \left\lceil \frac{(R_T - (2^N * r))}{R_F} \right\rceil\right) \text{ for } 0 < (2^N * r) < R_T, \tag{72}$$

Which can be re-written using a MOD function as, $$n_- = \left\| \left\lceil \frac{(R_T - (2^N * r))}{R_F} \right\rceil - R_W \right\|_{2^T} \text{ for } 0 < (2^N * r) < R_T, \tag{73}$$

The MOD function with respect to the value $2^T$ in equation (73) above is needed to represent an underflow in the binary number system with a range of T bits. Most arithmetic circuits perform this wrap-under function without specifically designing provisions for MOD function of equation (73) above, so with care it is removed out of a need for convenience so that equation (73) above is rewritten as, $$n_- = \frac{(R_T - (2^N * r))}{R_F} - R_W \text{ for } 0 < (2^N * r) < R_T \tag{74}$$

Equation (74) is interpreted by observing an incorrectly processed negative result of equation (67) can be converted to a correctly processed negative result by subtracting $R_W$ with underflow in the target number system (binary in this case). To determine when a value is to be corrected, the input value 3102 must be compared against the sign range during processing by reverse conversion comparator pipeline unit 3130 and sign detection and rounding comparator pipeline 3120 which are coupled via mixed-radix digit buses 3141 through bus 3142 and digit bus 3143 through bus 3144.

To understand the effects of rounding on equation (70) above, a substitution is made such that the value converted is represented using two new variable quantities, Z, which evenly divisible by $R_F$, and $\varepsilon$, which is the remainder of division by $R_F$, so that $$(2^N * r) = Z + \varepsilon, 0 \le \varepsilon < R_F, R_F | Z \tag{75}$$

And to represent an associated complement using the same substitution, we observe, $$\bar{\varepsilon} = R_F - \varepsilon, 0 < \bar{\varepsilon} \le R_F, R_F | Z \tag{76}$$

Therefore, the effect of rounding can be determined using equation (70) and substitution of equations (75) and (76) to find a new general reverse correction constant $C_{RG}$, $$C_{RG} = \left\lfloor \frac{(R_T - (Z + (R_F - \varepsilon)))}{R_F} \right\rfloor + \left\lceil \frac{(Z + \varepsilon)}{R_F} \right\rceil \tag{77}$$

Reducing equation (77) above by removing the round up and round down brackets and replacing with a single INT bracket, and by removing ratio terms which divide evenly from the INT bracket and canceling terms, the new general reverse conversion correction factor $C_{RG}$ is, $$C_{RG} = R_W - 1 + \left\lfloor \frac{2\varepsilon}{R_F} \right\rfloor \tag{78}$$

The form of general correction constant $C_{RG}$ is the same as the general correction constant $C_g$ for negative product normalization according to equation (37). The interpretation of equation (78) is like the interpretation of equation (37) since it demonstrates the rules for rounding a positive converted value can be applied to negative values that are directly processed using the reverse fractional conversion unit 3130 of FIG. 31. The apparatus of FIG. 31 incorporates a single rounding comparator circuit 3120 to determine both rounding magnitude as well as sign magnitude. A correction constant is applied if the value is determined to be negative, and a rounding value is added if the remainder is determined to generate a rounding constant according to, $$n = \begin{cases} CONV(r) + ru, & \text{if } r < \frac{R_T}{2} \\ CONV(r) - R_W + ru, & \text{if } r > \frac{R_T}{2} \end{cases} \tag{79}$$

with a basic conversion rounding value ru calculated using, $$ru = \begin{cases} 0, & \text{if } r < \frac{R_F}{2} \\ \overline{\text{sign}(r)}, & \text{if } r = \frac{R_F}{2} \\ 1, & \text{if } r > \frac{R_F}{2} \end{cases} \tag{80}$$

The correction factor 3191 is shown in FIG. 31 and is fed to the word correction unit 3190 which is equivalent to a binary word subtract unit that subtracts the value $R_W$ 3191 from the converted value 3187. The binary subtraction supports a "wrap-under" according to the MOD function of equation (73) since the value $R_W$ is always larger than the converter value. In one embodiment shown in FIG. 32c to be discussed later, the correction constant $R_W$ is encoded as a negative value and added to the conversion result 3187 of FIG. 31; therefore, the correction unit 3190 is a binary adder in this embodiment.

Figure 32A:
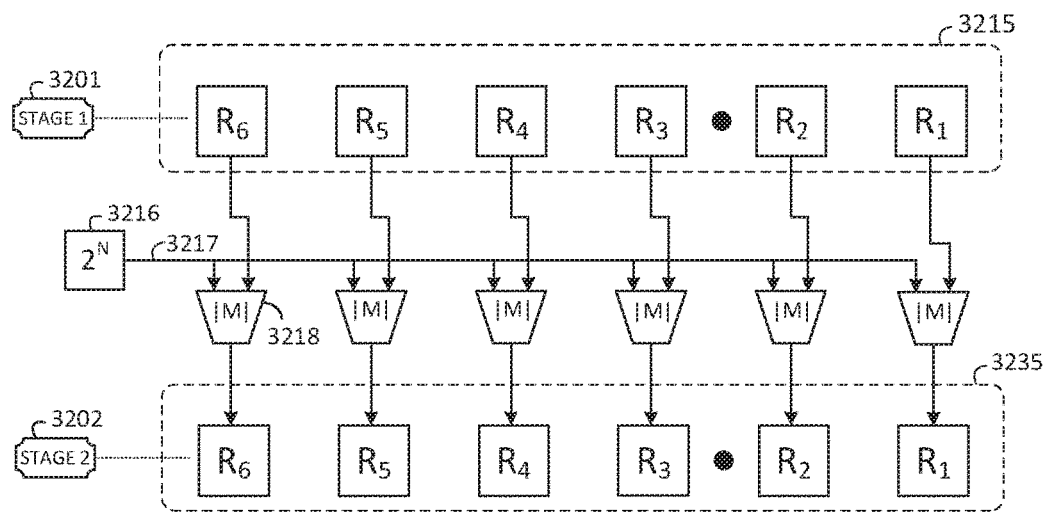
FIG. 32a is a block diagram of an exemplary initial scaling stage for reverse RNS fixed-point to binary fixed-point converter pipeline.
Figure 32B:
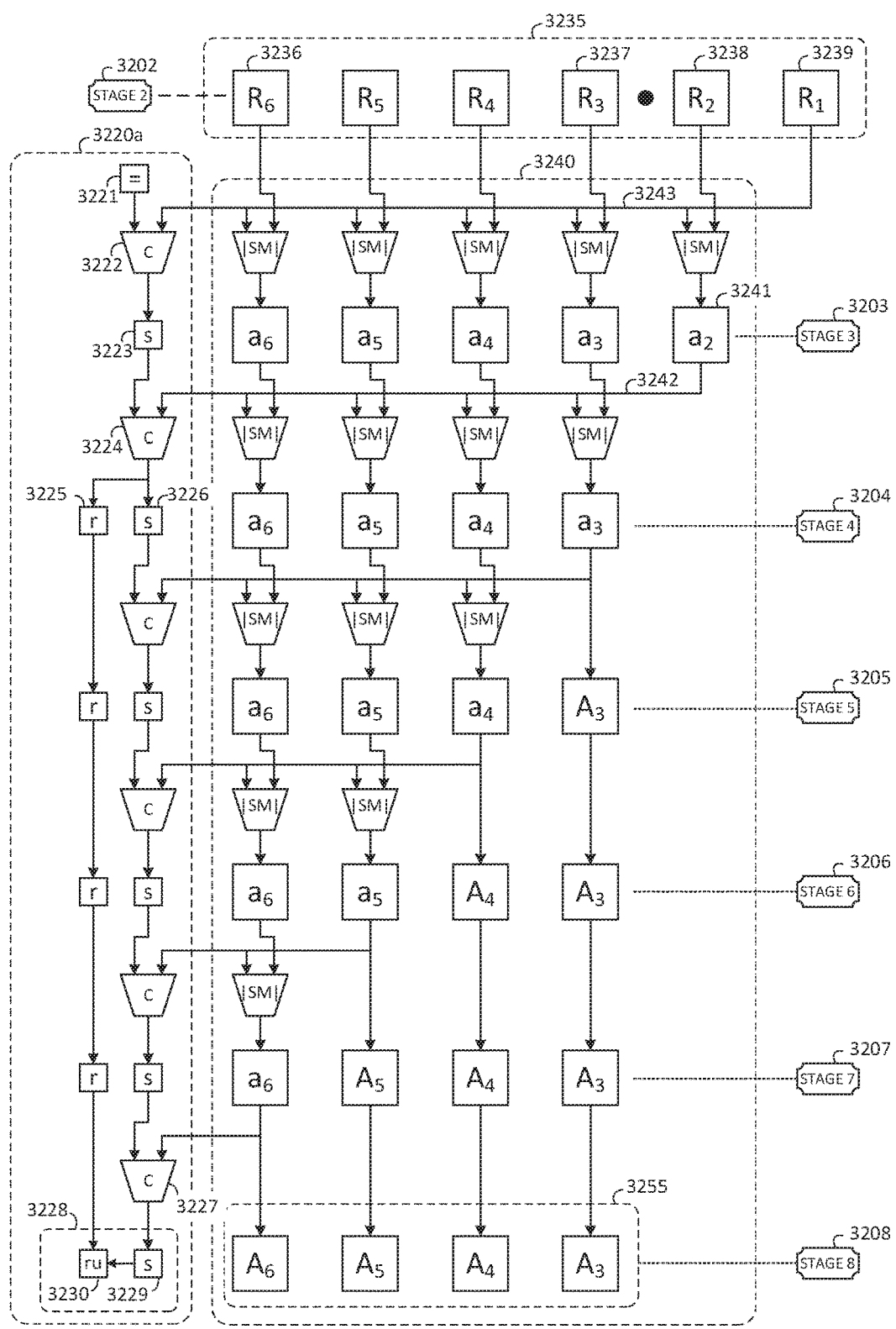
FIG. 32b is a block diagram of an exemplary RNS to mixed-radix conversion stage for reverse converter pipeline.
Figure 32C:
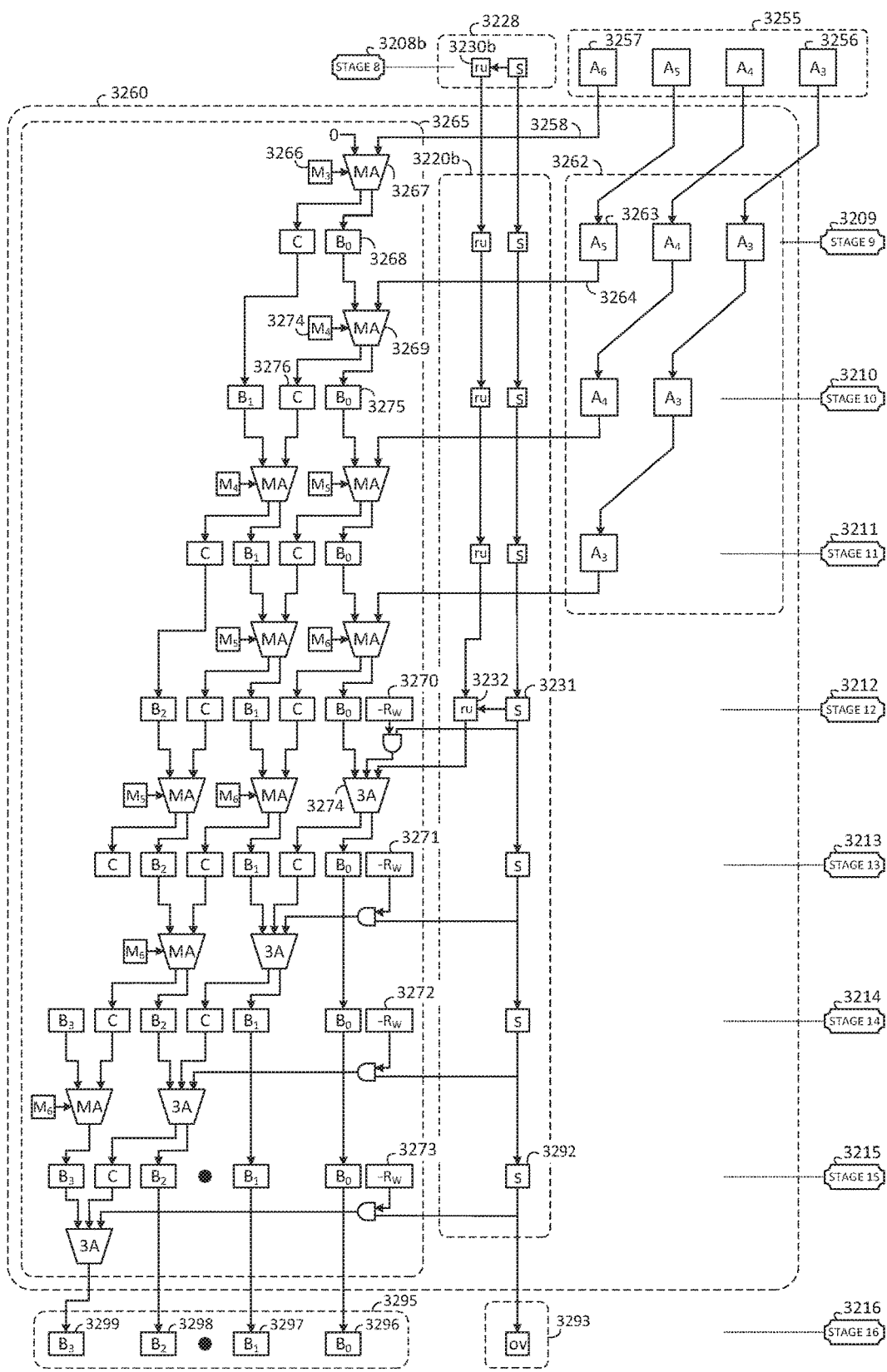
FIG. 32c is a block diagram of an exemplary mixed-radix to binary conversion stage for reverse converter pipeline.

A detailed diagram of the reverse fractional conversion pipeline 442c of FIG. 31 is shown in FIG. 32a, FIG. 32b, and FIG. 32c. The first stage of the reverse fractional conversion pipeline 442c of FIG. 31 consisting of a modular multiply 3110 with the constant $2^N$ 3111 is shown in FIG. 32a with an equivalent converter input port 3215 at STAGE 1, 3201 which transmits the input data to a modular word multiplier consisting of a plurality of digit modular multipliers, such as digit modular multiplier 3218, and multiplies the input data by a binary range scaling constant $2^N$ 3216. The output of the modular multiply scaling is stored in an RNS word register 3235 at pipeline STAGE 2 3202.

The register RNS register 3235 of FIG. 32a is repeated for convenience in FIG. 32b to indicate a continuation of the pipeline circuit into FIG. 32b. In FIG. 32b, the scaled input RNS data 3235 is fed into a mixed-radix conversion pipeline 3240 which performs several important functions including division by the fractional range $R_F$, and conversion to a mixed-radix word format 3255. Moreover, a sign and rounding comparator 3220 is coupled to the mixed-radix converter 3240 so that mixed-radix digits are transmitted via digit data buses, such as digit data bus 3243, so the converted data value may be compared to a sign range constant and a rounding range constant during conversion processing.

At pipeline STAGE 2, 3202, the diagram shows six RNS digits input, i.e., two digits $R_1$ 3239 and $R_2$ 3238 associated to the fractional range $R_F$, and four digits $R_3$ 3237 through $R_6$ 3236 associated to a whole range $R_W$. The converter 3240 must support an RNS range large enough to process at least a short word RNS format times the binary fractional range $2^N$. In the example of the present disclosure, since the RNS short word format is four RNS digits, and since the binary fractional range is 32 bits which represents a range of two additional RNS digits, a total of six RNS digits 3235 is required for the input to converter 3240. In operation, the converter 3240 will process six RNS digits 3235 and generate six mixed-radix digits, but the first two mixed-radix digits are essentially truncated (discarded) resulting in four mixed radix digits 3255. The first two RNS digits are not completely discarded, the value of the two mixed-radix digits help determine the rounding value r 3225 using digit comparators 3222, 3224.

It should be clear that many other embodiments with different number of RNS input digits 3235 be supported for a wide variety of reasons, but these reasons do not materially affect the invention of the present disclosure.

In the Figure of 32b, as an RNS input word 3235 is converted to mixed-radix format 3255, a sign comparison function is provided by the sign comparator unit 3220 using digit comparator 3222 through digit comparator 3227. At STAGE 8, 3208, of the converter 3240, a four-digit mixed-radix word 3255 is stored, and a round-up value ru is stored in register 3230 and sign data S is stored in register 3229. The sign data S may also have mixed-radix word 3255 "zero detect" information stored alongside the sign polarity data to indicate when the conversion operation is a "perfect" operation (a perfect division by $R_F$), since advanced rounding with non-symmetrical scaling may require "zero detection" of the mixed-radix word as indicated by the arrow connection from the sign data S 3229 and the ru value register 3230.

In FIG. 32c, the mixed-radix word stored in register 3255 of FIG. 32b is repeated for convenience and indicates the reverse conversion pipeline diagram continues from FIG. 32b to FIG. 32c by means of example. In FIG. 32c, the mixed-radix word 3255, previously illustrated by mixed-radix word 3155 of FIG. 31, undergoes a second stage mixed-radix to binary format conversion 3160 also previously indicated in FIG. 31. In FIG. 32c, the mixed-radix word 3255 begins conversion to binary using a mixed-radix to binary fractional format conversion unit 3260 in one preferred embodiment of the present invention. The mixed-radix to binary fractional format converter 3260 is comprised of a pipelined mixed-radix digit shift circuit 3262 coupled to a mixed-radix to binary converter 3265. Also included is a sign state storage pipeline 3220b, sometimes referred to herein as a sign flag delay line.

The mixed-radix digit shift circuit 3262 works by shifting a mixed-radix digit left in each successive pipeline stage. For example, at pipeline STAGE 8 3207 the most significant mixed-radix digit $A_6$ 3257 is transmitted into the converter 3265 using digit bus 3258 at pipeline STAGE 8 3208b followed by next most significant mixed-radix digit $A_5$ 3263 transmitted via bus 3264 at pipeline STAGE 9 3209. At each pipeline STAGE 8 3208b, STAGE 9 3209, STAGE 10 3210, and STAGE 11 3211, a mixed-radix digit of the mixed-radix word 3255 is processed by the mixed-radix to binary conversion pipeline 3265 in the order of most significant $A_6$ 3257 to least significant $A_3$ 3256 mixed-radix digit.

The mixed-radix to binary conversion pipeline 3265 supports several important functions. For one, the converter 3265 supports conversion of mixed-radix format to binary format. The converter 3265 does not support fractional space conversion per se, since fractional space conversion is accomplished using the modular scaling by $2^N$ of FIG. 32a in conjunction with division by $R_F$ using RNS to mixed-radix conversion unit 3240 of FIG. 32b. However, the mixed-radix to binary conversion pipeline 3265 of FIG. 32c does support rounding, which in some embodiments may be quite complex if the range of the input operand 3255 is significantly different than the range of the output binary format 3295.

For purposes of clarity, rounding circuitry is shown in the conversion apparatus of the example of FIG. 32c, but is simplified to assume approximately equal input and output number ranges as in the case of the TPU example of the present disclosure. For example, rounding data 3230b generated in the sign generation and rounding comparator 3220a of FIG. 32b is transmitted using rounding data pipeline registers such as rounding data register ru 3232 and summed with the converted value using binary adder, such as 3-input binary adder 3274. As mentioned, rounding values may be larger than a single unit if the fractional range of the binary output 3295 of FIG. 32c is significantly larger than the fractional range of the RNS input 3215 of FIG. 32a. On the other hand, if the fractional range of the output 3295 is significantly smaller than the fractional range of the input 3215, some embodiments will typically support a single bit of rounding, since the source precision is high enough so not to need rounding constants greater than one applied to the output 3295.

In some designs, if the output fractional range is significantly larger than the source or input fractional range, a look-up table (LUT) memory (not shown) can be used to source one of a plurality of rounding constants usually indexed by the value of the last fractional digit converted to mixed-radix, which is $a_2$ 3241 in the example of FIG. 32b. In many cases, only the most significant bits of $a_2$ 3241 are used to index a rounding constant for a LUT, and these rounding bits are transported by the sign and round value delay unit 3220b. During conversion of negative numbers, a large rounding constant (greater than 1) representing a "single rounding unit" is pre-biased if the fractional division is not "perfect", and a "complement" of the high order bits of $a_2$ 3241, having been delayed with appropriate pipeline registers, is used to index the same LUT as used for positive converted values. In one embodiment, the LUT sources fractional amounts of the rounding unit in a linear fashion according to the value of the high order bits of $a_2$ 3241. However, during "perfect" negative results, i.e. all fractional mixed-radix digits are equal to zero, the LUT must not gate (source) a pre-biased "unit rounding" since the correction constant for the perfect case as provided in equation (69) is only $R_W$.

In addition to format conversion and rounding, the mixed-radix to binary pipeline 3265 of FIG. 32c supports signed value processing using the means of a correction factor $R_W$ represented as a negative binary number value $-R_W$ and partitioned into four binary digits 3270-3273. The use of a correction constant 3191 and correction circuit 3190 was previously discussed in FIG. 31 and its use is supported by mathematics derived in equations (67) through (78). The novel reverse conversion circuit of FIG. 32c supports the correction of improperly processed negative values using the previously measured sign of the converted value 3255 stored in sign storage pipeline 3220b, such as sign storage register 3231.

For means of example and referring to FIG. 32c, at pipeline STAGE 12, 3212, the sign of the converted value is stored within the sign register 3231 and controls the gating of the least significant digit of the constant $-R_W$ 3270 so that if the converted value is negative, a correction constant is added using binary adder 3274, otherwise zero is added. Correction constants 3271, 3272, 3273 are gated in a similar manner at each STAGE 31 3213, STAGE 14 3214, and STAGE 15 3215 respectively such that an entire correction constant $-R_W$ is added to the result of the conversion before the converted result is stored in binary output register 3295. The reverse mixed-radix to binary converter unit 3265 supports advanced operation so that only a single RNS to mixed-radix conversion pipeline 3240 of FIG. 32b is required.

In the prior art, two RNS to mixed-radix converters 3240 of FIG. 32b is required because a converted value and its complement must be processed to ensure at least one conversion operates on a positive value and produces a correct positive result; only then can a correctly processed positive value be processed into a negative result by means of a complement unit 3090 of FIG. 30. The correction unit 3190 of FIG. 31 is significant and novel as it allows pipelined reverse converter operation using only a single RNS to mixed-radix converter pipeline 3240 of FIG. 32b. In some embodiments, an overflow flag ov 3293 is supported to indicate if the RNS value is greater than the allowable range of the output binary format 3295.

The mixed-radix to binary conversion pipeline 3265 of FIG. 32c processes the mixed-radix word 3255 by summing each mixed-radix digit in sequence while also multiplying by a sequence of modulus constants, such as modulus constant $M_3$ 3266, using a binary multiplier then add unit ($M_A$), such as binary multiply then add $M_A$ units 3267, 3269. The binary multiply-then-add unit $M_A$ 3267 multiplies by the initial summation of zero so the $M_A$ element 3267 may be replaced with an adder in actual embodiments but was left in the illustration to disclose symmetry of the pipeline 3265. The multiply-then-add $M_A$ element 3269 multiplies the binary result $B_0$ 3268 of the previous stage by the modulus constant $M_4$ 3274 then adds the digit value $A_5$ 3263 via digit bus 3264. The least significant portion of the output of the $M_A$ element 3269 is stored in the $B_0$ digit 3275 of the pipeline STAGE 10, 3210, and the most significant portion of the output of the $M_A$ element 3269 is stored in the carry in register C of the same pipeline stage.

After eight stages of pipeline 3265 processing, such as stages STAGE 9, 3209, through STAGE 16, 3216 of FIG. 32c, a mixed-radix word 3255 is converted to a signed fractional binary value 3295 comprising a plurality of fractional digits, such as digits $B_0$ 3296 and $B_1$ 3297, and comprising a plurality of binary digits associated with an integer value, such as binary digits $B_2$ 3298 and $B_3$ 3299. It is clear to those skilled in the art of modular circuit design that more, or less number, of mixed-radix digits 3255 can be supported, and that more, or less number, of output binary digits 3295 can be supported. It is understood the dynamic ranges of the input value 3255 can be approximately the same, or may be significantly different, then the dynamic range of the output 3295, both in terms of the dynamic range of the fractional space and the dynamic range of the integer number supported. If the fractional ranges differ, a scaled rounding technique may be employed when the dynamic range of the output fraction is greater than the input fraction. When an integer overflow occurs in the whole portion of the conversion, the ov flag 3293 is set to indicate a conversion range error in the whole portion of the converted value.

Figure 33:
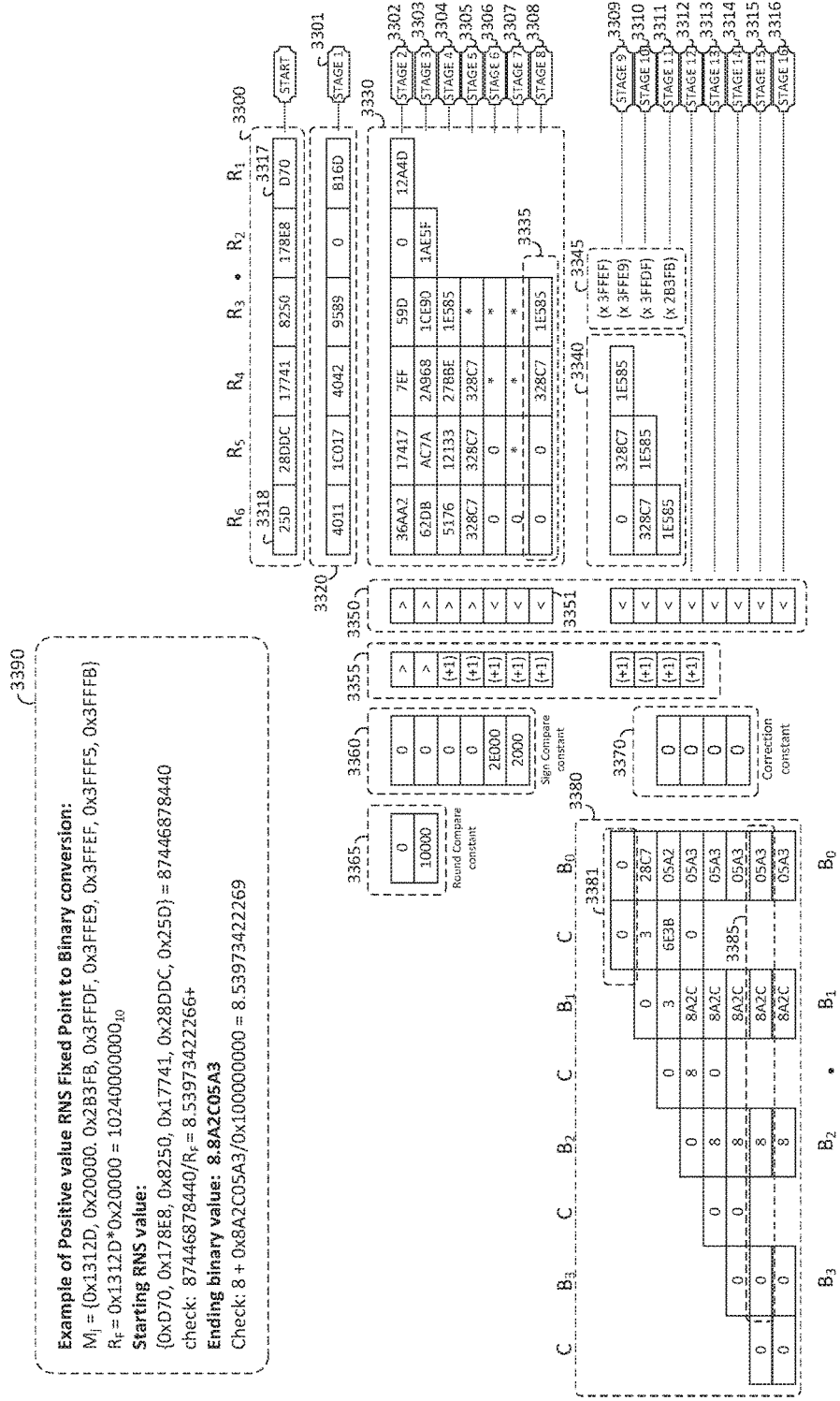
FIG. 33 is a block diagram of an exemplary reverse conversion of a positive fractional RNS value to binary pipeline.

To illustrate the data flow through the reverse converter pipeline 442c of FIG. 31, which is further illustrated by the reverse converter pipeline spanning FIGS. 32a, 32b and 32c, an example data flow of the reverse converter is shown in FIG. 33 for a positive value "8.53973422" 3300 which is an example positive fixed-point RNS data value listed in Row 384a of FIG. 3c. For the reverse converter, not all eight digits $R_I$ through $R_8$, 370, 372, 374 are necessarily needed for conversion, however, some embodiments may support all eight digits. For the diagram of FIG. 33, the RNS data input 3300 of the converter pipeline is held constant for a period of 16 pipeline stages, such as pipeline STAGE 1, 3301. This provides a means to study the processing of a single data item as it progresses through the reverse converter pipeline. In practice, the reverse converter pipeline supports a complete conversion on every clock cycle, so that illustrating independent data at each stage of the pipeline is cumbersome for disclosure.

In FIG. 33 and for the example TPU of the present disclosure, six RNS digits $R_I$ 3317 through $R_6$ 3318 are used as the RNS input word 3300 for reverse conversion; four digits comprise the short RNS word format shown in Row 384b of FIG. 3c, which is comprised of the fractionally associated digits 370 and the whole associated digits 372. Two additional RNS digits are chosen to represent an extended range 374 (not four), so digits $R_8$ and $R_6$ are arbitrarily chosen in the TPU design (any redundant two digits in this case). The extended range is necessary so the fixed-point RNS value can be scaled by the binary fractional range $2^N$ at the start of conversion; therefore, at least two digits are used to provide the required dynamic range for the scaling multiply 3218 of FIG. 32a.

In FIG. 33 and by means of example, at start of conversion an RNS fixed-point value enters the reverse converter at register port 3300. At pipeline STAGE 1, 3301, the RNS fixed point value 3300 is scaled, or multiplied, by the binary fractional range $2^N$ using a circuit like FIG. 32a and stored in word register 3320. At pipeline STAGE 2, 3302 through STAGE 8, 3308, the scaled RNS value 3320 is reduced using mixed-radix conversion producing a four-digit mixed-radix word 3335 and further producing a rounding constant of (+1) in round storage pipeline 3355 and a sign polarity state of "lesser than" in sign polarity comparator pipeline 3350 at pipeline STAGE 8, 3308. A lesser than state 3351 at pipeline STAGE 8, 3308, indicates the magnitude of the converted value is less than the beginning of the negative value range indicated by sign compare constants 3360; in other words, the example value is positive.

The round comparator pipeline uses two mixed-radix constants 3465 and compares each constant to one of the first two (fractionally associated) mixed-radix digits respectively; the comparison is least significant digit first, which results in a "greater than" value in the rounding comparator pipeline 3355 and this results in adding a single unit (+1) to the converted answer at STAGE 12, 3312, which increases the binary digit $B_0$ from the value "5A2" to the value "5A3" within the mixed-radix to binary pipeline 3380 of FIG. 33.

At pipeline STAGE 8, 3308 of the RNS to mixed-radix converter 3330, a mixed-radix word is stored in register 3335; this register is analogous to register 3155 of the reverse fractional conversion pipeline 442c of FIG. 31. The mixed-radix word 3335 of FIG. 33 is further processed by the mixed-radix digit shift circuit 3340 and mixed-radix to binary conversion pipeline 3380. The mixed-radix word 3335 is converted to a binary format by successive additions and multiplications using multiply-then-add ($M_A$) binary arithmetic elements, such as $M_A$ element 3266 of FIG. 32*c*. The multiplications are performed with the prior state of a binary register, such as binary register $B_0$ 3268, and a modulus constant, such as $M_4$ 3274 of FIG. 32*c*. Next, the $M_A$ element performs an addition with a mixed-radix digit, such as mixed-radix digit $A_5$ 3263. In other areas of the pipeline, the $M_A$ element performs an addition with a carry-in register generated from a prior stage, such as carry-in register C 3276.

In FIG. 33, the operation of the mixed-radix to binary conversion pipeline 3380 is that a mixed-radix word 3335 is multiplied by a series of factors 3345 representing the value of each digit radix while simultaneously the mixed-radix digits are added and shifted 3340 at each pipeline STAGE 9, 3309, through STAGE 11, 3311, thereby affecting a binary starting value of zero 3381 at pipeline STAGE 9, 3309 and ending with a fully recombined value 3385 at STAGE 15, 3316. The radix of each associated mixed-radix digit is shown as the constants affecting the multiplier-add elements $M_A$ in FIG. 32*c*. The multiplier within an $M_A$ element is a "multiply by a constant" function, and the value used as the constant operand is the value of a radix, such as $M_3$ 3266 and $M_4$ 3274 of FIG. 32*c*. Note the radix values 3345 are equal to modulus values $M_3$ 367 through $M_6$ 369 in Row 381 of FIG. 3*c*.

Since the example of FIG. 33 converts a positive value, there is no need to perform a correction on the converted result 3385, therefore, the correction constant 3370 applied is zero in value. Inspection of the output value demonstrates the output value 3385 is indeed the binary equivalent to the RNS fixed-point fractional value "8.53973422" 3300. Several check values for the example of FIG. 33 are provided enclosed in dotted lines 3390.

Figure 34:
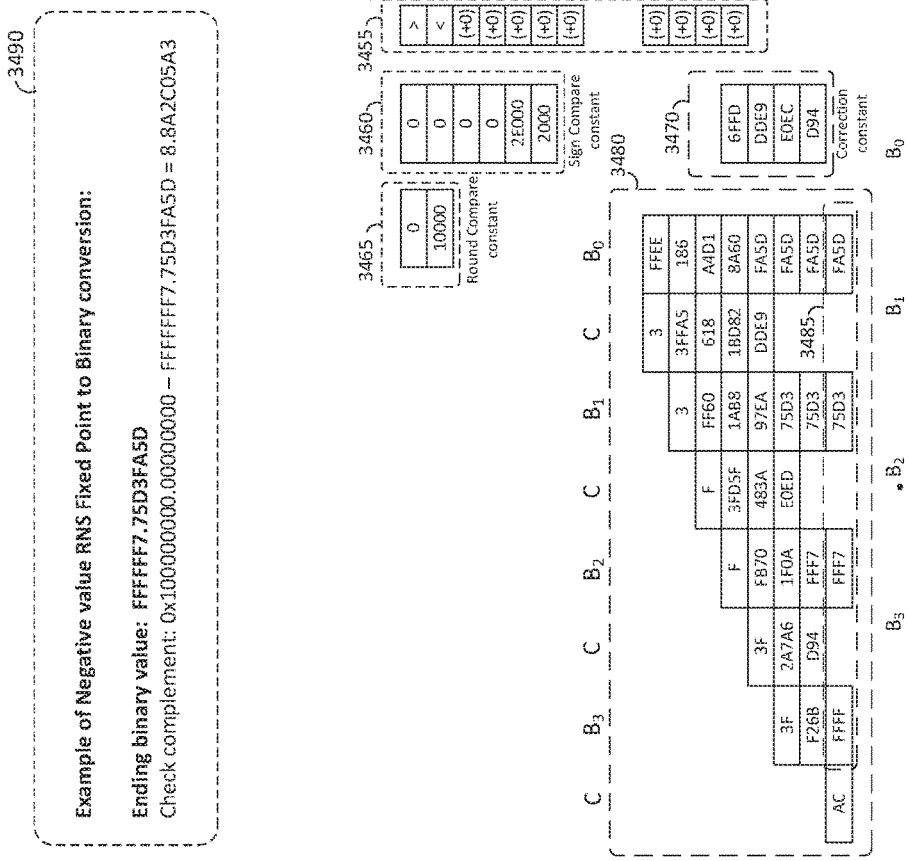
FIG. 34 is a block diagram of an exemplary reverse conversion of a negative fractional RNS value to binary pipeline.

In FIG. 34, a more complex example involving the conversion of a negative input value 3400 is shown. To better illustrate the operation, the complement of the input data of FIG. 33 is used, i.e., the RNS fixed-point equivalent of the value "−8.53973422" shown in Row 384*c* of FIG. 3*c*. Therefore, the reverse fractional converter must perform a correction on the converted value since it is negative.

In FIG. 34, the mixed-radix conversion pipeline generates two mixed-radix digits which indicate the round-up value is (+0) 3455. After generating another four mixed radix digits, the sign state is known at STAGE 8, 3408 which indicates a "greater than" sign 3451 in the present example; therefore, the converted value is greater than the sign range constants 3460 which indicates the converted value is negative. The mixed-radix value generated 3435 is much larger than the mixed-radix word 3335 of FIG. 33 since the value converted is negative, and negative encoded values lie at the upper end of the number system range. Therefore, the recombination of the mixed-radix value 3435 within the mixed-radix to binary conversion pipeline 3480 takes longer to complete.

In the unique and novel apparatus of FIGS. 32*a*, 32*b*, 32*c*, and shown as an example in FIG. 34, a correction circuit consisting of four binary digits 3470 and a plurality of adders is equivalent to adding the negative value of $R_W$ to the converted result. In the example of FIG. 34, the binary constant $-R_W$ is summed with the converted value undergoing processing in pipeline 3480 to perform a correction to the improperly converted value such that a properly converted negative value arrives at the converter output 3485. Note the conversion output word 3485 of FIG. 34 is a binary complement of the output conversion word 3385 of FIG. 33, therefore, the example of FIG. 34 checks out.

MOD Conversion Pipeline

The MOD function 454*a* of the matrix multiplier circuit 406 of FIG. 4 may be required if modular accumulators 401, 402, 403, 404 compute a congruent result and not a completely reduced "modular" result. A congruent result does not guarantee that the RNS digit D is less than its modulus M, i.e., (D<M). In a previous section, the merits of a multiplier-accumulator which uses congruent accumulation, such as the modular accumulator circuit 935*e* of FIG. 15*a*, is discussed. The unique and novel modular accumulator 935*e* allows high-speed operation, and low LUT resource memory usage, but does so at the cost of computing only a residue digit with a value that is congruent to the intended modular result.

In FIG. 4, the normalization pipeline 455*a* as described in the present disclosure requires a fully modular result as input, since the first digit is used to subtract all other digits and subtracting a congruent digit value is not correct. In some embodiments, a pipelined normalization unit 455*a* will accept a congruent digit, but a fully modular RNS digit is required for mixed-radix digit subtraction and must be produced during processing, so in practice, a fully modular input to normalization pipeline 455*a* is typical of the state of the art.

Figure 35:
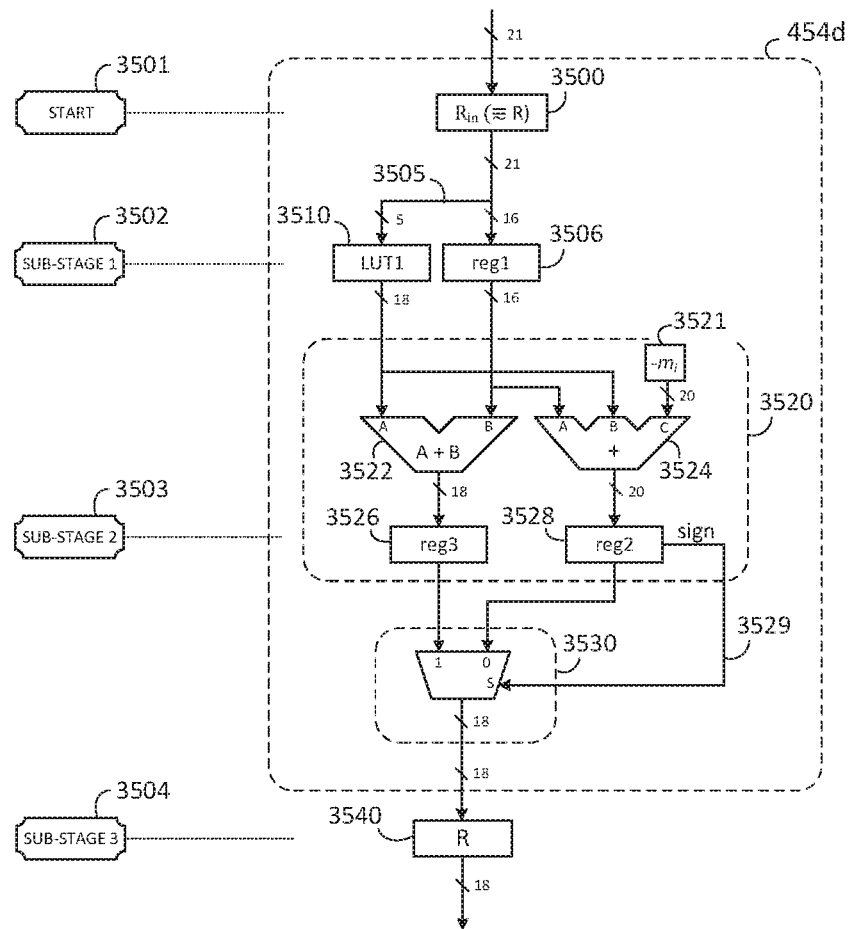
FIG. 35 is a block diagram of an exemplary pipelined MOD function circuit.

The pipelined MOD function 454*a* of FIG. 4 may be implemented using the block diagram of MOD unit 454*d* of FIG. 35. The MOD unit 454*d* is applied to a 21-bit input value $R_{in}$ congruent to a value R, and outputs a modular digit value R such that $R < M_i$ in a time of three pipeline sub-stages. In the pipeline SUB-STAGE 1 3502 the high-order five bits 3505 of the input digit value $R_{in}$ 3500 is sent to LUT1 3510 where the value of the upper five bits modulo $M_i$ is stored and sourced to adder 3522. The low order 16-bits of the input digit $R_{in}$ is stored to reg1 3506 and summed using adder 3522. Other input bit combinations 3505 can be supported, for example 17-bits of the digit R may be stored in reg1 3406 which decreases LUT memory address 3505 to 4 bits.

The summation of two modular values modulo $M_i$ is produced by adder 3522 and the same summation minus the modulus $M_i$ 3521 is produced by adder 3524 at pipeline SUB-STAGE 2 3503. If the sign of the value in register reg2 3528 indicates a negative result, it implies the result of adder 3522 is the correct result, therefore, selector 3530 will pass the result in reg3 3526 to the output register 3540 at pipeline SUB_STAGE 3 3504. Otherwise, if the reg2 value is not negative, the sign signal 3529 is zero and the value contained in reg2 3528 is passed to output register R 3540 using selector 3530 at pipeline SUB_STAGE 3 3504.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:
1. A residue number matrix multiplier comprising:
   a plurality of digit processing elements, each of the digit processing elements comprising a modular accumulator having one or more registers;

wherein the modular accumulator operates in a modular accumulator mode for an initial accumulation, and operates in a binary accumulator mode for a final accumulation.

2. The residue number matrix multiplier of claim 1, wherein the initial accumulation stores one or more final product terms in the one or more registers, and results in a summation of one or more initial product terms of a matrix dot product.

3. The residue number matrix multiplier of claim 2, wherein the final accumulation results in a summation of the one or more final product terms.

4. The residue number matrix multiplier of claim 1, wherein the modular accumulator operates on a predefined modulus.

5. A residue number matrix multiplier comprising:
a plurality of digit processing elements, each of the digit processing elements comprising a modular accumulator associated with a modulus and responsive to a control input, wherein:

the modular accumulator operates in a modular accumulation mode for an initial accumulation responsive to assertion of a control input;

the modular accumulator operates in a binary accumulation mode for a final accumulation responsive to de-assertion of a control input and;

at least a subset of the modulus are unique;

wherein said modular accumulation is transferred from the modular accumulator to an output register before overflow of the modular accumulator.

6. The residue number matrix multiplier of claim 5, wherein the modular accumulator performs operations on congruent operands.

* * * * *